United States Patent
Asahi et al.

(10) Patent No.: US 8,391,657 B2
(45) Date of Patent: Mar. 5, 2013

(54) OPTICAL MODULE

(75) Inventors: Nobuyuki Asahi, Hirakata (JP); Makoto Nisimura, Toyonaka (JP); Nobuyuki Miyagawa, Takatsuki (JP); Hiroyuki Yagyu, Hirakata (JP); Yuichi Uchida, Matsusaka (JP); Yutaka Kinugasa, Katano (JP); Tadahiro Yamaji, Hirakata (JP); Takuya Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 12/663,711

(22) PCT Filed: Jun. 26, 2008

(86) PCT No.: PCT/JP2008/062034
§ 371 (c)(1),
(2), (4) Date: Dec. 9, 2009

(87) PCT Pub. No.: WO2009/001969
PCT Pub. Date: Dec. 31, 2008

(65) Prior Publication Data
US 2010/0220957 A1 Sep. 2, 2010

(30) Foreign Application Priority Data
Jun. 26, 2007 (JP) .................................. 2007-168257

(51) Int. Cl.
*G02B 6/26* (2006.01)
*G02B 6/30* (2006.01)
(52) U.S. Cl. ................. 385/52; 385/39; 385/50; 385/51
(58) Field of Classification Search ...................... 385/52
See application file for complete search history.

(56) References Cited

U.S. PATENT DOCUMENTS

| 4,639,074 | A | * | 1/1987 | Murphy | 385/49 |
| 4,969,712 | A | * | 11/1990 | Westwood et al. | 385/14 |
| 5,230,030 | A | * | 7/1993 | Hartman et al. | 385/50 |
| 5,359,686 | A | * | 10/1994 | Galloway et al. | 385/49 |
| 5,375,184 | A | * | 12/1994 | Sullivan | 385/129 |
| 5,473,716 | A | * | 12/1995 | Lebby et al. | 385/54 |
| 5,488,678 | A | * | 1/1996 | Taneya et al. | 385/14 |
| 5,535,295 | A | * | 7/1996 | Matsumoto | 385/49 |

(Continued)

FOREIGN PATENT DOCUMENTS

| GB | 2373063 | 9/2002 |
| JP | 03134603 A * | 6/1991 |

(Continued)

OTHER PUBLICATIONS

Usui et al. (JP 2005-345708 A) machine translation of claims and detailed description.*

*Primary Examiner* — Michelle R Connelly
(74) *Attorney, Agent, or Firm* — Greenblum & Bernstein, P.L.C.

(57) ABSTRACT

An optical module includes an emitter-side mounting substrate, a receiver-side mounting substrate and an external waveguide substrate. The mounting substrate is provided with a waveguide having a core and a pair of fitting recesses. The external waveguide substrate is provided with an external waveguide having a core, a pair of fitting tabs and a lap joint portion. As the fitting tabs are fitted into the respective fitting recesses, the mounting substrate) and the external waveguide substrate are joined together, the two cores are aligned with each other, and the lap joint portion is positioned to overlap the mounting substrate.

22 Claims, 31 Drawing Sheets

U.S. PATENT DOCUMENTS

| | | | |
|---|---|---|---|
| 5,849,204 A | 12/1998 | Matsumoto | |
| 6,445,857 B1 | 9/2002 | Korenaga et al. | |
| 6,709,607 B2 * | 3/2004 | Hibbs-Brenner et al. | 216/24 |
| 6,798,932 B2 * | 9/2004 | Kuhara et al. | 385/14 |
| 6,904,209 B2 * | 6/2005 | Okada et al. | 385/49 |
| 6,907,173 B2 * | 6/2005 | Hiramatsu | 385/126 |
| 7,457,492 B2 * | 11/2008 | Umezawa | 385/14 |
| 2001/0009597 A1 * | 7/2001 | Alibert | 385/52 |
| 2002/0034362 A1 | 3/2002 | Yamazaki et al. | |
| 2002/0146217 A1 | 10/2002 | Nobuhara et al. | |
| 2002/0181882 A1 | 12/2002 | Hibbs-Brenner et al. | |
| 2003/0198439 A1 | 10/2003 | Hiramatsu | |
| 2005/0058408 A1 * | 3/2005 | Colgan et al. | 385/89 |

FOREIGN PATENT DOCUMENTS

| | | | |
|---|---|---|---|
| JP | 04204510 A * | 7/1992 | |
| JP | 5-224079 | 9/1993 | |
| JP | 05224079 A * | 9/1993 | |
| JP | 6-118275 | 4/1994 | |
| JP | 2000-314819 | 11/2000 | |
| JP | 2001-337246 | 12/2001 | |
| JP | 2002-90578 | 3/2002 | |
| JP | 2005345708 A * | 12/2005 | |
| JP | 2006-243467 | 9/2006 | |
| WO | 02/073269 | 9/2002 | |

* cited by examiner

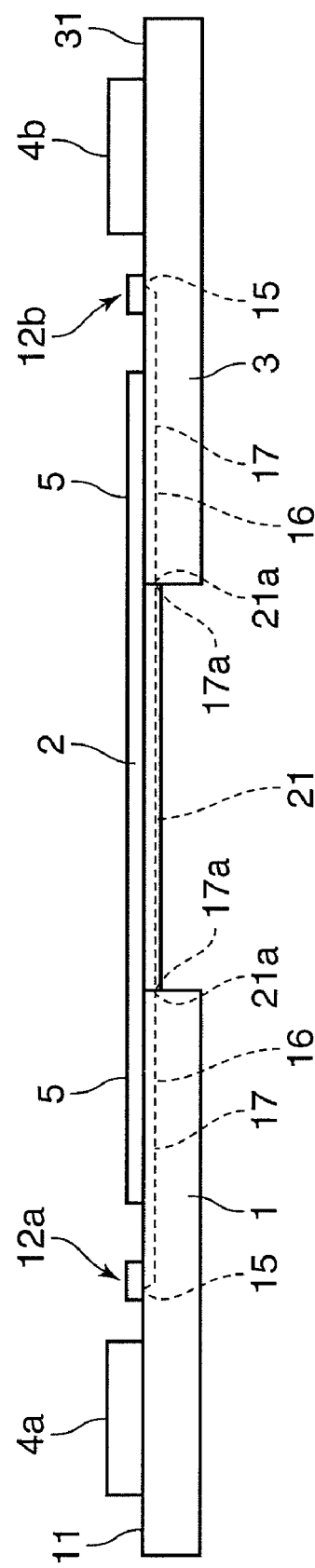

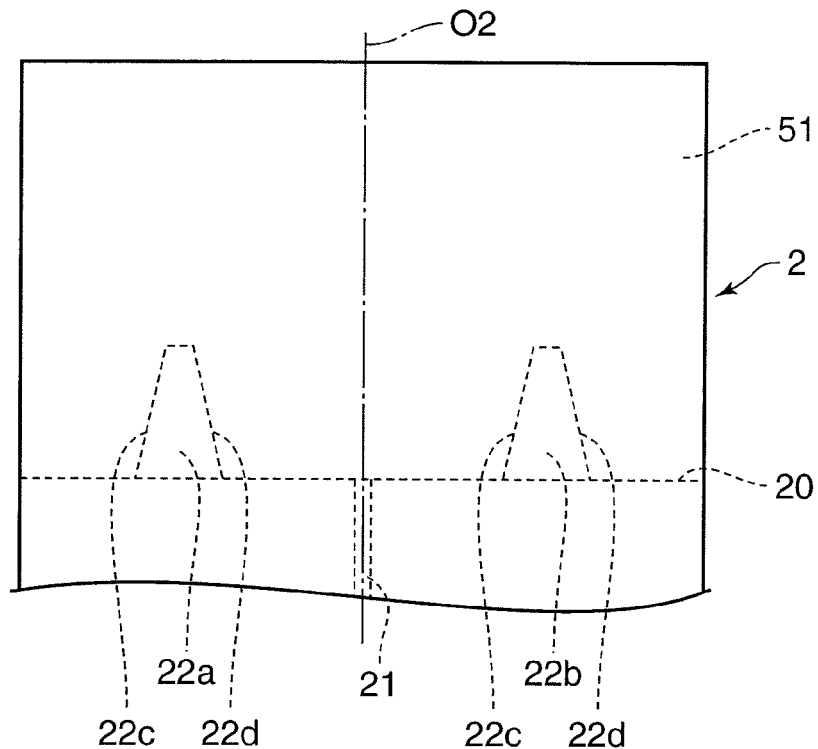
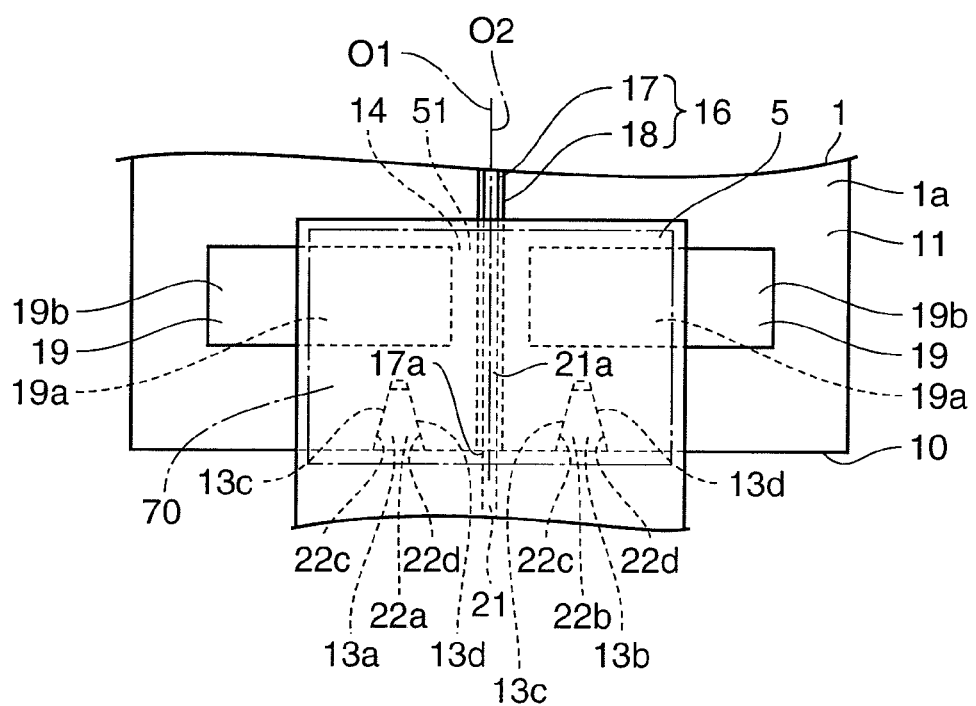

OPTICAL MODULE

TECHNICAL FIELD

The present invention relates to an optical module configured to transmit or receive an optical signal.

BACKGROUND ART

A conventionally known optical module used for transmission or reception of an optical signal is configured such that a polymer waveguide film (external waveguide substrate) having a waveguide (optical waveguide) with a core formed therein is bonded to a submount (referred to as a mounting substrate in this invention) carrying one or more optical elements (e.g., a light-emitting element and/or a light-detecting element) by adhesive with the polymer waveguide film positioned above the optical element(s) of the submount, whereby light emitted from the optical element is coupled to an incident end surface of the waveguide (refer to Patent Document 1).

Patent Document 1: Japanese Laid-open Patent Application No. 2006-243467

If, however, the polymer waveguide film is to be bonded to the submount in the aforementioned fashion, it is essential that the polymer waveguide film be precisely shaped to prescribed external dimensions, for instance, so that a position offset between the polymer waveguide film and the submount would never occur. It is practically so difficult to manufacture optical modules that way. Furthermore, even if the polymer waveguide film is manufactured with high dimensional accuracy and placed at a specified position on the submount, the polymer waveguide film might be displaced from the specified position when adhesive is filled into a gap between the polymer waveguide film and the submount, potentially causing an offset of optical axes of the polymer waveguide film and the submount and a resultant reduction in optical coupling efficiency.

There is also a case where a core of a waveguide is displaced relative to an outer shape of the polymer waveguide film. In this case, the core of the waveguide is displaced even if the polymer waveguide film is placed at the specified position on the submount. This could potentially cause an optical axis offset between the polymer waveguide film and the submount and a resultant reduction in optical coupling efficiency.

Also, since the polymer waveguide film is positioned above optical elements, there is a risk of damaging the optical elements or smearing surfaces of the optical elements when placing the polymer waveguide film in position.

Furthermore, since the adhesive is filled into the gap between the polymer waveguide film in which the waveguide is provided and the submount carrying the optical elements, the distance between the waveguide and the optical elements might increase, potentially causing a reduction in optical coupling efficiency.

SUMMARY OF THE INVENTION

It is an object of the present invention to provide an optical module which would not easily cause an optical axis offset between a polymer waveguide film and a submount, yet featuring high bond strength therebetween. It is another object of the invention to provide an optical module with low risk of damaging optical elements or smearing surfaces thereof in a bonding process. It is still another object of the invention to provide an optical module with low risk of a position offset between the polymer waveguide film and the submount and a resultant optical axis offset due to an inflow of adhesive.

According to the invention, an optical module comprises a mounting substrate including an optical element and a waveguide having a core optically coupled to the optical element, an external waveguide substrate joined to the mounting substrate, the external waveguide substrate including an external waveguide having a core which is optically coupleable to the waveguide of the mounting substrate, a first mating mechanism provided in one of the mounting substrate and the external waveguide substrate, and a joint including a second mating mechanism provided in the other one of the mounting substrate and the external waveguide substrate. As the first and second mating mechanisms of the joint are mated, the core of the waveguide and the core of the external waveguide are aligned with each other, thereby making the waveguide and the external waveguide optically coupled to each other, and the joint overlaps the aforementioned one of the mounting substrate and the external waveguide substrate in a particular area thereof, wherein the joint is bonded to the aforementioned one of the mounting substrate and the external waveguide substrate at least in part of the overlapping area thereof by adhesive.

BRIEF DESCRIPTION OF THE DRAWINGS

FIG. 1 is a schematic diagram of an entire optical module according to a first embodiment of the invention;

FIG. 4 is an enlarged fragmentary plan view of the external waveguide substrate of the first embodiment;

FIG. 5 is an enlarged fragmentary plan view showing a state in which the emitter-side mounting substrate and the external waveguide substrate of the first embodiment are joined to each other with fitting tabs formed on the latter fitted into fitting recesses formed in the former;

FIGS. 6A and 6B illustrate a second embodiment of the invention, wherein FIG. 6A is an enlarged fragmentary perspective view of an external waveguide substrate (as seen when placed upside down) and FIG. 6B is an enlarged fragmentary perspective view of an emitter-side mounting substrate;

FIGS. 7A and 7B illustrate a third embodiment of the invention, wherein FIG. 7A is an enlarged fragmentary perspective view of an emitter-side mounting substrate, and FIG. 7B is an enlarged fragmentary plan view showing a state in which the emitter-side mounting substrate and an external waveguide substrate are joined to each other with fitting tabs formed on the latter fitted into fitting recesses formed in the former;

FIGS. 8A and 8B illustrate one variation of the third embodiment, wherein FIG. 8A is an enlarged fragmentary perspective view of an emitter-side mounting substrate having adhesive filling recesses formed therein, and FIG. 8B is an enlarged fragmentary plan view showing a state in which the emitter-side mounting substrate and an external waveguide substrate are joined to each other with fitting tabs formed on the latter fitted into fitting recesses formed in the former;

FIGS. 10A and 10B illustrate a fourth embodiment of the invention, wherein FIG. 10A is an enlarged fragmentary perspective view of an emitter-side mounting substrate and an external waveguide substrate which are joined to each other with fitting tabs formed on the latter fitted into fitting recesses formed in the former, and FIG. 10B is a cross-sectional view taken along lines X-X of FIG. 10A;

FIGS. 11A and 11B illustrate one variation of the fourth embodiment, wherein FIG. 11A is an enlarged fragmentary perspective view of an emitter-side mounting substrate and an external waveguide substrate which are joined to each other with fitting tabs formed on the latter fitted into fitting recesses formed in the former, and FIG. 11B is a cross-sectional view taken along lines XI-XI of FIG. 11A;

FIGS. 12A-12D illustrate a method of forming an emitter-side mounting substrate according to a fifth embodiment of the invention, wherein FIG. 12A is a cross-sectional view showing a state in which an underlying cladding layer has been formed on the mounting substrate, FIG. 12B is a cross-sectional view showing a state in which fitting recesses and a core groove have been formed in an outer cladding layer, FIG. 12C is a cross-sectional view showing a state in which a core has been formed in the core groove, and FIG. 12D is a perspective view showing principal parts of the completed emitter-side mounting substrate;

FIGS. 13A-13D illustrate a method of forming an external waveguide substrate according to the fifth embodiment of the invention, wherein FIG. 13A is a cross-sectional view showing a state in which an underlying cladding layer has been formed on the external waveguide substrate, FIG. 13B is a cross-sectional view showing a state in which fitting tabs and a core have been formed on the underlying cladding layer, FIG. 13C is a cross-sectional view showing a state in which an outer cladding layer has been formed, and FIG. 13D is a perspective view showing principal parts of the completed external waveguide substrate;

FIGS. 15A and 15B illustrate a sixth embodiment of the invention, wherein FIG. 15A is an enlarged fragmentary perspective view showing a state in which fitting recess forming cavities have been formed in an emitter-side mounting substrate, and FIG. 15B is an enlarged fragmentary perspective view showing a state in which fitting recesses have been formed in a cladding material filled into the fitting recess forming cavities;

FIGS. 16A and 16B illustrate a seventh embodiment of the invention, wherein FIG. 16A is an enlarged fragmentary cross-sectional view showing a state in which an emitter-side mounting substrate and an external waveguide substrate are joined to each other, and FIG. 16B is an enlarged fragmentary cross-sectional view showing a state in which the external waveguide substrate and a receiver-side mounting substrate are joined to each other;

FIGS. 17A-17C illustrate an eighth embodiment of the invention, wherein FIG. 17A is an enlarged fragmentary cross-sectional view showing a state in which an emitter-side mounting substrate having a socket and an external waveguide substrate are joined to each other according to the eighth embodiment, FIG. 17B is a cross-sectional view taken along lines XII-XII of FIG. 17A, and FIG. 17C is an enlarged fragmentary cross-sectional view showing a state in which an emitter-side mounting substrate having a differently shaped socket and the external waveguide substrate are joined to each other according to one variation of the eighth embodiment;

FIGS. 18A-18C illustrate a ninth embodiment of the invention, wherein FIG. 18A is an enlarged fragmentary cross-sectional view showing a state in which an emitter-side mounting substrate having a socket and an external waveguide substrate are joined to each other according to the ninth embodiment, FIG. 18B is a cross-sectional view taken along lines XIII-XIII of FIG. 18A, and FIG. 18C is an enlarged fragmentary cross-sectional view showing a state in which an emitter-side mounting substrate having a differently shaped socket and the external waveguide substrate are joined to each other according to one variation of the ninth embodiment;

FIGS. 19A and 19B illustrate a tenth embodiment of the invention, wherein FIG. 19A is an enlarged fragmentary plan view of an emitter-side mounting substrate, and FIG. 19B is an enlarged fragmentary plan view of an external waveguide substrate and a receiver-side mounting substrate;

FIGS. 20A-20C illustrate an eleventh embodiment of the invention, wherein FIG. 20A is an enlarged fragmentary plan view of an emitter-side mounting substrate, FIG. 20B is an enlarged fragmentary plan view of an external waveguide substrate, and FIG. 20C is an enlarged fragmentary plan view showing a state in which the emitter-side mounting substrate and the external waveguide substrate are joined to each other with fitting tabs formed on the latter fitted into fitting recesses formed in the former;

DETAILED DESCRIPTION OF THE PREFERRED EMBODIMENTS OF THE INVENTION

Figure 2A:
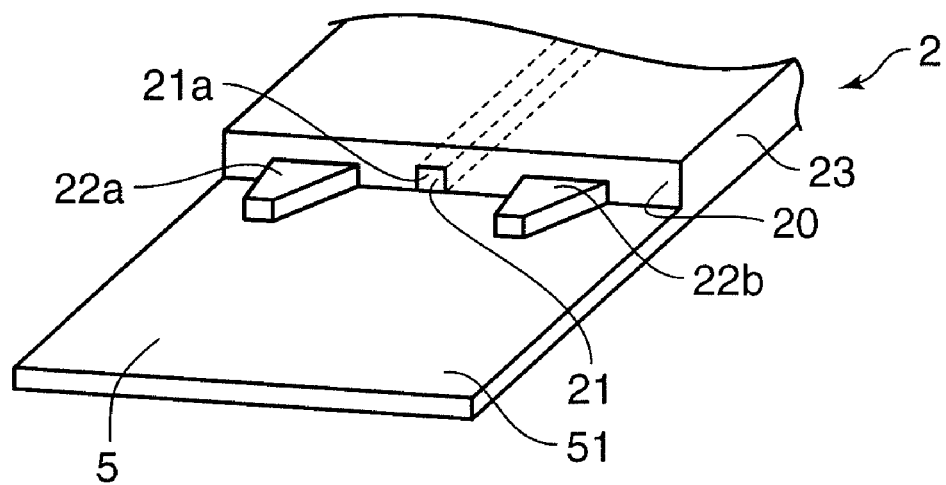
FIGS. 2A and 2B are enlarged fragmentary perspective views of an external waveguide substrate (as seen when placed upside down) and an emitter-side mounting substrate of the optical module of FIG. 1, respectively.

Best modes for carrying out the present invention are now described in detail with reference to the accompanying drawings.

First Embodiment

FIG. 1 is a schematic diagram of an optical module according to a first embodiment of the invention. As shown in FIG. 1, the optical module includes an emitter-side mounting substrate 1, a receiver-side mounting substrate 3 and an external waveguide substrate 2 which joins the two mounting substrates 1, 2 with optical coupling capability. As a convention in the following discussion of the present invention, "upward and downward directions" mean the upward and downward directions as illustrated in FIG. 1, "left and right directions" mean directions perpendicular to the plane of paper of FIG. 1, and left and right sides of FIG. 1 are regarded as front and rear of the optical module, respectively.

The emitter-side mounting substrate 1 has a generally rectangular shape in plan view which is elongate along a front-rear direction and has a thickness of approximately 200 μm to 2 mm. Overall dimensions of the mounting substrate 1 may differ depending on electrical and other components mounted thereon.

It is necessary that the mounting substrate 1 have sufficient stiffness to prevent the influence of a stress due to thermal effects in mounting process and ambient conditions of use, for example. Generally, in applications related to transmission of light, optical transmission efficiency between a light-emitting element and a light-detecting element is of substantial importance so that it is necessary to mount each optical element with high accuracy and avoid displacement thereof during operation as much as possible. For this reason, a silicon substrate is used as the mounting substrate 1 in this embodiment.

The mounting substrate 1 should preferably be made of a material having a coefficient of thermal expansion close to that of a light-emitting element 12a described below. Alternatively, the mounting substrate 1 may be made of a compound semiconductor like gallium arsenide (GaAs) which belongs to the same group as a below-described vertical cavity surface emitting laser (VCSEL) material. Other alternatives include a ceramic substrate and a plastic substrate, the latter being usable depending on ambient conditions of use.

On one surface 11 of the mounting substrate 1 oriented in a thickness direction thereof constituting a top surface of the mounting substrate 1, the aforementioned light-emitting element 12a for converting an electric signal into a light signal and an integrated circuit (IC) board 4a on which an IC circuit for transmitting an electric signal is formed are mounted.

The light-emitting element 12a used in this embodiment is a VCSEL which is a type of a semiconductor laser. While a light-emitting diode (LED) is an alternative to the semiconductor laser that can be employed as the light-emitting element 12a, the LED lacks directivity and, thus, the ratio of light coupled to a waveguide through a later-described 45-degree mirror surface is low. The LED which confers an advantage for its low cost may be employed on condition that optical efficiency is sufficiently high.

The light-emitting element 12a is mounted on the mounting substrate 1 by flip-chip bonding which provides, compared to die bonding and wire bonding, a greater degree of mounting accuracy as high as 1 μm or less with a capability to recognize an alignment mark printed on a chip.

The IC board 4a is a driver IC located close to the light-emitting element 12a for driving the aforementioned VCSEL. Although not illustrated, the light-emitting element 12a and the IC board 4a are connected to a wiring pattern formed on the top surface 11 of the mounting substrate 1 via gold bumps. The IC board 4a and the light-emitting element 12a simultaneously mounted on the mounting substrate 1.

Although not illustrated either, underfill materials are filled between the light-emitting element 12a and the mounting substrate 1 and between the IC board 4a and the mounting substrate 1. It is required for the underfill material filled between the light-emitting element 12a and the mounting substrate 1 to have transparency to the wavelength of light emitted from the light-emitting element 12a as well as a certain degree of elasticity as the property of the VCSEL varies depending on a stress applied thereto. Silicone resin and epoxy resin are suitable examples of the underfill material used between the light-emitting element 12a and the mounting substrate 1. Epoxy resin is a suitable example of the underfill material used between the IC board 4a and the mounting substrate 1 from the viewpoint of mounting strength.

At a location exactly beneath the light-emitting element 12a on the mounting substrate 1, there is formed a mirror portion 15 for bending a light path by 90 degrees. The mirror portion 15 can be produced by evaporating gold or aluminum on a 45-degree slant surface formed by etching the mounting substrate 1. Specifically, this 45-degree slant surface can be formed by an anisotropic etch process performed by using a potassium hydroxide solution, for example.

Figure 2B:
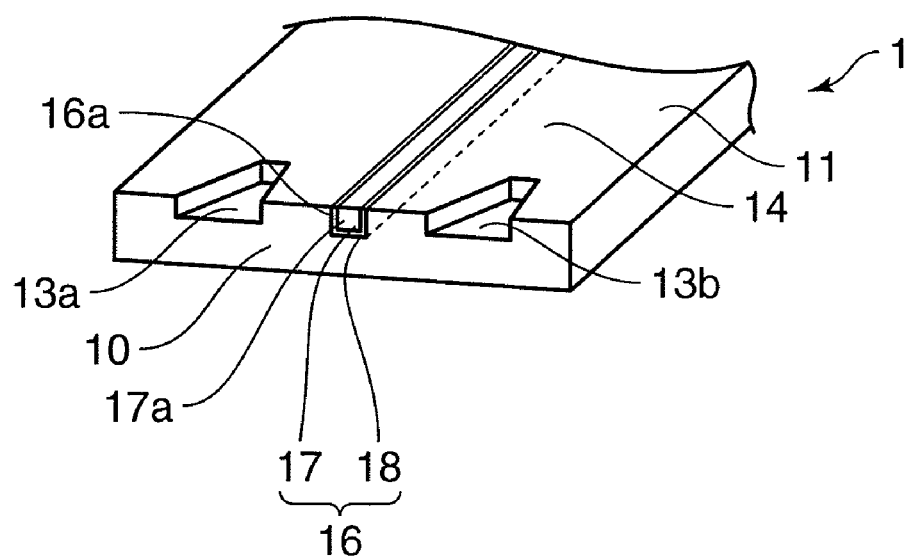
Figure 3A:
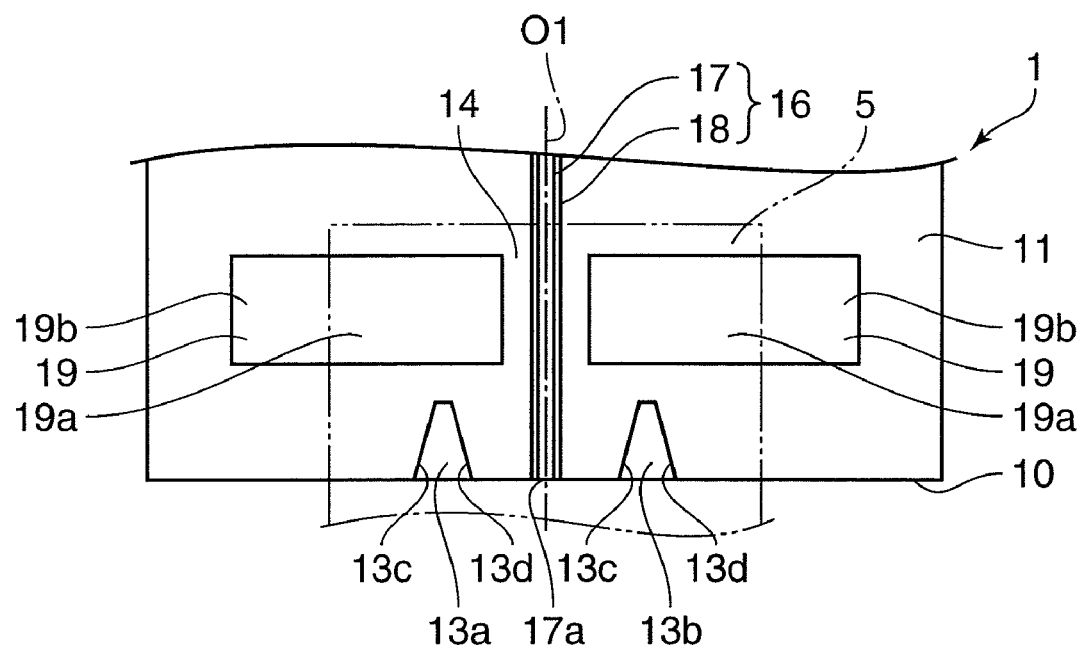
FIGS. 3A and 3B are an enlarged fragmentary plan view and a front view of the emitter-side mounting substrate of the first embodiment, respectively.
Figure 3B:
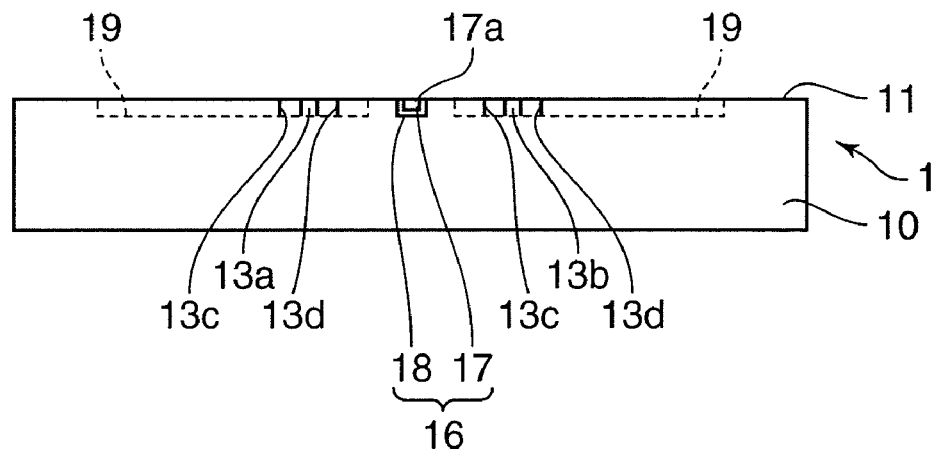

The mounting substrate 1 has a waveguide 16 formed therein that is optically coupled to the light-emitting element 12a. This waveguide 16 extends rearward from the mirror portion 15 up to a rear end 10 of the mounting substrate 1 as shown in FIGS. 2B, 3A and 3B.

The waveguide 16 includes a core 17 formed into a generally square cross-sectional shape to provide a high refractive index for propagating light and a cladding 18 having a lower refractive index than the core 17, the waveguide 16 extending in a waveguide groove 16a formed in the mounting substrate 1.

Left and right sides and a bottom side of the core 17 are covered by the cladding 18, while a top side of the core 17 which is one side oriented upward in the thickness direction thereof is made generally flush with the top surface 11 of the mounting substrate 1 and exposed to the exterior without being covered by the cladding 18.

In this embodiment, a rear end surface of the core 17 in a longitudinal direction thereof is made generally flush with a rear end surface of the mounting substrate 1, the rear end surface of the core 17 constituting a first butt surface 17a which abuts a second butt surface 21a of a later-described core 21 of the external waveguide substrate 2.

Dimensions of the core 17 and the cladding 18 of the waveguide 16 are determined based on the distance from the light-emitting element 12a to the waveguide 16, divergence angle of the light-emitting element 12a and size of a later-described light-detecting element 12b with first priority given to the optical efficiency.

In a typical optical system configured with a VCSEL and a photodiode (light-detecting element) for high-speed data transmission at 5-10 Gbps or above, the VCSEL has an emitting beam diameter of 5-10 μm and a divergence angle of approximately degrees and the photodiode has an detective diameter of approximately 60 μm, for example, so that it is preferable that the core 17 have a light path width of 40 μm and the cladding 18 have a thickness of 2-10 μm.

In the case of short-range data transmission within a particular apparatus, for example, data transmission process is affected by beam divergence so little that optical data transmission need not necessarily be carried out by single-mode transmission. In this case, it is more advantageous to use a large-sized multi-mode waveguide which can easily be aligned. In a case where a higher transmission speed is required, single mode is used and a VCSEL (light source) and a photodiode suited for high-speed operation are selected.

The emitter-side mounting substrate 1 of the first embodiment has a pair of fitting recesses 13a, 13b formed therein to serve as first mating parts. The fitting recesses 13a, 13b are used for aligning and joining the mounting substrate 1 and the external waveguide substrate 2 so that axes of the core 17 of the waveguide 16 formed in the mounting substrate 1 and the later-described core 21 of an external waveguide formed in the external waveguide substrate 2 would not be offset from each other along the left-right direction (widthwise direction). In this embodiment, the two fitting recesses 13a, 13b are formed on left and right sides of the core 17, respectively.

As depicted in FIG. 3A, the left-side fitting recess 13a is formed as if cut from the rear end 10 and the top surface 11 of the mounting substrate 1. An inner left side and an inner right side of the left-side fitting recess 13a form a left-side oblique wall 13c and a right-side oblique wall 13d, respectively.

The left-side oblique wall 13c forms a surface oriented at a specific oblique angle relative to a longitudinal axis O1 of the core 17. The right-side oblique wall 13d also forms a surface oriented obliquely from the axis O1 but in an opposite direction. Therefore, as seen in plan view, the left-side fitting recess 13a is generally dovetail-shaped (tapered), gradually narrowing frontward from the rear end 10 of the mounting substrate 1.

In this embodiment, the left-side fitting recess 13a is located at a distance of 400 μm to 2000 μm from the axis O1 of the core 17 and has a length of 300 μm to 2000 μm in front-rear direction, although the location and length of the left-side fitting recess 13a are not limited thereto but may be determined as appropriate.

The right-side fitting recess 13b is similarly formed on a side opposite the left-side fitting recess 13a with respect to the axis O1 so that the left-side fitting recess 13a and the right-side fitting recess 13b are left-right symmetric. Specifically, the right-side fitting recess 13b has a left-side oblique wall 13c and a right-side oblique wall 13d formed like those of the left-side fitting recess 13a so that the right-side fitting recess 13b is generally dovetail-shaped (tapered) in plan view, gradually narrowing frontward from the rear end 10 of the mounting substrate 1 like the left-side fitting recess 13a.

In this configuration, the left-side oblique wall 13c of the left-side fitting recess 13a and the right-side oblique wall 13d of the right-side fitting recess 13b are formed symmetrically on left and right sides of the axis O1, as are the right-side oblique wall 13d of the left-side fitting recess 13a and the left-side oblique wall 13c of the right-side fitting recess 13b.

The top surface 11 of the mounting substrate 1 has an overlap area 14 overlapped by a later-described lap joint portion 5 of the external waveguide substrate 2 as well as a pair of adhesive filling recesses 19 into which adhesive is filled. The overlap area 14 in the top surface 11 of the mounting substrate 1 extends frontward from the rear end 10 by as much as the length of the lap joint portion 5.

The adhesive filling recesses 19 are formed on the left and right sides of the axis O1 of the core 17 as depicted in FIGS. 3A and 3B. Each of the adhesive filling recesses 19 has an adhesive filling portion 19a and an adhesive inlet 19b through which the adhesive is filled into the adhesive filling portion 19a, the adhesive inlet 19b being connected to the adhesive filling portion 19a.

Each adhesive filling portion 19a is an area where the lap joint portion 5 of the external waveguide substrate 2 is bonded, the adhesive filling portion 19a being formed in part of the overlap area 14 of the mounting substrate 1. Each adhesive inlet 19b is formed in part of a non-overlap area of the mounting substrate 1 where a top side of the mounting substrate 1 is not overlapped by the lap joint portion 5 of the external waveguide substrate 2.

In this embodiment, the adhesive filling recesses 19 are formed at the rear of the fitting recesses 13a, 13b at locations apart therefrom, each of the adhesive filling recesses 19 measuring approximately 50 μm to 300 μm deep from the top surface 11 of the mounting substrate 1 and approximately 100 μm to 1000 μm long (front to rear) and wide (left to right). The adhesive filling recesses 19 may have still larger depth depending on the thickness of the mounting substrate 1.

Returning to FIG. 1, the receiver-side mounting substrate 3 is now described. The receiver-side mounting substrate 3 has basically the same configuration as the above-described emitter-side mounting substrate 1. The receiver-side mounting substrate 3 differs from the emitter-side mounting substrate 1 in that the former is provided with the earlier-mentioned light-detecting element 12b for converting the light signal into an electric signal and an IC board 4b on which an IC circuit for receiving the electric signal from the light-detecting element 12b is formed, the light-detecting element 12b and the IC board 4b being mounted on one surface of the mounting substrate 3 constituting a top surface 31 thereof. A photodiode is used as the light-detecting element 12b and a device like a transimpedance amplifier (TIA) for converting an input current into a voltage is used as the IC board 4b in this embodiment.

Next, the external waveguide substrate 2 is described with reference to FIGS. 1, 2A and 4. The external waveguide substrate 2 has the earlier-mentioned external waveguide which is optically coupleable to both the core 17 of the waveguide 16 formed in the emitter-side mounting substrate 1 and a core 17 of a waveguide 16 formed in the receiver-side mounting substrate 3.

The external waveguide of the external waveguide substrate 2 includes the earlier-mentioned core 21 and a cladding 23. In this embodiment, the entirety of the external waveguide substrate 2 constitutes the external waveguide including the core 21 and the cladding 23, the external waveguide substrate 2 having a flexible, filmlike structure which is narrower and more elongate than the mounting substrate 1. While the external waveguide substrate 2 of this embodiment has a thickness of approximately a few tens of μm to 500 μm, the thickness may be approximately 1 mm to 3 mm if the external waveguide substrate 2 is not required to have bendability. If the direction of light transmission of the external waveguide substrate 2 is limited to one direction, it is possible to improve optical efficiency by making dimensions of the waveguide core 21 smaller at a downstream portion along the light transmission direction than at an upstream portion.

In this embodiment, the core 21 is formed all along the external waveguide substrate 2 so that an axis O2 of the core 21 generally aligns with a longitudinal axis of the external waveguide substrate 2. A front end surface of the core 21 of the external waveguide substrate 2 oriented frontward in a longitudinal direction of the core 21 constitutes the earlier-mentioned second butt surface 21a which abuts the first butt surface 17a of the mounting substrate 1 is made flush with a front end 20 of the external waveguide substrate 2 and exposed to the exterior.

The cladding 23 of the external waveguide of the external waveguide substrate 2 is formed into a platelike structure to cover all sides of the core 21. The core 21 and the cladding 23 forming the external waveguide of the external waveguide substrate 2 are made of the same materials as the core 17 and the cladding 18 of the mounting substrate 1, respectively. Also, the core 21 of the external waveguide substrate 2 has approximately the same thickness and width as the core 17 of the mounting substrate 1.

The external waveguide substrate 2 has at longitudinal ends thereof the earlier-mentioned lap joint portion 5 which is joined to the emitter-side mounting substrate 1 and another lap joint portion 5 which is joined to the receiver-side mounting substrate 3. Since these lap joint portions 5 are symmetrically shaped, the following discussion deals only with the lap joint portion 5 joined to the emitter-side mounting substrate 1 without describing the lap joint portion 5 joined to the receiver-side mounting substrate 3.

Referring to FIG. 2A, the lap joint portion 5 is a platelike portion of the external waveguide substrate 2 which extends frontward beyond the front end 20 thereof, the lap joint portion 5 having the same width as a main portion of the external waveguide substrate 2 and a specific thickness. In this embodiment, the lap joint portion 5 is formed as an integral part of the cladding 23 of the external waveguide substrate 2 using the same material as the cladding 23.

A bottom side (top side as depicted in FIG. 2A) of the lap joint portion 5 constitutes a contact surface 51 which goes into direct contact with the overlap area 14 of the emitter-side mounting substrate 1 when the lap joint portion 5 is placed to overlap the overlap area 14. The contact surface 51 is made generally flush with a top side of the core 21.

On the contact surface 51 of the lap joint portion 5, there are formed downward projecting left-side and right-side fitting tabs 22a, 22b serving as second mating parts which fit into the fitting recesses 13a, 13b formed in the emitter-side mounting substrate 1. To be more specific, the left-side fitting tab 22a fits into the left-side fitting recess 13a of the mounting substrate 1 while the right-side fitting tab 22b fits into the right-side fitting recess 13b of the mounting substrate 1.

The left-side fitting tab 22a has a left-side contact wall 22c and a right-side contact wall 22d which go into contact with the left- and right-side oblique walls 13c, 13d of the left-side fitting recess 13a formed in the emitter-side mounting substrate 1, respectively. Distances of the left- and right-side contact walls 22c, 22d from the axis O2 of the core 21 of the external waveguide substrate 2 are made equal to distances of the left- and right-side oblique walls 13c, 13d of the left-side fitting recess 13a from the axis O1 of the core 17 of the mounting substrate 1 (refer to FIG. 3A).

The right-side fitting tab 22b also has a left-side contact wall 22c and a right-side contact wall 22d which go into contact with the left- and right-side oblique walls 13c, 13d of the right-side fitting recess 13b formed in the emitter-side mounting substrate 1, respectively. Distances of the left- and right-side contact walls 22c, 22d from the axis O2 of the core of the external waveguide substrate 2 are made equal to distances of the left- and right-side oblique walls 13c, 13d of the right-side fitting recess 13b from the axis O1 of the core 17 of the mounting substrate 1.

When joining the emitter-side mounting substrate 1 and the external waveguide substrate 2 thus configured, the external waveguide substrate 2 is relatively moved toward the emitter-side mounting substrate 1 from the rear side thereof in such a way that the fitting tabs 22a, 22b of the former fit into the fitting recesses 13a, 13b of the latter, respectively. Consequently, the left- and right-side contact walls 22c, 22d of the left- and right-side fitting tabs 22a, 22b of the lap joint portion 5 go into contact with the left- and right-side oblique walls 13c, 13d of the left- and right-side fitting recesses 13a, 13b almost at the same time, respectively, whereby the mounting substrate 1 and the external waveguide substrate 2 are mated with each other as shown in FIG. 5.

When the mounting substrate 1 and the external waveguide substrate 2 are joined in the aforementioned fashion, the first butt surface 17a of the core 17 of the emitter-side mounting substrate 1 is placed face to face with the second butt surface 21a of the core 21 of the external waveguide substrate 2. Since the cores 17, 21 of the mounting substrate 1 and the external waveguide substrate 2 are aligned along the left-right direction (widthwise direction) as a result of the above-described joining operation, the axis O1 of the mounting substrate 1 and the axis O2 of the external waveguide substrate 2 are aligned without offsetting laterally. Also as a result of this joining operation, the lap joint portion 5 of the external waveguide substrate 2 overlies the overlap area 14 of the mounting substrate 1 with the contact surface 51 of the lap joint portion 5 held in face-to-face contact with the overlap area 14.

Since the contact surface 51 of the external waveguide substrate 2 and the top side of the core 21 of the external waveguide substrate 2 are made flush with each other as are the overlap area 14 of the emitter-side mounting substrate 1 and the top side of the core 17 thereof, the axes O1, O2 of the respective cores 17, 21 are aligned to the same vertical position (in the thickness direction). Consequently, the core 17 of the emitter-side mounting substrate 1 and the core 21 of the external waveguide substrate 2 are optically coupled with substantially zero optical axis offsetting.

After the mounting substrate 1 and the external waveguide substrate 2 have been aligned with each other in the aforementioned manner, the adhesive is filled into between the mounting substrate 1 and the external waveguide substrate 2 as described below. Vertical alignment of the mounting substrate 1 and the external waveguide substrate 2 in their stacking direction (thickness direction) is accomplished by using the contact surface 51 of the lap joint portion 5 of the external waveguide substrate 2 and the overlap area 14 of the mounting substrate 1 as reference planes. A retaining plate 70 (shown by alternate long and short dashed lines in FIG. 5) made of a glass plate, for instance, is placed on top of the lap joint portion 5 of the external waveguide substrate 2 in this embodiment. The retaining plate 70 thus disposed presses the aforementioned mating parts of the mounting substrate 1 and the external waveguide substrate 2 and the adhesive filling portions 19a of the mounting substrate 1 from above to prevent mutual position offset of the mounting substrate 1 and the external waveguide substrate 2 in the stacking direction thereof (or a lifting of the external waveguide substrate 2 from the mounting substrate 1) during adhesive filling operation. This arrangement of the embodiment serves to prevent vertical (thicknesswise) offset of the mounting substrate 1 and the external waveguide substrate 2, thus ensuring an increased positioning accuracy.

Under conditions where the mounting substrate 1 and the external waveguide substrate 2 are joined as discussed above, the adhesive filling portions 19a of the adhesive filling recesses 19 formed in the mounting substrate 1 are covered by the lap joint portion 5 of the external waveguide substrate 2 from above. The adhesive is filled into the adhesive filling recesses 19 through the adhesive inlets 19b thereof in this condition. The adhesive penetrates into the adhesive filling portions 19a through the adhesive inlets 19b by capillary action so that the adhesive filling portions 19a of the mounting substrate 1 are bonded to an area of the lap joint portion 5 of the external waveguide substrate 2 facing the adhesive filling recesses 19 by the adhesive.

With the emitter-side mounting substrate 1 and the external waveguide substrate 2 aligned as mentioned above, the adhesive does not penetrate in between the fitting tabs 22a, 22b of the lap joint portion 5 of the external waveguide substrate 2 and the fitting recesses 13a, 13b formed in the mounting substrate 1. Thus, the emitter-side mounting substrate 1 and the external waveguide substrate 2 are held in alignment even after the aforementioned adhesive filling process. This makes it possible to prevent the cores 17, 21 of the emitter-side mounting substrate 1 and the external waveguide substrate 2 from offsetting from each other in the left-right direction due to the presence of the adhesive. Furthermore, since no adhesive exists between the external waveguide substrate 2 and an area of the top surface of the mounting substrate 1 excluding the adhesive filling recesses 19 formed therein, it is possible to prevent vertical offsetting of the emitter-side mounting substrate 1 and the external waveguide substrate 2.

It is appreciated from the above discussion that the emitter-side mounting substrate 1 and the external waveguide substrate 2 can be joined to each other with the axes O1, O2 of the respective cores 17, 21 aligned in both vertical and left-right directions.

Additionally, since the light-emitting element 12a (light-detecting element 12b) and the IC board 4a (4b) are mounted at the side of the waveguide 16 on the top surface 11 (31) of the mounting substrate 1 (3), the above-described arrangement of the present embodiment ensures that the adhesive used for bonding the mounting substrate 1 (3) to the external waveguide substrate 2 can be applied without risk of adhering to the light-emitting element 12a (light-detecting element 12b) and the IC board 4a (4b).

While the adhesive used in this embodiment is a thermosetting epoxy adhesive, the adhesive is not limited thereto. For example, it is possible to use photosetting adhesive. Since a silicon substrate is used as the mounting substrate 1 in this embodiment, it is preferable to use a thermosetting epoxy adhesive because part of a photosetting adhesive layer may not harden. It is however possible to prevent the occurrence of an uncured part of the photosetting adhesive layer if the external waveguide substrate 2 is made of a material transparent to a photosetting wavelength at least in part.

While the optical module of the first embodiment thus far described is an optoelectric transducer, the invention is applicable to optical coupling of waveguides formed in a pair of substrates. For example, the above-described configuration of the first embodiment is also applicable to a passive device not having a light-emitting or light-detecting element like an optical splitter and a waveguide film.

Second Embodiment

Now, an optical module according to a second embodiment of the invention is described with reference to FIGS. 6A and 6B. An emitter-side mounting substrate 100 of the optical module of the second embodiment has a single fitting recess 113.

Figure 6A:
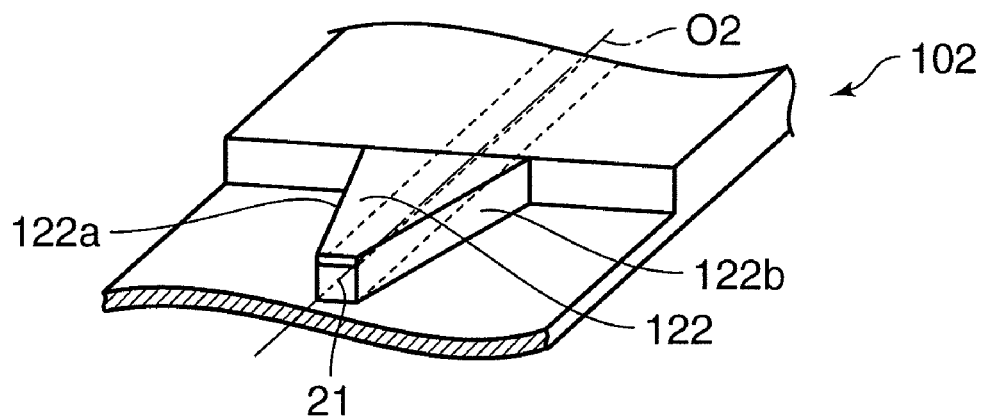
Figure 6B:
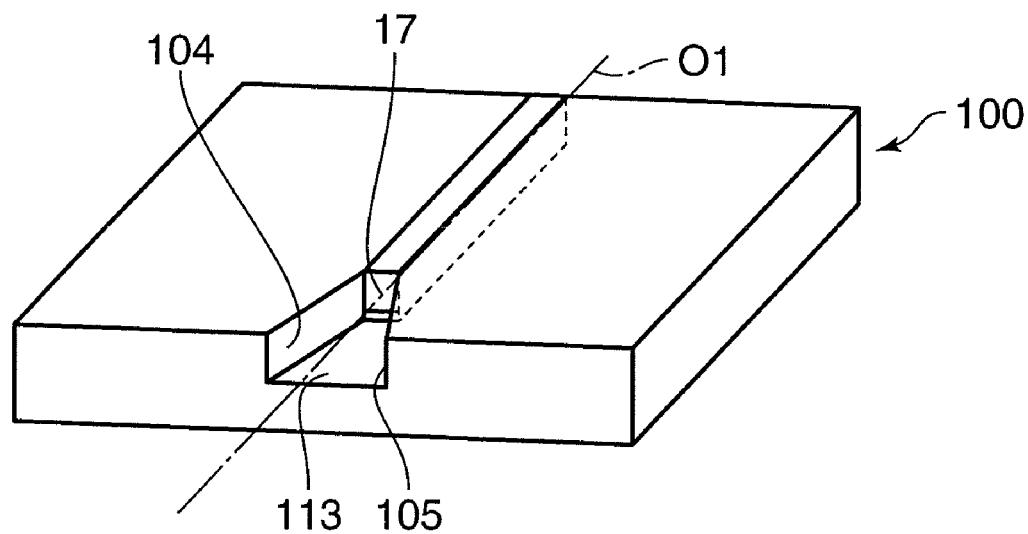

Like the fitting recesses 13a, 13b formed in the mounting substrate 1 of the first embodiment, the fitting recess 113 has a left-side oblique wall 104 and a right-side oblique wall 105 which are formed such that the fitting recess 113 is generally dovetail-shaped (tapered) in plan view, gradually narrowing frontward as depicted in FIG. 6B. In this embodiment, the left-side oblique wall 104 is located on a left side of an axis O1 of a core 17 of a waveguide 16 and the right-side oblique wall 105 is located on a right side of the axis O1 of the core 17 of the waveguide 16. Also, the left- and right-side oblique walls 104, 105 are formed symmetrically on the left and right sides of the axis O1 of the core 17 of the waveguide 16, respectively.

As shown in FIG. 6A, an external waveguide substrate 102 of the second embodiment has a single fitting tab 122 shaped to fit into the fitting recess 113 formed in the mounting substrate 100, the fitting tab 122 having a left-side contact wall 122a and a right-side contact wall 122b which go into contact with the left- and right-side oblique walls 104, 105 of the fitting recess 113, respectively. Also, the left- and right-side contact walls 122a, 122b are formed symmetrically on left and right sides of an axis O2 of a core 21 of the external waveguide substrate 102, respectively, in terms of both shape and location.

According to the above-described configuration of the second embodiment, it is possible to maintain the left- and right-side contact walls 122a, 122b in the same bilaterally symmetrical shape and location with respect to the axis O2 of the core 21 even when the external waveguide substrate 102 expands or shrinks due to a thermal effect, for instance. This makes it possible to align the core 17 of the mounting substrate 100 and the core 21 of the external waveguide substrate 102 with increased accuracy by fitting the fitting tab 122 of the external waveguide substrate 102 into the fitting recess 113 of the mounting substrate 100.

Third Embodiment

Next, an optical module according to a third embodiment of the invention is described. An emitter-side mounting substrate 301 of the optical module of this embodiment has a plurality of adhesive filling recesses 319 which are formed close to left and right rear portions of each of fitting recesses 313a, 313b in such a manner that the adhesive filling recesses 319 connect to the respective fitting recesses 313a, 313b.

Figure 7A:
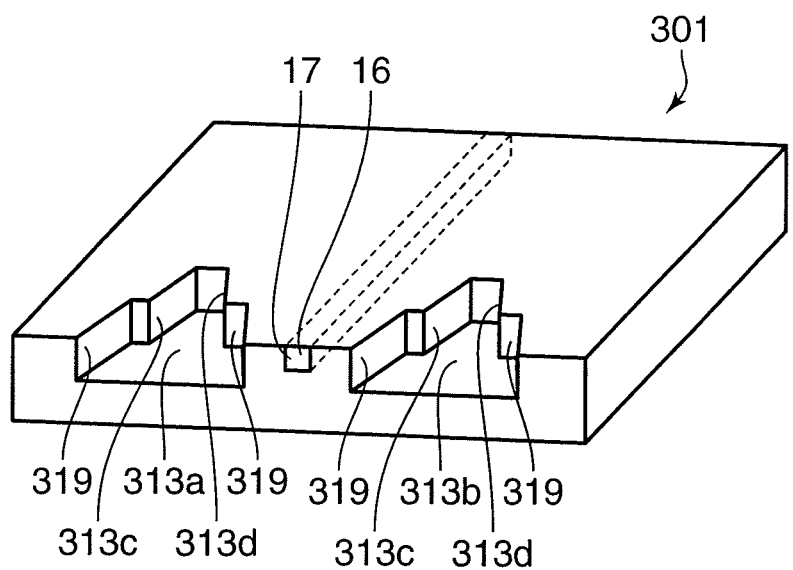
Figure 7B:
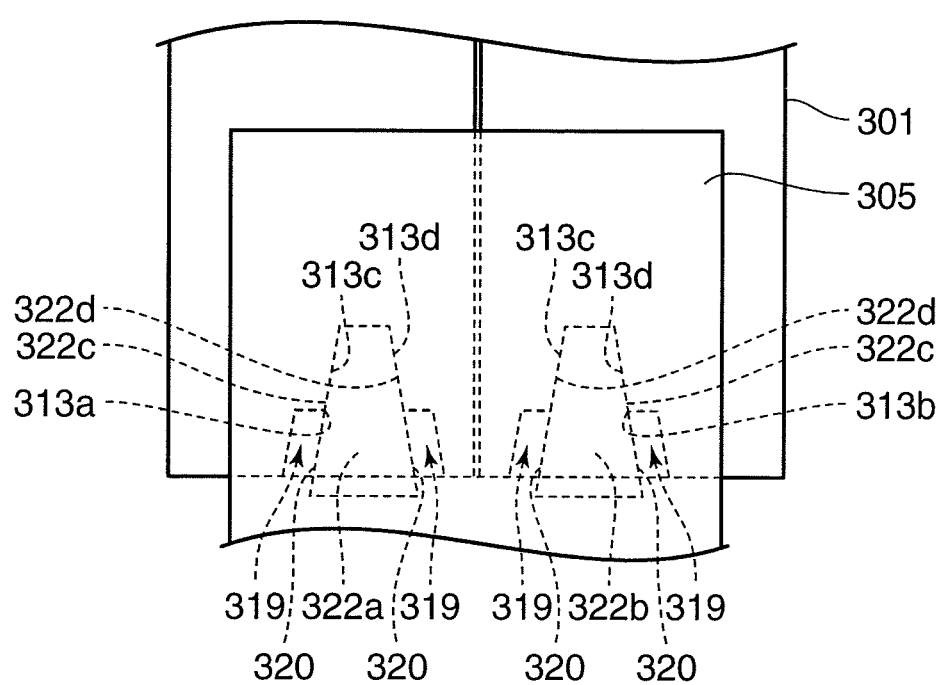

Referring to FIG. 7B, a lap joint portion 305 of an external waveguide substrate 2 has a pair of fitting tabs 322a, 322b, each of the fitting tabs 322a, 322b having a left-side contact wall 322c and a right-side contact wall 322d. Basal parts of the left- and right-side contact walls 322c, 322d serve as bonding areas 320.

After the plurality of adhesive filling recesses 319 have been filled with the adhesive, the fitting tabs 322a, 322b of the lap joint portion 305 of the external waveguide substrate 2 are fitted into the fitting recesses 313a, 313b of the mounting substrate 301, respectively, whereby the adhesive filling recesses 319 are bonded to the respective bonding areas 320 of the lap joint portion 305.

In the above-described joining operation, the left- and right-side contact walls 322c, 322d of the fitting tabs 322a, 322b of the lap joint portion 305 go into contact with left- and right-side oblique walls 313c, 313d of the fitting recesses 313a, 313b, respectively. Since no adhesive exists between the contact walls 322c, 322d of the fitting tabs 322a, 322b and the oblique walls 313c, 313d of the fitting recesses 313a, 313b, it is possible to maintain the external waveguide substrate 2 and the mounting substrate 301 joined to each other with the fitting tabs 322a, 322b of the former correctly fitted into the fitting recesses 313a, 313b of the latter, thereby reducing the risk of a position offset between the external waveguide substrate 2 and the mounting substrate 301 potentially caused by an adhesive layer.

The above-described configuration of the third embodiment is advantageous in that it is possible to securely join the mounting substrate 301 and the external waveguide substrate 2 by bonding a rear end of the mounting substrate 301 and a rear end of the lap joint portion 305 of the external waveguide substrate 2 to each other at boundaries of the mounting substrate 301 and the external waveguide substrate 2. Additionally, the adhesive filling recesses 319 are formed to connect to the respective fitting recesses 313a, 313b, it is possible to easily form the adhesive filling recesses 319 at the same time when forming the fitting recesses 313a, 313b.

Figure 8A:
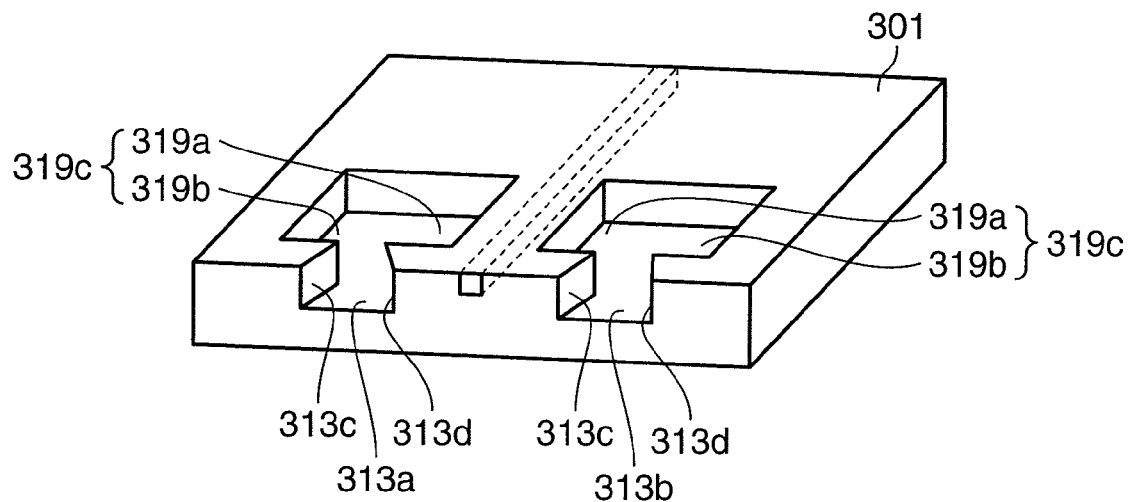
Figure 8B:
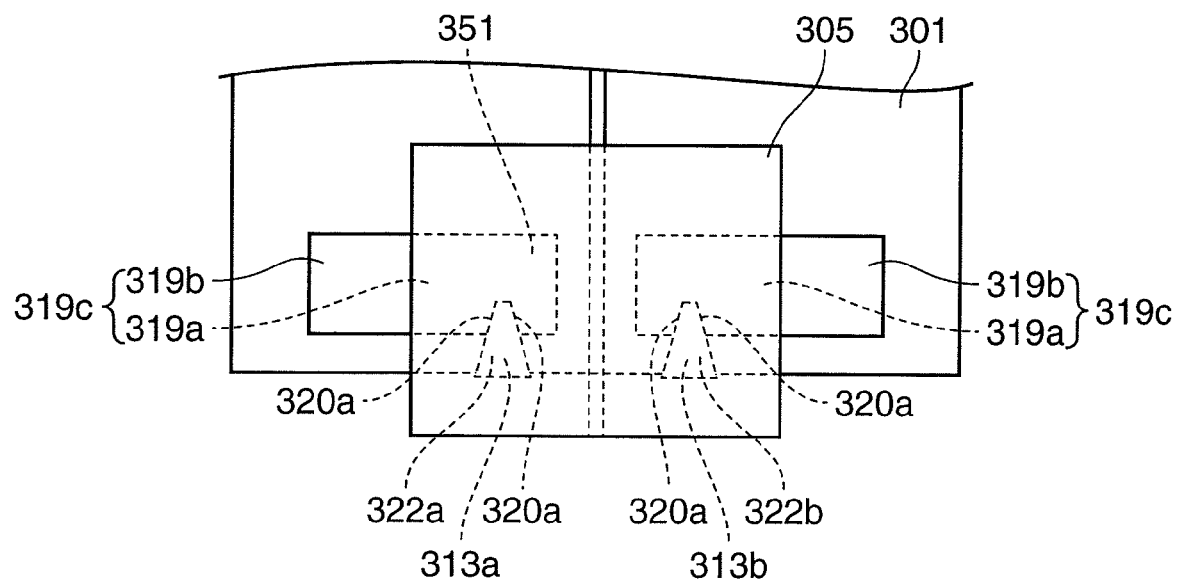

It is to be noted that the invention is not limited to the above-described arrangement of the present embodiment in which the adhesive filling recesses 319 are formed close to the left and right rear portions of each of the fitting recesses 313a, 313b but the arrangement may be modified as appropriate. FIGS. 8A and 8B show an example of an alternative arrangement in which, by analogy with the adhesive filling recesses 19 of the first embodiment (see FIGS. 3A and 3B), a pair of adhesive filling recesses 319c each having an adhesive filling portion 319a and an adhesive inlet 319b are formed in a top surface of the mounting substrate 301, the adhesive filling portions 319a connecting to forward ends (rear ends) of the respective fitting recesses 313a, 313b.

Also, in this variation of the embodiment, the lap joint portion 305 of the external waveguide substrate 2 is configured such that fitting tabs 322a, 322b formed on the lap joint portion 305 each have bonding areas 320a close to front ends of left- and right-side contact walls 322c, 322d.

In the variation of third embodiment thus configured, the mounting substrate 301 and the external waveguide substrate 2 are joined by fitting the fitting tabs 322a, 322b of the lap joint portion 305 of the latter into the fitting recesses 313a, 313b of the former. After the mounting substrate 301 and the external waveguide substrate 2 have been so joined, the adhesive is filled into the adhesive filling portions 319a through the respective adhesive inlets 319b. The adhesive penetrates into the adhesive filling portions 319a of the adhesive filling recesses 319c by capillary action so that the bonding areas 320a of the fitting tabs 322a, 322b and part of a contact surface 351 (bottom side) of the lap joint portion 305 are bonded to the top of the mounting substrate 301.

Figure 9:
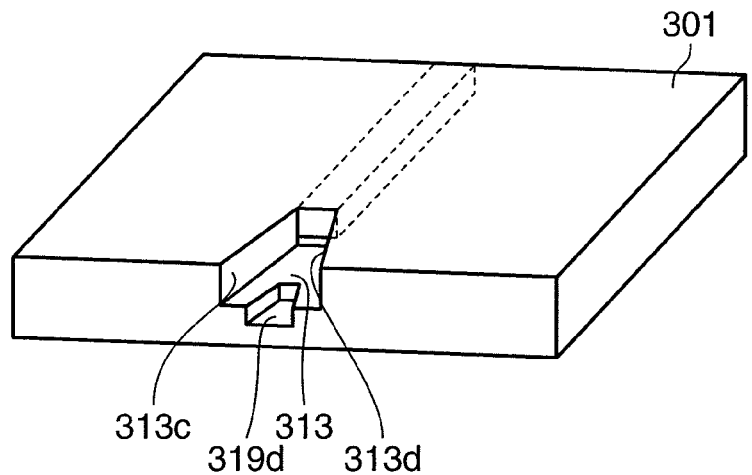
FIG. 9 is an enlarged fragmentary perspective view of an emitter-side mounting substrate having an adhesive filling recess formed therein according to another variation of the third embodiment.

As an another alternative, the above-described configuration of the third embodiment may be modified as shown in FIG. 9. Specifically, the emitter-side mounting substrate 301 may have a single fitting recess 313 of which bottom is partially cut downward to form an adhesive filling recess 319d further recessed beneath the bottom of the fitting recess 313 as illustrated.

Fourth Embodiment

An optical module according to a fourth embodiment of the invention is now described with reference to FIGS. 10A and 10B. The optical module of this embodiment is configured such that a pair of adhesive bonding projections 452 is formed on a lap joint portion 405 of an external waveguide substrate 2, the adhesive bonding projections 452 protruding downward from a contact surface 451 (bottom side) of the lap joint portion 405 toward respective adhesive filling recesses 19 formed in a top surface of an emitter-side mounting substrate 1.

Under conditions where fitting tabs 422a, 422b formed on the external waveguide substrate 2 are fitted into fitting recesses 413a, 413b formed in the mounting substrate 1, respectively, the adhesive bonding projections 452 are fitted into adhesive filling portions 19a of the respective adhesive filling recesses 19 in the top surface of the mounting substrate 1 and bonded thereto by the adhesive filled into the adhesive filling portions 19a. The above-described configuration of the fourth embodiment is advantageous in that it is possible to securely join the mounting substrate 1 and the external waveguide substrate 2 to each other. This is because the external waveguide substrate 2 is bonded to the mounting substrate 1 by the adhesive bonding projections 452 of which effective bonding area can be made larger than in the earlier-described configuration of the first embodiment which is not provided with the adhesive bonding projections 452 or the like.

Figure 10A:
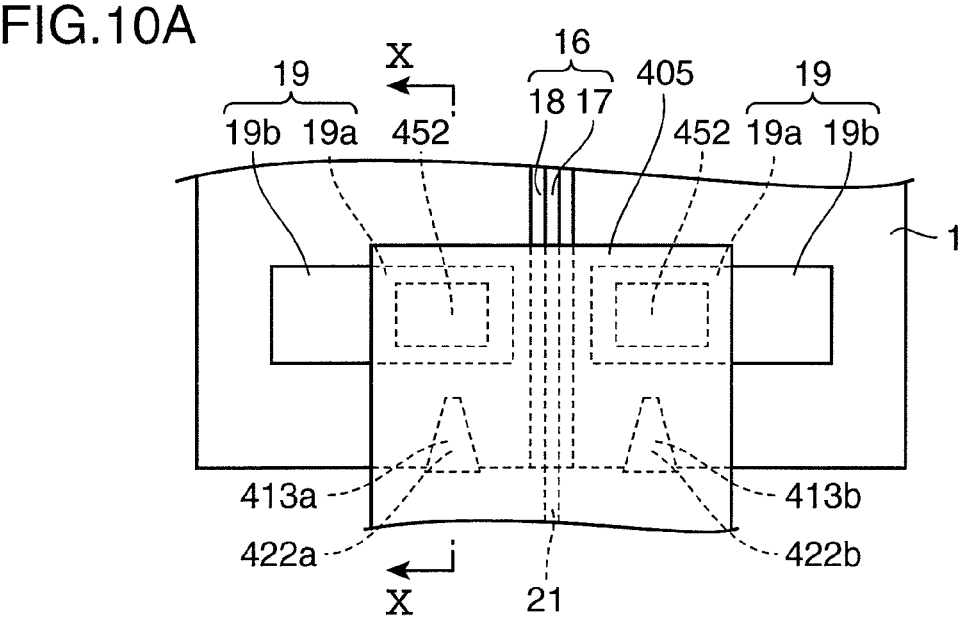
Figure 10B:
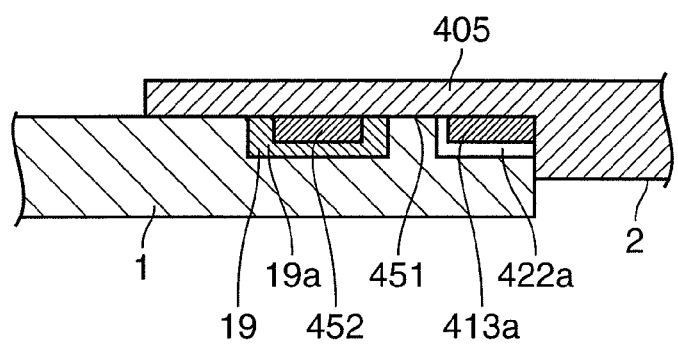
Figure 11A:
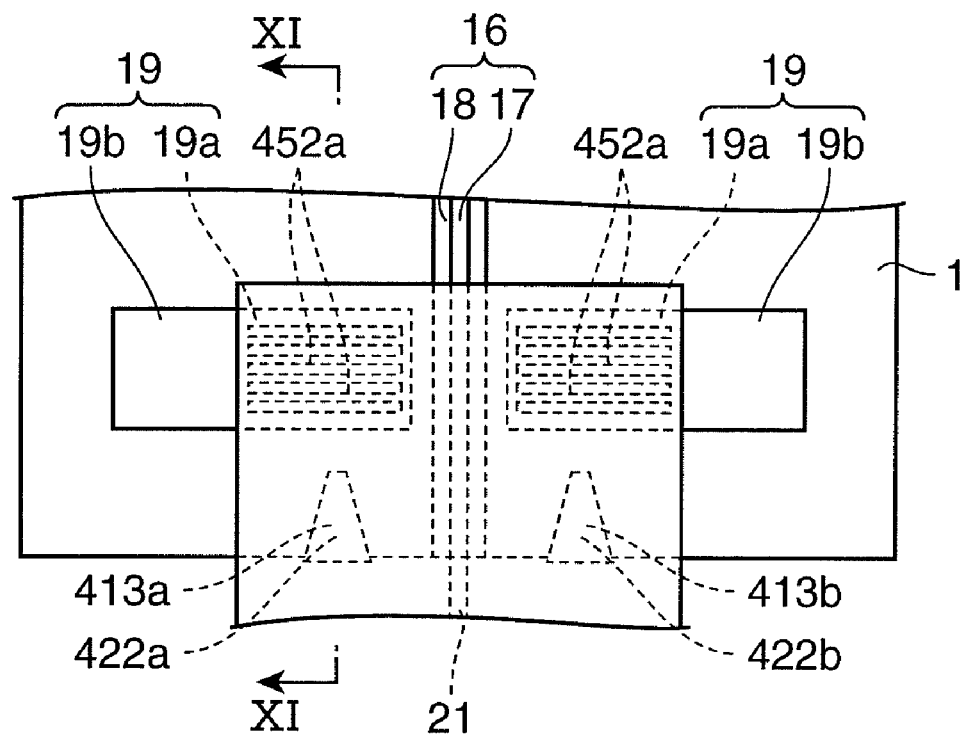
Figure 11B:
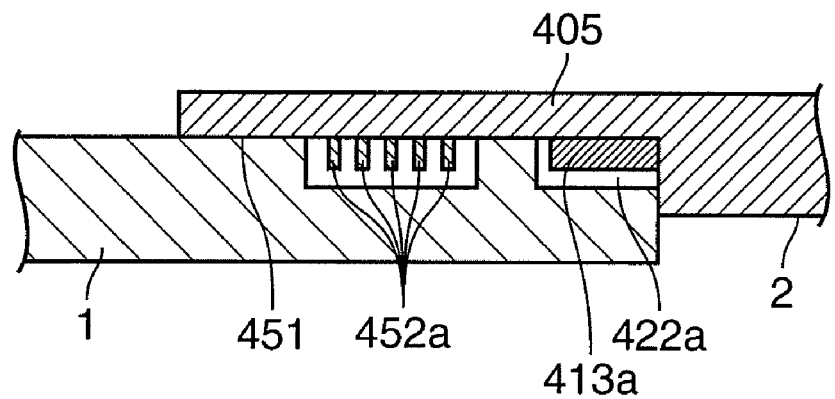

It is to be noted that the invention is not limited to the above-described arrangement of the present embodiment in which one each adhesive bonding projection 452 is formed on left and right sides of a core 21 of the external waveguide substrate 2 as shown in FIG. 10A but the arrangement may be modified as appropriate. For example, shown in FIGS. 11A and 11B is a variation of the fourth embodiment in which a plurality of adhesive bonding projections 452a are formed on each side (left and right) of the core 21 of the external waveguide substrate 2. There are formed five adhesive bonding projections 452a on each side in the illustrated example of FIGS. 11A and 11B. An arrangement including a plurality of adhesive bonding projections 452a is preferable because this kind of arrangement can provide a yet larger adhesive bonding area and, thus, more securely join the mounting substrate 1 and the external waveguide substrate 2 to each other.

According to the invention, the adhesive bonding projections 452 (452a) are not limited to quadratic prism projections in shape but may be formed into a cylindrical or triangular prism shape, for example. Also, the adhesive bonding projections 452 (452a) need not necessarily be formed on the bottom side of the lap joint portion 405 of the external waveguide substrate 2 but may be formed in the adhesive filling portions 19a of the adhesive filling recesses 19 in the top surface of the mounting substrate 1.

Furthermore, instead of forming the adhesive bonding projections 452 (452a) on the contact surface 451 (bottom side) of the lap joint portion 405 of the external waveguide substrate 2, the contact surface 451 (bottom side) of the lap joint portion 405 may be formed into a rough surface having protrusions and hollows. This arrangement also serves to increase the adhesive bonding area and securely bond the contact surface 451 to the top surface of the mounting substrate 1. For example, a rough surface can be made on the contact surface 451 (bottom side) of the lap joint portion 405 by forming a few μm of protrusions and hollows thereon, and such a rough surface can be formed at the same time as the lap joint portion 405 is formed on the external waveguide substrate 2.

A rough surface may be formed on the top surface of the emitter-side mounting substrate 1 instead of the bottom side of the lap joint portion 405. In a case where the mounting substrate 1 is made of a plastic, the rough surface can be formed by etching a plastic surface of the mounting substrate 1. If the mounting substrate 1 is a silicon substrate, a rough surface can be formed by chemical etching or ion etching. Alternatively, a rough surface can also be formed on the plastic surface by partially removing fragments of the plastic by irradiating the plastic surface with a laser beam. It is possible to increase the adhesive bonding area and bond strength by roughening an relevant surface area in the aforementioned fashion.

Fifth Embodiment

Now, an optical module according to a fifth embodiment of the invention is described with reference to FIGS. 12A-12D, 13A-13D. The optical module of the fifth embodiment includes a mounting substrate 501 in which a pair of fitting recesses 513a, 513b and a core groove 517a for forming a core 517 are simultaneously formed and an external waveguide substrate 502 in which a pair of fitting tabs 522a, 522b and a core 521 are formed in a single structure. Methods of forming the mounting substrate 501 and the external waveguide substrate 502 in simultaneously form are described in detail below.

Figure 12A:
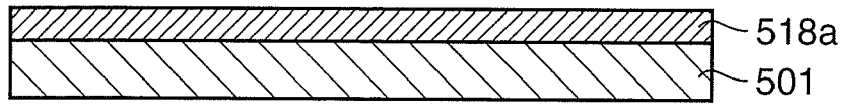

First, a one-piece forming procedure for simultaneously forming the fitting recesses 513a, 513b and the core groove 517a in the mounting substrate 501 is discussed referring to an experiment conducted by the inventors. Referring to FIG. 12A, a cladding material was applied to a top surface of the mounting substrate 501 by spin coating and a layer of the applied cladding material was exposed to light to form an underlying cladding layer 518a. Since the mounting substrate 501 is required to have strength to support devices mounted thereon and a sufficient degree of flatness to permit formation of a waveguide in the mounting substrate 501, a silicon substrate was used as the mounting substrate 501 of this embodiment. Also, a photosetting epoxy material was used as the cladding material in this embodiment.

Figure 12B:
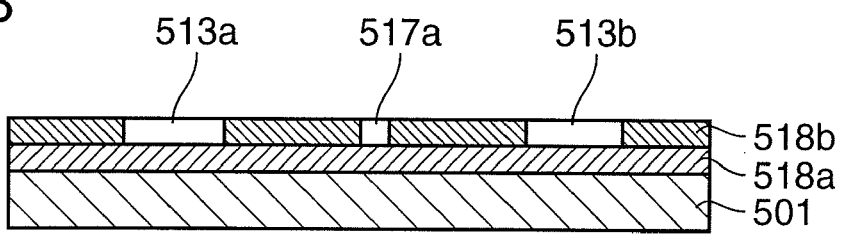

Subsequently, the same cladding material as used for forming the underlying cladding layer 518a was applied to form an outer cladding layer 518b on top of the underlying cladding layer 518a, and the core groove 517a and the fitting recesses 513a, 513b were formed in the outer cladding layer 518b by processing the same to create a prescribed pattern therein as shown in FIG. 12B.

Figure 12C:
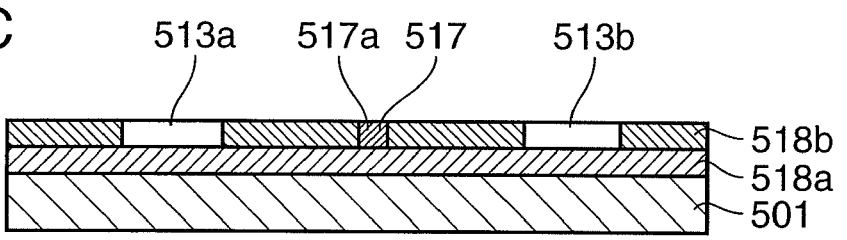
Figure 12D:
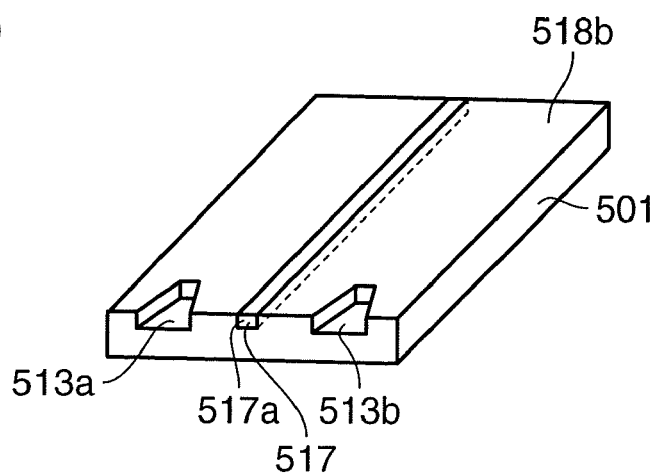

Then, a core material was filled into the core groove 517a and cured to form the core 517 as shown in FIG. 12C, as a result, the mounting substrate 501 having the pair of integrally formed fitting recesses 513a, 513b as shown in FIG. 12D was obtained.

The core material used was an epoxy material similar to the cladding material used for forming the underlying cladding layer 518a, the core material having a refractive index higher than the cladding material by as much as 0.02 to 0.10. The core material was cured by irradiating the same with ultraviolet light for 30 seconds to 3 minutes at an intensity of 30 mW/cm$^2$.

Figure 13A:
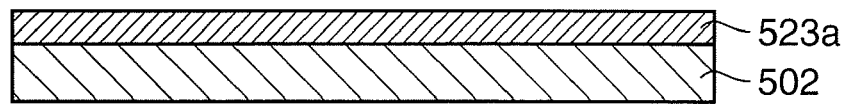
Figure 13B:
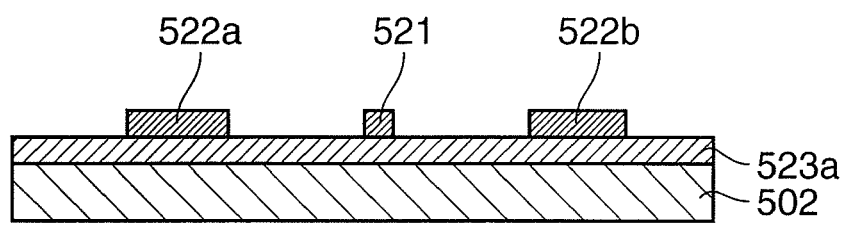
Figure 13C:
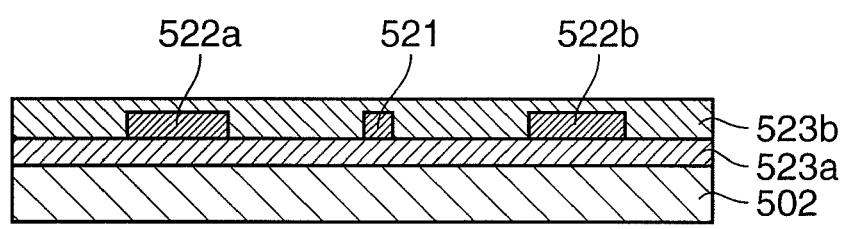

Next, a one-piece forming procedure for forming the fitting tabs 522a, 522b and the core 521 in the external waveguide substrate 502 is discussed referring to an experiment conducted by the inventors. Referring to FIG. 13A, a cladding material was applied to one side of the external waveguide substrate 502 to form an underlying cladding layer 523a, the cladding material being the same as used for forming the mounting substrate 501.

The external waveguide substrate 502 of this embodiment interconnects multiple devices and transmits signals therebetween so that the external waveguide substrate 502 is required to provide ease of handling and flexibility to durability of ambient conditions. To meet this requirement, a film material was used as the external waveguide substrate 502 of this embodiment. Specifically, a polyimide film used in a flexible board or, from a viewpoint of ease of later handling, a transparent film made of polyethylene terephthalate (PET) was used as a base material of the external waveguide substrate 502.

A photosetting epoxy material is used as the cladding material for forming the underlying cladding layer 523a. The external waveguide substrate 502 itself may be formed by the same cladding material, in which case the external waveguide substrate 502 is configured with the underlying cladding layer 523a alone.

Subsequently, a core material was applied by spin coating on top of the underlying cladding layer 523a and a layer of the spin-coated core material was exposed and developed to form the fitting tabs 522a, 522b and the core 521. The core material used is the same as used for forming the mounting substrate 501.

Figure 14A:
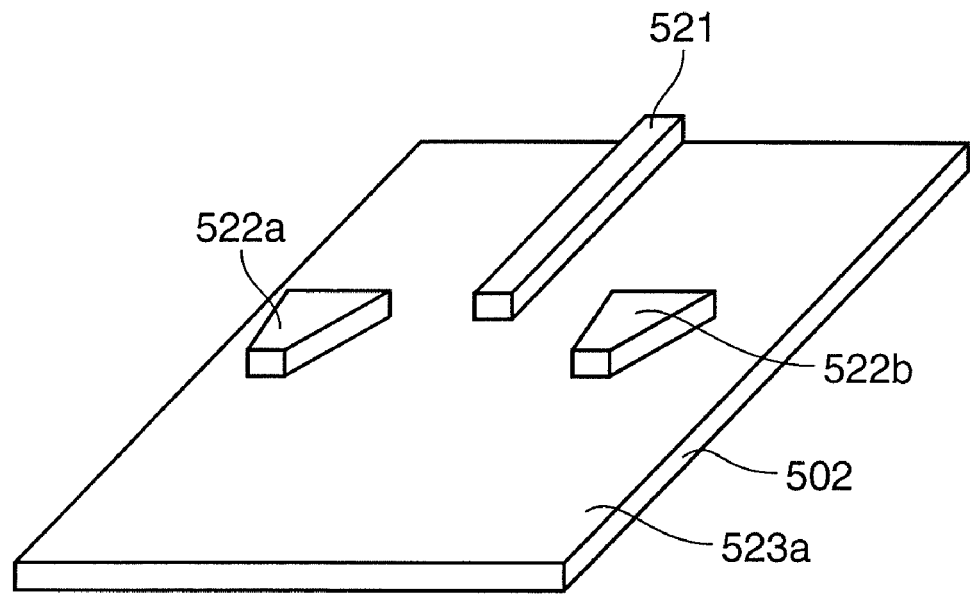
FIG. 14A is a perspective view showing a state in which fitting tabs have been formed on the external waveguide substrate of the fifth embodiment.
Figure 14B:
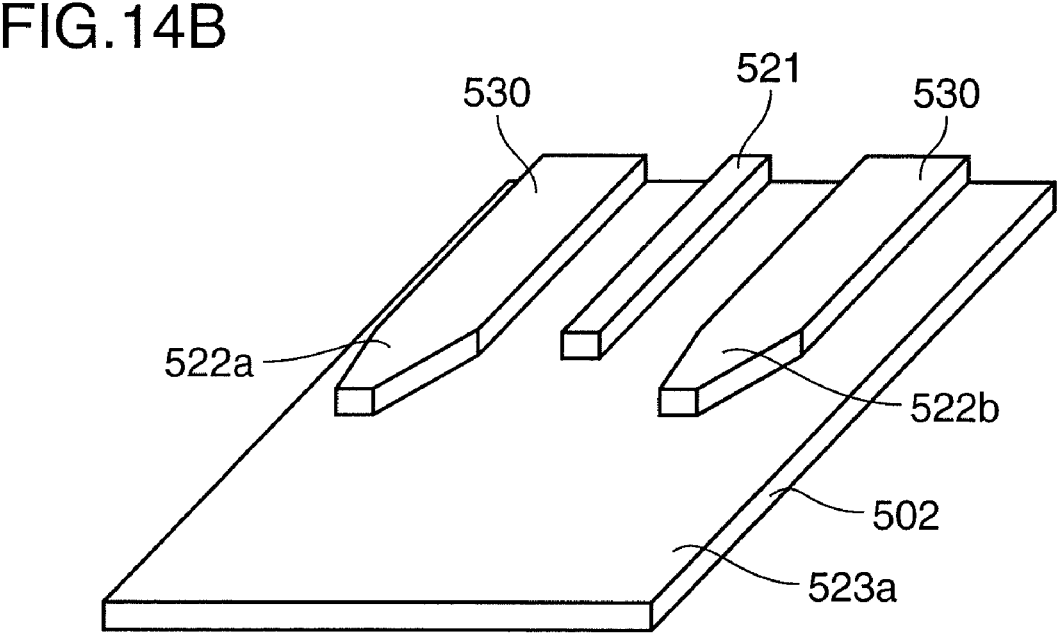
FIG. 14B is a perspective view of an external waveguide substrate with fitting tabs formed thereon according to one variation of the fifth embodiment.

While the fitting tabs 522a, 522b of the external waveguide substrate 502 may be simply dovetail-shaped (tapered) in plan view as depicted in FIG. 14A, the fitting tabs 522a, 522b may be formed integrally with respective prismatic-bar-shaped projections 530 extending generally parallel to the core 521 along a longitudinal direction thereof as depicted in FIG. 14B, the prismatic-bar-shaped projections 530 being made of the same material as used for forming the core 521.

The provision of the aforementioned prismatic-bar-shaped projections 530 serves to prevent mutual position offset of the fitting tabs 522a, 522b and the core 521. This is because the external waveguide substrate 502 will expand or shrink isotropically even when shrinkage on curing of resin or thermal expansion or shrinkage occurs.

Figure 13D:
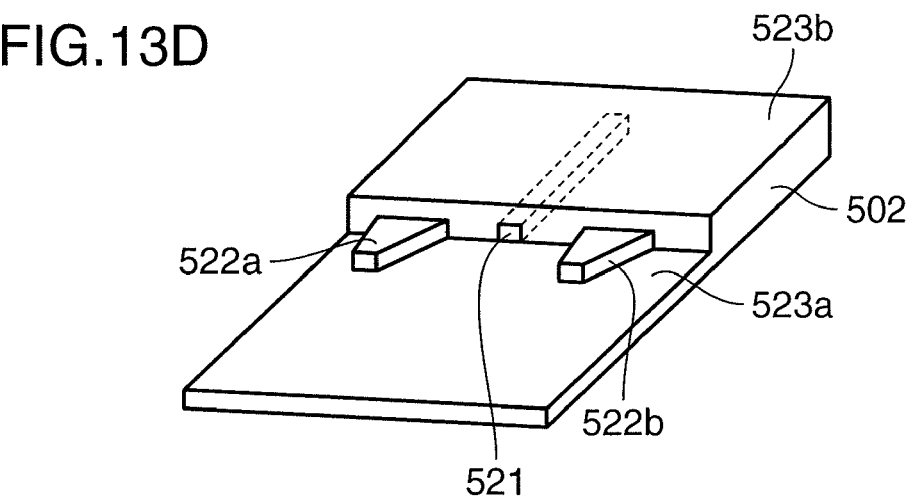

Finally, a cladding material was applied and a layer of the applied cladding material was exposed and developed to form an outer cladding layer 523b on top of the underlying cladding layer 523a, and the external waveguide substrate 502 having the integrally formed fitting tabs 522a, 522b and core 521 as shown in FIG. 13D was obtained.

While the photosetting epoxy material was used in the mounting substrate 501 and the external waveguide substrate 502 of the fifth embodiment as discussed above, the invention is not limited thereto. For example, it is possible to use a photosetting acrylic or silicone material or a thermosetting material instead of the photosetting epoxy material.

Also, while the core groove 517a and the two fitting recesses 513a, 513b were formed by spin coating using a spin coater and subsequent exposure and development in the above-described fifth embodiment, the core groove 517a and the fitting recesses 513a, 513b may be formed on the mounting substrate 501 by depositing a more or less thicker cladding layer while using a die, for example.

Sixth Embodiment

An optical module according to a sixth embodiment of the invention is now described with reference to FIGS. 15A and 15B. The optical module of this embodiment comprises an emitter-side mounting substrate 601 having a pair of fitting recesses 613a, 613b formed in specified areas of a top surface thereof. These areas of the top surface of the mounting substrate 601 where the fitting recesses 613a, 613b are formed are made of a material different from a base material of the mounting substrate 601. A procedure for producing such a configuration is described in detail below.

Figure 15A:
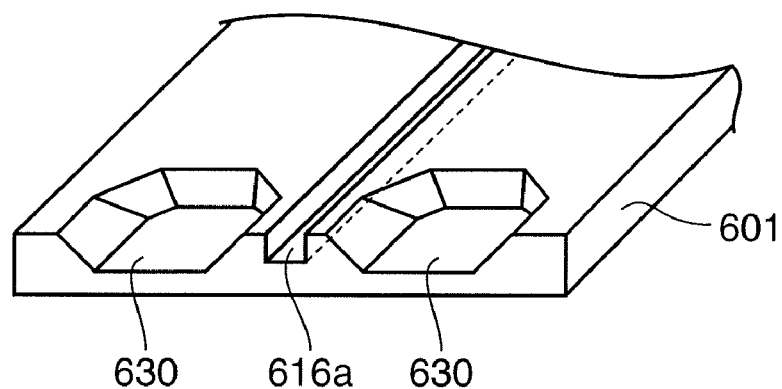

Referring first to FIG. 15A, two fitting recess forming cavities 630, 630 are formed in left and right rear portions of the top surface of a silicon substrate constituting the mounting substrate 601, wherein the two fitting recess forming cavities 630 are hollows having larger surface areas than the fitting recesses 613a, 613b and a greater depth than an intended depth thereof below the top surface of the mounting substrate 601. Also, a waveguide forming groove 616a having a rectangular cross section is formed in the top surface of the mounting substrate 601, the waveguide forming groove 616a running generally along a longitudinal center line of the mounting substrate 601. The aforementioned fitting recess forming cavities 630 and waveguide forming groove 616a can be formed by an etching process, for example.

The mounting substrate 601 of this embodiment has a thickness between 300 μm and 500 μm, and each of the fitting recess forming cavities 630 is approximately 40 μm to 100 μm long and wide as measured along a longitudinal direction and a left-right direction of the mounting substrate 601, respectively.

Figure 15B:
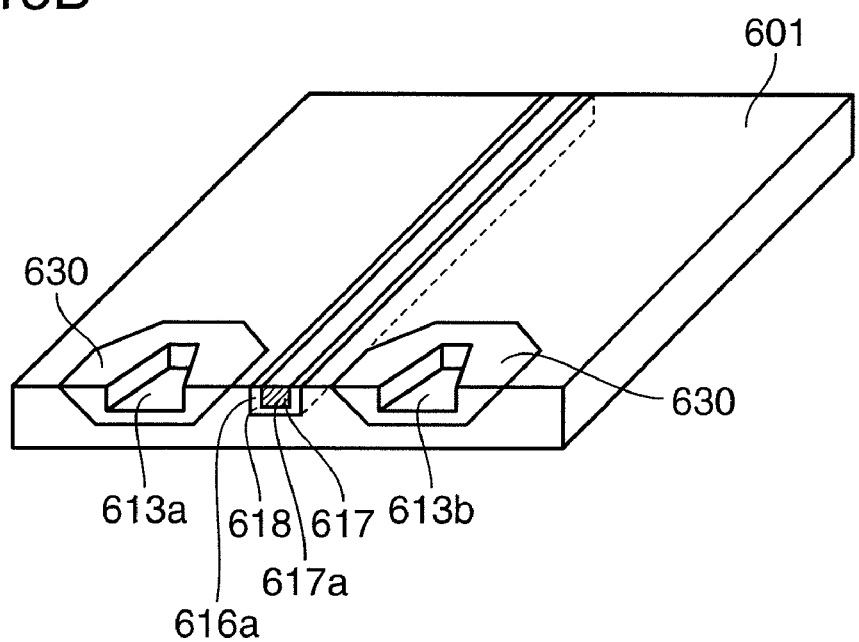

Next, referring to FIG. 15B, the fitting recess forming cavities 630 and the waveguide forming groove 616a are filled with a cladding material and, then, the aforementioned fitting recesses 613a, 613b and a cladding 618 having a rectangular-shaped cross section are formed in the top surface of the mounting substrate 601 by press-forming the cladding material filled therein by using a die having a pair of fitting recess forming shapes and a cladding forming shape.

Subsequently, a core 617 of the mounting substrate 601 is formed by filling a core material into a core groove 617a formed within the cladding 618. It is to be pointed out that the material filled into the fitting recess forming cavities 630 for forming the fitting recesses 613a, 613b is not limited to the aforementioned cladding material but may be selected as appropriate. The fitting recesses 613a, 613b of this embodiment has approximately the same dimensions as the fitting recesses 13a, 13b of the earlier-described first embodiment.

According to the sixth embodiment discussed above, it is possible to form the left- and right-side fitting recesses 613a, 613b simultaneously with the core groove 617a in the aforementioned fashion. This ensures that the fitting recesses 613a, 613b would be located at exact positions relative to the core 617.

Since the fitting recesses 613a, 613b are formed in the cladding material filled into the fitting recess forming cavities 630 of the mounting substrate 601, it is possible to form the fitting recesses 613a, 613b by hollowing the cladding material downward from the top surface of the mounting substrate 601. If the fitting recesses 613a, 613b are to be formed in a cladding layer deposited on top of the mounting substrate 601 by using an embossing die as in the foregoing fifth embodiment, for instance, it is necessary to form the cladding layer on the top surface of the mounting substrate 601 so that it would be difficult to reduce the overall thickness of the finished mounting substrate 601.

According to the above-described configuration of the sixth embodiment, however, the overall thickness of the finished mounting substrate 601 is defined by the thickness of the silicon substrate used for constituting the mounting substrate 601 alone. This makes it easier to achieve a reduction in the overall size and thickness of the finished mounting substrate 601. While a top surface of each fitting recess forming cavity 630 is made generally flush with the top surface of the mounting substrate 601 in the above-described sixth embodiment, this configuration may be modified such that the former is higher or lower than the latter.

Seventh Embodiment

Figure 16A:
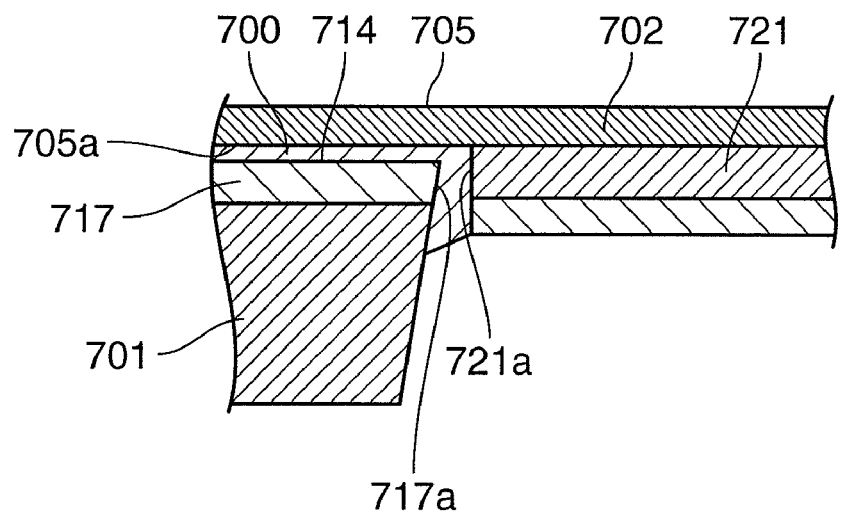

An optical module according to a seventh embodiment of the invention is described with reference to FIGS. 16A and 16B. As shown in FIG. 16A, the optical module of this embodiment comprises an emitter-side mounting substrate 701 having a core 717 formed therein and an external waveguide substrate 702. In this embodiment, a first butt surface 717a of a core 717 formed in the mounting substrate 701 is a slant surface which is inclined such that the distance between the first butt surface 717a and a core 721 formed in the external waveguide substrate 702 gradually decreases upward toward a lap joint portion 705 of the mounting substrate 701.

According to this configuration of the seventh embodiment, there is created an adhesive layer 700 between the emitter-side mounting substrate 701 and the lap joint portion 705 when the mounting substrate 701 is attached to the lap joint portion 705 of the external waveguide substrate 702 by adhesive. A result of this configuration is that even when the core 717 of the emitter-side mounting substrate 701 is located at a position lower than the core 721 of the external waveguide substrate 702, light propagating through the core 717 of the mounting substrate 701 toward the external waveguide substrate 702 is refracted obliquely upward at the first butt surface 717a and enters the core 721 of the external waveguide substrate 702 through a second butt surface 721a thereof. This feature of the embodiment helps reduce optical coupling loss.

Figure 16B:
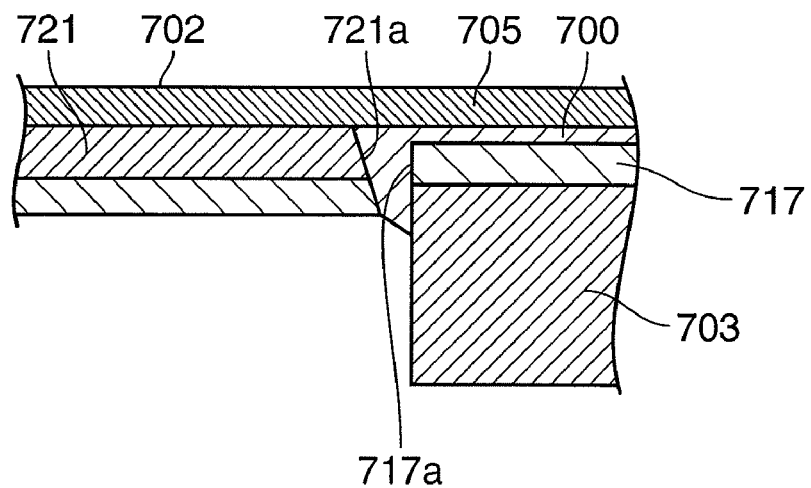

On the other hand, as shown in FIG. 16B, a second butt surface 721a of the core 721 formed in the external waveguide substrate 702 that abuts a first butt surface 717a of a core 717 formed in a receiver-side mounting substrate 703 is also a slant surface which is inclined such that the distance between the second butt surface 721a of the core 721 formed in the external waveguide substrate 702 and the core 717 formed in the receiver-side mounting substrate 703 gradually increases upward toward a lap joint portion 705 of the mounting substrate 703.

The adhesive layer 700 is also formed between the receiver-side mounting substrate 703 and the lap joint portion 705. A result of this configuration is that even when the core 717 of the receiver-side mounting substrate 703 is located at a position lower than the core 721 of the external waveguide substrate 702, light propagating through the core 721 of the external waveguide substrate 702 toward the mounting substrate 703 is refracted obliquely downward at the second butt surface 721a and enters the core 717 of the receiver-side mounting substrate 703. This feature of the embodiment also helps reduce optical coupling loss.

Eighth Embodiment

Figure 17A:
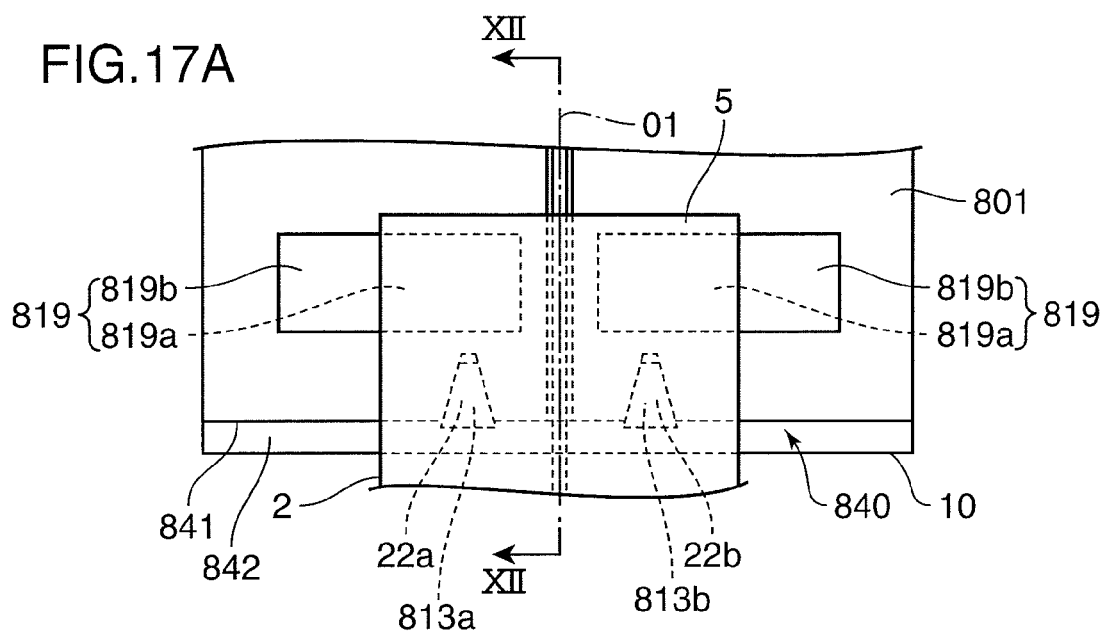
Figure 17B:
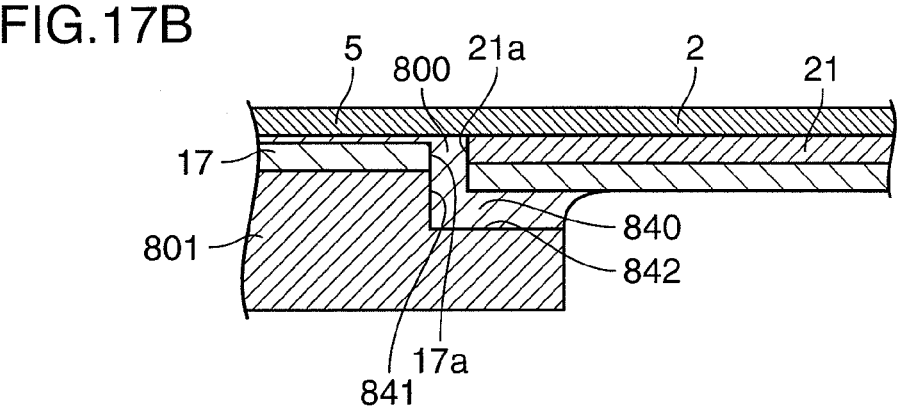
Figure 17C:
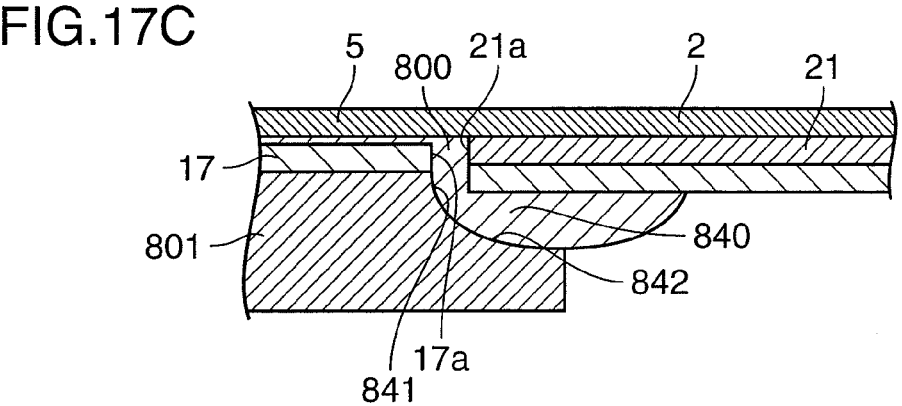

An optical module according to an eighth embodiment of the invention is now described with reference to FIGS. 17A-17C. As shown in FIGS. 17A and 17B, the optical module of this embodiment comprises an emitter-side mounting substrate 801 of which rear end 10 is shaped to form a socket 840 into which a front end of an external waveguide substrate 2 is fitted and attached.

Specifically, the aforementioned socket 840 is formed by cutting an upper part of the rear end 10 of the emitter-side mounting substrate 801 all along the width thereof, the socket 840 having a side surface (a vertical surface) 841 which is generally perpendicular to an axis O1 of a core 17 formed in the emitter-side mounting substrate 801 and a bottom surface 842 formed generally at right angles to the side surface 841. A first butt surface 17a of the core 17 is generally flush with the side surface 841 of the socket 840.

The emitter-side mounting substrate 801 of this embodiment is provided with a pair of adhesive filling recesses 819 having essentially the same configuration as the adhesive filling recesses 19 of the emitter-side mounting substrate 1 of the earlier-described first embodiment.

When the emitter-side mounting substrate 801 and the external waveguide substrate 2 are mated with each other, fitting tabs 22a, 22b formed on a lap joint portion 5 of the external waveguide substrate 2 fit into fitting recesses 813a, 813b formed in the emitter-side mounting substrate 801. Adhesive 800 is filled into the adhesive filling recesses 819 of the mounting substrate 801 through adhesive inlets 819b thereof as well as into the socket 840 from both sides (left and right) of the lap joint portion 5 of the external waveguide substrate 2. The adhesive 800 penetrates into a gap between the socket 840 and the external waveguide substrate 2 by capillary action whereby the rear end 10 of the mounting substrate 801 and the front end of the external waveguide substrate 2 can be bonded to each other.

According to the above-described configuration of the eighth embodiment, it is possible to bond the mounting substrate 1 and the external waveguide substrate 2 to each other not only at the adhesive filling recesses 819 but also at the socket 840, thus producing an increased adhesive bonding area and greater bond strength. This configuration also ensures that a second butt surface 21a of a core 21 of the external waveguide substrate 2 would not be separately from the first butt surface 17a of the core 17 of emitter-side mounting substrate 1 when the external waveguide substrate 2 is warped.

If the emitter-side mounting substrate 1 has a thickness of 500 μm and the external waveguide substrate 2 has a thickness of 50 μm to 400 μm, for example, the socket 840 should be 50 μm to 400 μm deep. A method of forming the socket 840 on the mounting substrate 801 is not particularly limited. For example, a half cutting dicing technique or a dry etching technique, such as reactive ion etching (RIE) process, may be used for forming the socket 840. Furthermore, the socket 840 is not limited to the shape shown in FIG. 17B but may be shaped to have a curved surface along the aforementioned side surface 841 and bottom surface 842 as depicted in FIG. 17C, for example.

Ninth Embodiment

Figure 18A:
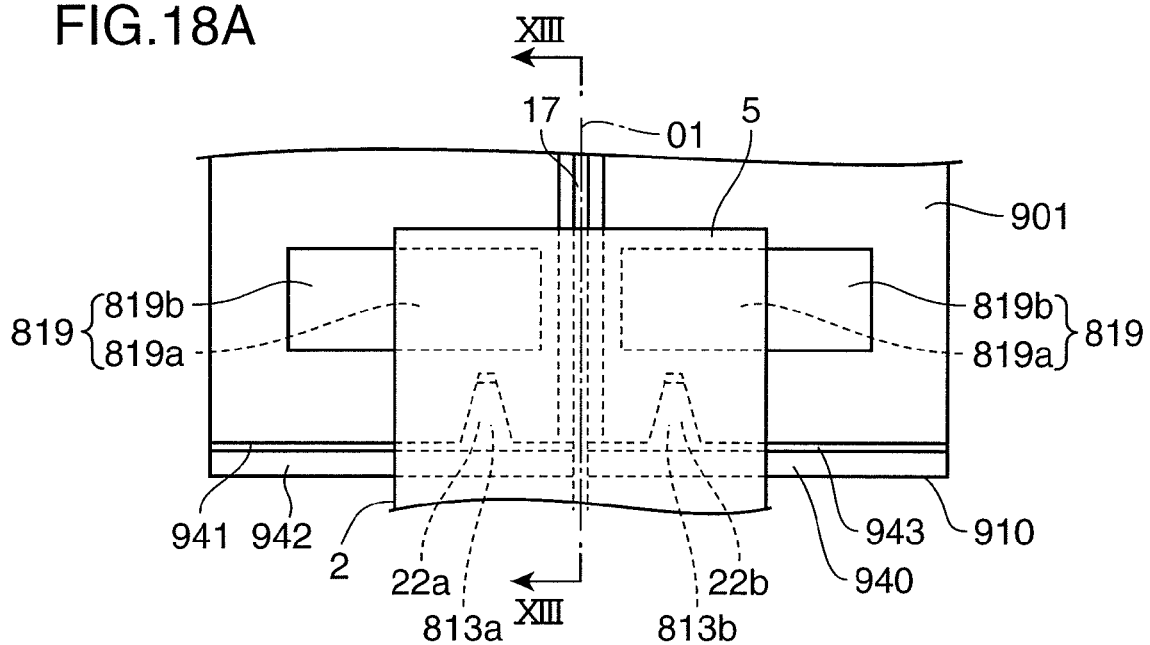
Figure 18B:
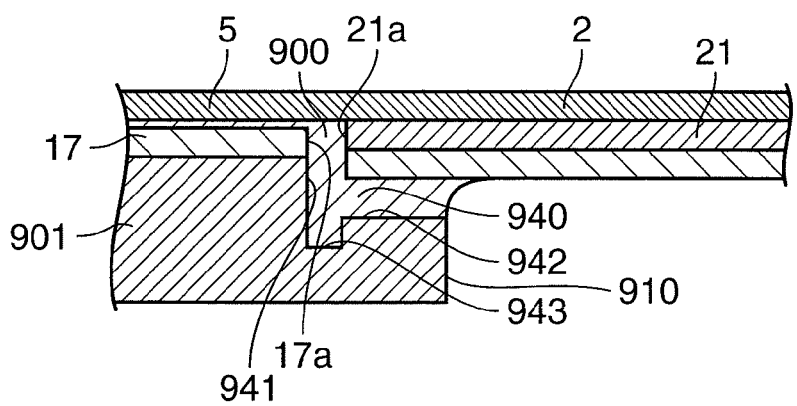
Figure 18C:
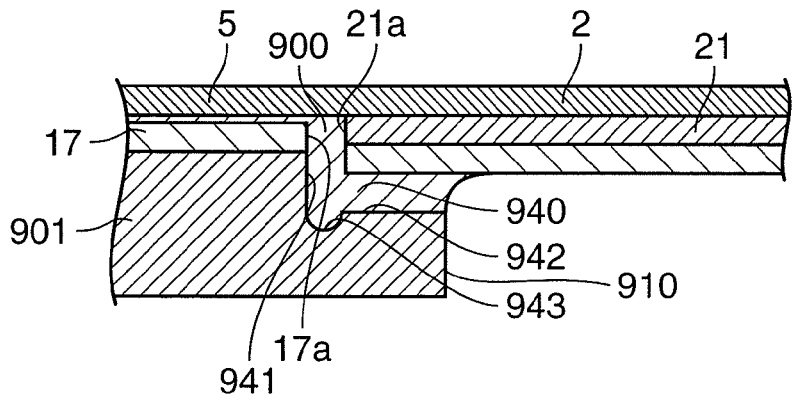

An optical module according to a ninth embodiment of the invention is now described with reference to FIGS. 18A-18C. As shown in FIGS. 18A and 18B, the optical module of this embodiment comprises an emitter-side mounting substrate 901 which is shaped to form a socket 940 provided with a groove 943 formed therein and an external waveguide substrate 2.

Specifically, the socket 940 formed in the emitter-side mounting substrate 901 of the ninth embodiment has basically the same configuration as the socket 840 of the above-described configuration of the eighth embodiment. What is characteristic of the ninth embodiment is that the aforementioned groove 943 is formed in a bottom surface 942 of the socket 940. The groove 943 is formed to a specific depth and width along a side surface (a vertical surface) 941 of the socket 940.

According to this configuration of the ninth embodiment, the adhesive applied to the socket 940 can easily enter the groove 943 by capillary action. Additionally, the adhesive which has once entered the groove 943 would not easily go out of the groove 943 due to anchoring effect and this serves to produce an increased bond strength.

While the depth of the aforementioned groove 943 is not particularly limited, a greater effect would be obtained if the groove 943 is 10 μm to 200 μm deep. The width of the groove 943 is not particularly limited either, so that the groove 943 may be formed all along the width of the socket 940 (mounting substrate 901) or generally along the width of the external waveguide substrate 2, for example.

Furthermore, the aforementioned groove 943 is not limited to a particular shape. The groove 943 need not necessarily have a rectangular cross section as shown in FIG. 18B but may be modified to have a different cross-sectional shape as appropriate, such as a semicircular cross section as shown in FIG. 18C, for example. As already discussed with reference to the foregoing eighth embodiment, the groove 943 may be formed by the half cutting dicing technique or dry etching technique, such as the RIE process, for instance.

Tenth Embodiment

Figure 19A:
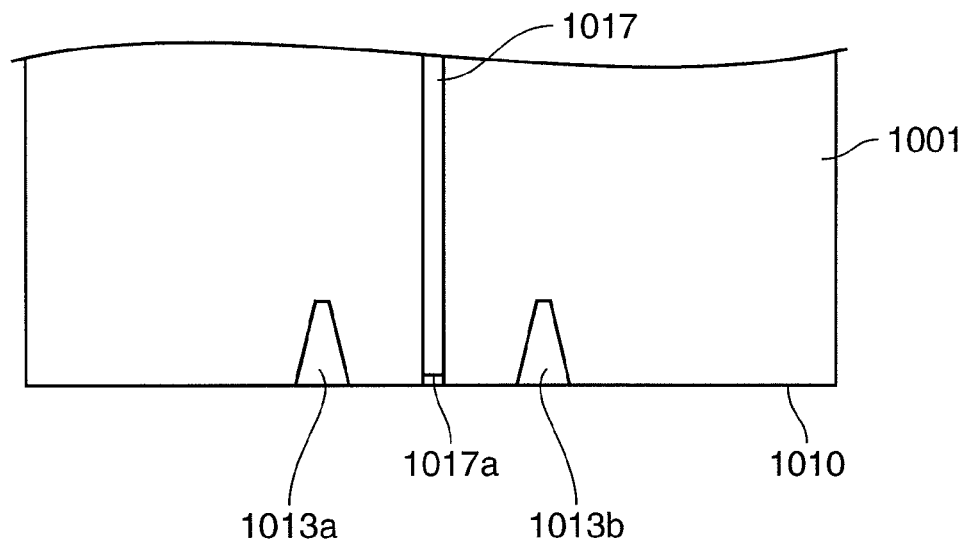
Figure 19B:
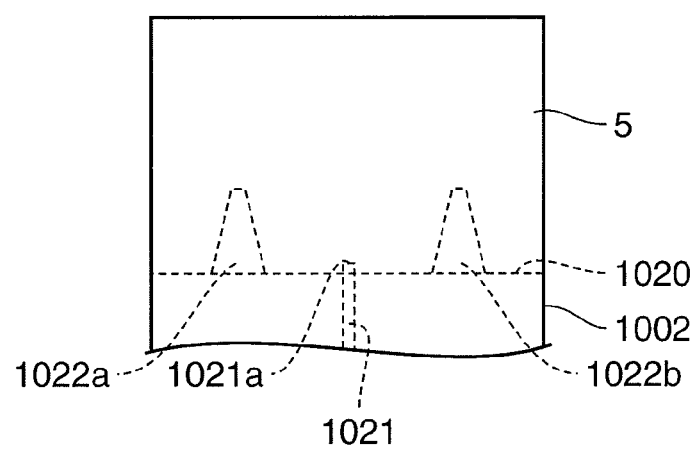

An optical module according to a tenth embodiment of the invention is now described with reference to FIGS. 19A and 19B. As shown in FIG. 19A, the optical module of this embodiment comprises an emitter-side mounting substrate 1001 provided with a core 1017 formed therein, of which first butt surface 1017a is formed at a location determined in relation to fitting recesses 1013a, 1013b formed in the mounting substrate 1001. In this embodiment, the first butt surface 1017a of the core 1017 is located inward behind a rear end 1010 of the mounting substrate 1001 by a specific distance as illustrated.

The optical module also comprises an external waveguide substrate 1002 which is configured such that a second butt surface 1021a of a core 1021 formed in the external waveguide substrate 1002 is formed at a location determined in relation to fitting tabs 1022a, 1022b formed on the external waveguide substrate 1002. Specifically, the core 1021 is configured to project frontward so that the second butt surface 1021a is located to the front of a front end 1020 of the external waveguide substrate 1002 as depicted in FIG. 19B.

If, for example, the emitter-side mounting substrate 1001 and the external waveguide substrate 1002 are configured such that the first butt surface 1017a of the core 1017 of the mounting substrate 1001 is located flush with the rear end 1010 thereof and the second butt surface 1021a of the core 1021 of the external waveguide substrate 1002 is located flush with the front end 1020 thereof, it is likely that manufacturing errors occur in the overall length of the emitter-side mounting substrate 1001, resulting in variations in locations of the rear end 1010 and the fitting recesses 1013a, 1013b of the emitter-side mounting substrate 1001.

This would cause a problem that the first butt surface 1017a of the core 1017 of the emitter-side mounting substrate 1001 and the second butt surface 1021a of the core 1021 of the external waveguide substrate 1002 interfere with each other before the fitting tabs 1022a, 1022b of the external waveguide substrate 1002 can be fitted into the fitting recesses 1013a, 1013b of the emitter-side mounting substrate 1001, respectively. Even if the emitter-side mounting substrate 1001 and the external waveguide substrate 1002 could be joined together with the fitting tabs 1022a, 1022b of the latter fitted into the fitting recesses 1013a, 1013b of the former, an irregular gap would be produced between the first and second butt surfaces 1017a, 1021a.

According to the above-described configuration of the tenth embodiment, however, it is possible to always locate the second butt surface 1021a of the core 1021 of the external waveguide substrate 1002 at a fixed position relative to the first butt surface 1017a of the core 1017 of the emitter-side mounting substrate 1001 regardless of the location of the rear end 1010 of the emitter-side mounting substrate 1001. This serves to provide an improved optical coupling efficiency. While a prescribed range of the distance between the first butt surface 1017a and the rear end 1010 is approximately 20 μm to 100 μm if only the manufacturing error is taken into consideration, the distance may be of 100 μm to 3 mm according to the present embodiment of the invention, because the configuration of this embodiment allows for a high degree of freedom in design with respect to an overall arrangement pattern of the optical module.

Eleventh Embodiment

Figure 20A:
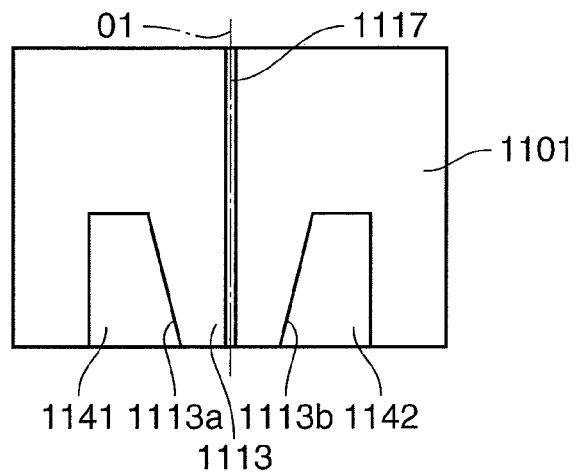
Figure 20B:
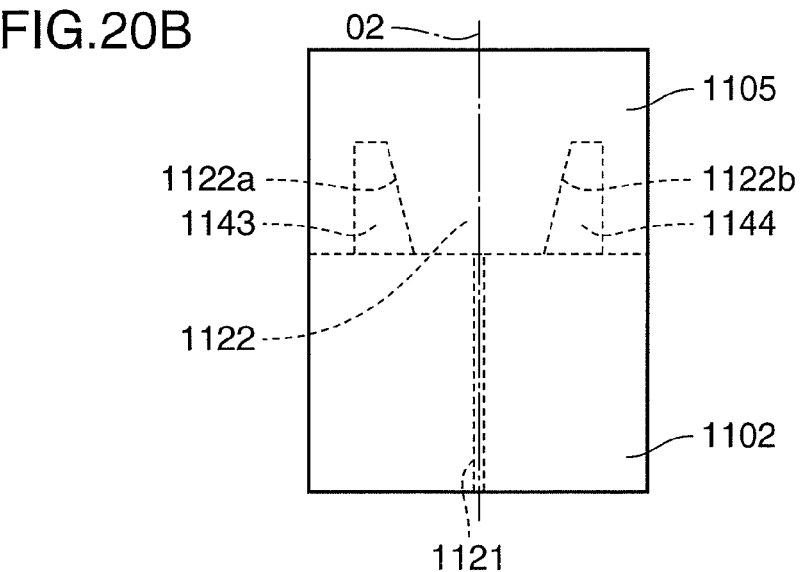
Figure 20C:
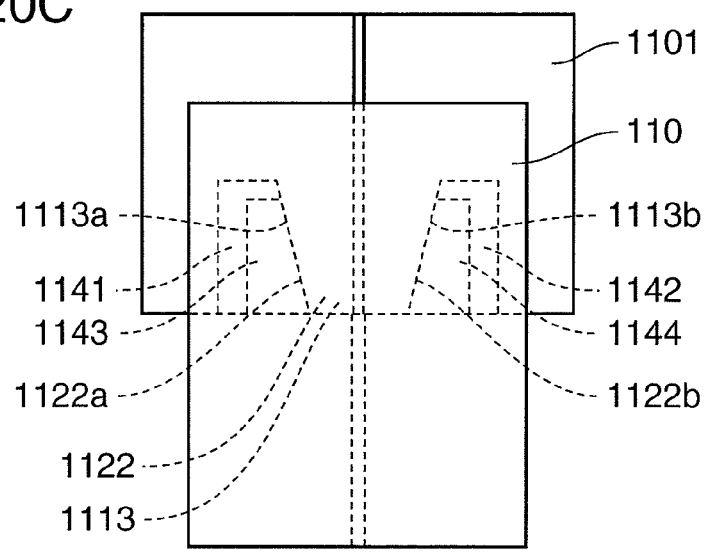

An optical module according to an eleventh embodiment of the invention is now described with reference to FIGS. 20A-20C. The optical module of this embodiment comprises an emitter-side mounting substrate 1101 which is provided with one fitting tab 1113 as shown in FIG. 20A and an external waveguide substrate 1102 of which lap joint portion 1105 is provided with one fitting recess 1122 as shown in FIG. 20B.

The emitter-side mounting substrate 1101 of the eleventh embodiment has a left-side recess 1141 and a right-side recess 1142 which are provided on left and right sides of a core 1117 formed in the mounting substrate 1101, respectively.

A right-hand inner surface of the left-side recess 1141 forms a surface oriented at a specific oblique angle relative to a longitudinal axis O1 of the core 1117. This obliquely oriented surface constitutes a first contact surface 1113a which goes into contact with a below-described first oblique surface 1122a of the fitting recess 1122 of the lap joint portion 1105. Likewise, a left-hand inner surface of the right-side recess 1142 constitutes a second contact surface 1113b which goes into contact with a below-described second oblique surface 1122b of the fitting recess 1122 of the lap joint portion 1105. As depicted in FIG. 20A, the first and second contact surfaces 1113a, 1113b are located symmetrically on left and right sides the axis O1. The first and second contact surfaces 1113a, 1113b thus structured together form the aforementioned fitting tab 1113 which is generally dovetail-shaped in plan view, gradually widening frontward (upward in FIG. 20A).

On the other hand, the lap joint portion 1105 of the external waveguide substrate 1102 of the eleventh embodiment has a left-side tab 1143 and a right-side tab 1144 which are provided on left and right sides of a core 1121 formed in the external waveguide substrate 1102, respectively.

The left-side tab 1143 of the external waveguide substrate 1102 has a proper size and shape to fit into the left-side recess 1141 of the mounting substrate 1101. A right-hand side surface of the left-side tab 1143 is located relative to an axis O2 of the core 1121 of the external waveguide substrate 1102 in the same way as the first contact surface 1113a of the mounting substrate 1101 is located relative to the axis O1 of the core 1117 of the mounting substrate 1101. The right-hand side surface of the left-side tab 1143 thus structured constitutes the aforementioned first oblique surface 1122a. Likewise, the right-side tab 1144 of the external waveguide substrate 1102 has a proper size and shape to fit into the right-side recess 1142 of the mounting substrate 1101. A left-hand side surface of the right-side tab 1144 is located relative to an axis O2 of the core 1121 of the external waveguide substrate 1102 in the same way as the second contact surface 1113b of the mounting substrate 1101 is located relative to the axis O1 of the core 1117 of the mounting substrate 1101. The left-hand side surface of the right-side tab 1144 thus structured constitutes the aforementioned second oblique surface 1122b. The first and second oblique surfaces 1122a, 1122b together form the aforementioned fitting recess 1122 which is generally dovetail-shaped in plan view, gradually widening frontward (upward in FIG. 20B).

To join the emitter-side mounting substrate 1101 and the external waveguide substrate 1102 thus configured, the external waveguide substrate 1102 is relatively moved toward the mounting substrate 1101 from the rear side thereof so that the left- and right-side tabs 1143, 1144 on the lap joint portion 1105 fit into the left- and right-side recesses 1141, 1142 of the mounting substrate 1101, respectively. As a result, the first and second oblique surfaces 1122a, 1122b of the lap joint portion 1105 go into contact with the first and second contact surfaces 1113a, 1113b of the emitter-side mounting substrate 1101 as depicted in FIG. 20C, as a result, the fitting tab 1113 of the emitter-side mounting substrate 1101 is fitted into the fitting recess 1122 formed in the lap joint portion 1105 of the external waveguide substrate 1102.

Twelfth Embodiment

An optical module according to a twelfth embodiment of the invention is now described with reference to FIGS. 21-23. The optical module of this embodiment comprises an emitter-side mounting substrate 1201 and an external waveguide substrate 1202 which are joined together at first and second mating parts thereof with adhesive. The optical module of the twelfth embodiment is described in detail below.

The emitter-side mounting substrate 1201 of the twelfth embodiment is provided with a pair of fitting recesses 1213a, 1213b formed therein to serve as the first mating parts. These fitting recesses 1213a, 1213b are formed in an overlap area 1214 on a top side of the mounting substrate 1201 which is one side oriented upward in a thickness direction thereof as shown in FIG. 21.

Figure 22:
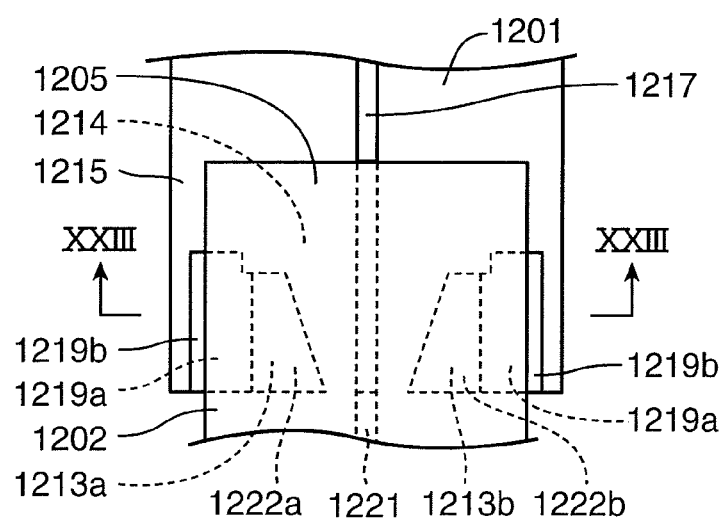
FIG. 22 is an enlarged fragmentary plan view showing a state in which the emitter-side mounting substrate and an external waveguide substrate of the twelfth embodiment are joined to each other with fitting tabs formed on the latter fitted into fitting recesses formed in the former.

More particularly, the top side of the mounting substrate 1201 includes the overlap area 1214 overlapped by a later-described lap joint portion 1205 of the external waveguide substrate 1202 and a non-overlap area 1215 where the top side of the mounting substrate 1201 is not overlapped by the lap joint portion 1205 as shown in FIG. 22. The fitting recesses 1213a, 1213b are formed in the overlap area 1214 of the mounting substrate 1201 to a specific depth below the overlap area 1214.

In the aforementioned overlap area 1214 of the mounting substrate 1201, there are formed adhesive filling portions 1219a in outside areas of the respective fitting recesses 1213a, 1213b. The adhesive filling portions 1219a are recessed to the same depth below the overlap area 1214 as the fitting recesses 1213a, 1213b and connected thereto.

Also, adhesive inlets 1219b connected to the respective adhesive filling portions 1219a are formed in the non-overlap area 1215. Adhesive is filled into the adhesive filling portions 1219a through these adhesive inlets 1219b.

Figure 21:
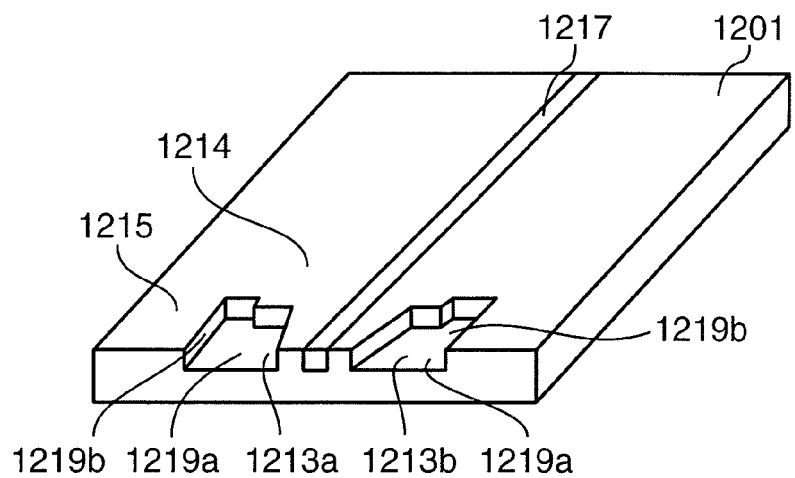
FIG. 21 is an enlarged fragmentary perspective view of an emitter-side mounting substrate according to a twelfth embodiment of the invention.

Although a core 1217 formed in the mounting substrate 1201 is covered with a cladding in actuality (see FIG. 23), the cladding is not shown in FIG. 21 for the sake of simplicity as is the case with FIGS. 22, 24-33, 35, 37-42.

The fitting recesses 1213a, 1213b of the mounting substrate 1201 of the twelfth embodiment thus configured are bonded to fitting tabs 1222a, 1222b, respectively, by the adhesive. Described below is a procedure for joining the mounting substrate 1201 and the external waveguide substrate 1202 to each other by adhesive bonding.

Figure 23:
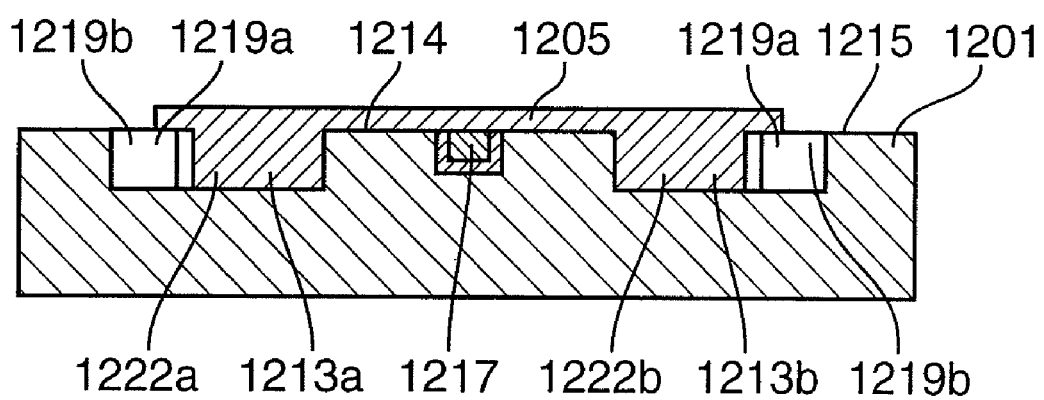
FIG. 23 is a cross-sectional view taken along lines XXIII-XXIII of FIG. 22.

First, the mounting substrate 1201 and the external waveguide substrate 1202 are placed such that oblique outside walls of the fitting tabs 1222a, 1222b of the external waveguide substrate 1202 go into contact with oblique inside walls of the fitting recesses 1213a, 1213b of the mounting substrate 1201, respectively, as shown in FIGS. 22 and 23. The fitting tabs 1222a, 1222b of the external waveguide substrate 1202 fit into the respective fitting recesses 1213a, 1213b of the mounting substrate 1201 as a consequence.

Since no adhesive exists between the inside walls of the fitting recesses 1213a, 1213b and the outside walls of the fitting tabs 1222a, 1222b which are held in mutual contact, it is possible to align the core 1217 of the mounting substrate 1201 with a core 1221 formed in the external waveguide substrate 1202 with high accuracy.

Under conditions where the mounting substrate 1201 has been fitted to the external waveguide substrate 1202 in the aforementioned fashion, the fitting recesses 1213a, 1213b, the fitting tabs 1222a, 1222b and the adhesive filling portions 1219a covered by the lap joint portion 1205 of the external waveguide substrate 1202, but the adhesive inlets 1219b are exposed to the exterior without being covered by the lap joint portion 1205.

The adhesive (not shown) is filled into the adhesive filling portions 1219a through the respective adhesive inlets 1219b in this condition. In the present embodiment, a prescribed amount of adhesive having a viscosity of about 0.05 Pa·s is applied by dropping the same through the adhesive inlets 1219b by use of a dispenser. The prescribed amount of adhesive is filled into the significantly small-sized adhesive filling portions 1219a of the mounting substrate 1201 in this way. It is to be noted, however, that the invention is not limited to the aforementioned adhesive filling method, but any other appropriate method may be used for applying the adhesive.

The dispensed adhesive fills into the adhesive filling portions 1219a and penetrates therefrom into gaps between the fitting recesses 1213a, 1213b and the fitting tabs 1222a, 1222b by capillary action so that the fitting tabs 1222a, 1222b of the external waveguide substrate 1202 are bonded to the respective fitting recesses 1213a, 1213b of the mounting substrate 1201.

According to the above-described configuration and adhesive bonding procedure of the twelfth embodiment, it is possible to accurately align the core 1217 of the mounting substrate 1201 and the core 1221 of the external waveguide substrate 1202 with each other and join the mounting substrate 1201 and the external waveguide substrate 1202 under conditions where the cores 1217, 1221 are so aligned. Furthermore, as the emitter-side mounting substrate 1201 and the external waveguide substrate 1202 are held secured bonded to each other upon completion of the bonding procedure, it is possible to prevent mutual position offset of the mounting substrate 1201 and the external waveguide substrate 1202 in a reliable fashion.

While the adhesive is dispensed after the fitting tabs 1222a, 1222b of the external waveguide substrate 1202 have been fitted into the respective fitting recesses 1213a, 1213b of the mounting substrate 1201 in the above-described procedure of the twelfth embodiment, the invention is not limited to this procedure but may be modified to use a different adhesive dispensing method.

As an example, the mounting substrate 1201 and the external waveguide substrate 1202 may be joined together after applying the adhesive to the inside walls of the fitting recesses 1213a, 1213b or the outside walls of the fitting tabs 1222a, 1222b, or to the walls of both the mounting substrate 1201 and the external waveguide substrate 1202. In this modified form of the twelfth embodiment, the adhesive filling portions 1219a may be either connected or unconnected to the respective fitting recesses 1213a, 1213b.

In a case where adhesive having a high viscosity is applied before the mounting substrate 1201 and the external waveguide substrate 1202 are mated, a thick adhesive layer is likely to form between the fitting recesses 1213a, 1213b of the mounting substrate 1201 and the fitting tabs 1222a, 1222b of the external waveguide substrate 1202. The thicker the adhesive layer, the more difficult to align the mounting substrate 1201 and the external waveguide substrate 1202 with each other. Thus, in this modified form of the embodiment, it might be necessary to carry out a time-consuming additional operation for removing part of the applied adhesive to obtain an adhesive layer having an appropriate thickness (e.g., 1-2 µm) before mating the mounting substrate 1201 and the external waveguide substrate 1202. It is therefore preferable to fill the adhesive after mating the mounting substrate 1201 and the external waveguide substrate 1202 with the fitting tabs 1222a, 1222b of the latter fitted into the respective fitting recesses 1213a, 1213b of the former.

Although the adhesive to be dispensed after mating the mounting substrate 1201 and the external waveguide substrate 1202 is not limited to any particular type, adhesive with a viscosity of 0.005 to 10 Pa·s is preferable, because such adhesive can easily penetrate into gaps of approximately a few µm formed between the fitting recesses 1213a, 1213b and the fitting tabs 1222a, 1222b.

Thirteenth Embodiment

Figure 24:
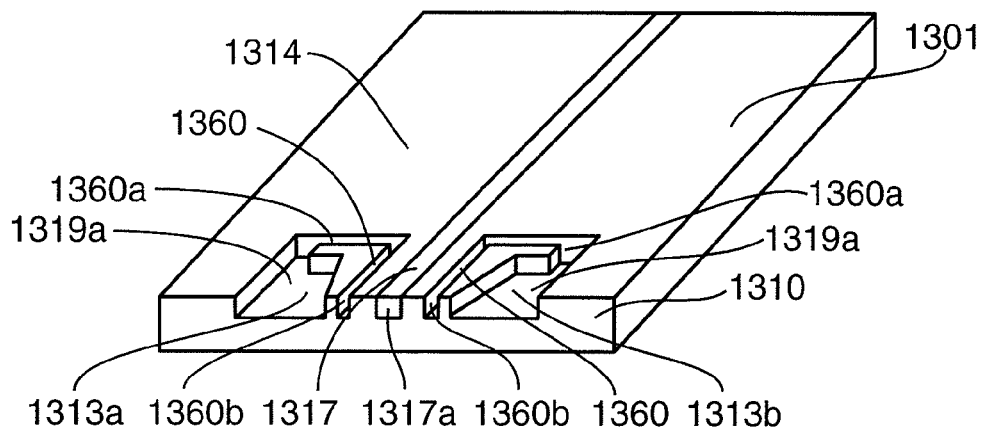
FIG. 24 is an enlarged fragmentary perspective view of an emitter-side mounting substrate according to a thirteenth embodiment of the invention.
Figure 25:
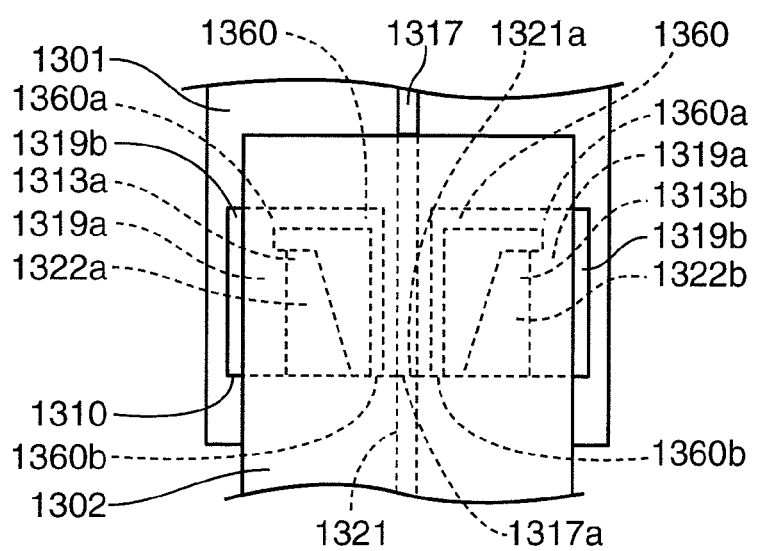
FIG. 25 is an enlarged fragmentary plan view showing a state in which the emitter-side mounting substrate and an external waveguide substrate of the thirteenth embodiment are joined to each other with fitting tabs formed on the latter fitted into fitting recesses formed in the former.

An optical module according to a thirteenth embodiment of the invention is now described with reference to FIGS. 24-26.

The optical module of this embodiment comprises an emitter-side mounting substrate 1301 and an external waveguide substrate 1302. What is characteristic of this embodiment is that there are formed adhesive guiding grooves 1360 in an overlap area 1314 of the mounting substrate 1301.

The adhesive guiding grooves 1360 are configured to allow the adhesive to smoothly flow into a gap created between a first butt surface 1317*a* of a core 1317 of the mounting substrate 1301 and a second butt surface 1321*a* of a core 1321 of the external waveguide substrate 1302 when the two cores 1317, 1321 are abutted against each other.

The adhesive guiding grooves 1360 are furrowlike structures in the overlap area 1314 recessed downward therefrom. The adhesive guiding grooves 1360 of the thirteenth embodiment are formed by cutting part of side portions of fitting recesses 1313*a*, 1313*b* in the overlap area 1314 to a specific depth and width. Dimensions (depth and width) of each adhesive guiding groove 1360 having a rectangular cross section are such that the adhesive can flow from a first end 1360*a* to a second end 1360*b* of the adhesive guiding groove 1360 by capillary action. In this embodiment, both the depth and the width of the adhesive guiding grooves 1360 are a few tens of μm to a few hundreds of μm.

Each of the adhesive guiding grooves 1360 extending from the first end 1360*a* provided in an adhesive filling portion 1319*a* runs between a side wall of the fitting recess 1313*a* (1313*b*) and the core 1317 up to the second end 1360*b* which is located in the vicinity of the core 1317 in a rear end 1310 of the mounting substrate 1301. The first end 1360*a* of the adhesive guiding grooves 1360 connect to the respective adhesive filling portions 1319*a*. The second end 1360*b* of each adhesive guiding groove 1360 is located in the vicinity of the core 1317 in the rear end 1310 of the mounting substrate 1301.

A middle portion of each adhesive guiding groove 1360 between the first and second ends 1360*a*, 1360*b* thereof is located between the fitting recess 1313*a* (1313*b*) and the core 1317 as illustrated. The optical module of the thirteenth embodiment has otherwise the same configuration as the above-described twelfth embodiment.

In the optical module of the thirteenth embodiment thus configured, the adhesive is applied through adhesive inlets 1319*b* under conditions where the mounting substrate 1301 and the external waveguide substrate 1302 are mated with each other with fitting tabs 1322*a*, 1322*b* on the external waveguide substrate 1302 fitted into the respective fitting recesses 1313*a*, 1313*b* of the mounting substrate 1301 as in the above-described twelfth embodiment.

The adhesive filled into the adhesive filling portions 1319*a* penetrates therefrom into gaps created between the fitting recesses 1313*a*, 1313*b* and the respective fitting tabs 1322*a*, 1322*b* and also flows from the adhesive filling portions 1319*a* up to the rear end 1310 of the mounting substrate 1301 by capillary action. The adhesive (designated by the numeral 1300 in FIG. 26) which has flowed up to the rear end 1310 further flows into a gap created between the rear end 1310 of the mounting substrate 1301 and a facing front end 1320 of the external waveguide substrate 1302 as illustrated. The adhesive 1300 flows also into the gap created between the first butt surface 1317*a* of the core 1317 of the mounting substrate 1301 and the second butt surface 1321*a* of the core 1321 of the external waveguide substrate 1302.

The above-described configuration of the present embodiment makes it possible to bond the rear end 1310 of the mounting substrate 1301 and the front end 1320 of the external waveguide substrate 1302 to each other, thus producing a greater bond strength between both. Also, the configuration of the present embodiment makes it possible to bond the first butt surface 1317*a* of the core 1317 of the mounting substrate 1301 and the second butt surface 1321*a* of the core 1321 of the external waveguide substrate 1302 directly to each other, thereby making mutual position offset of the two cores 1317, 1321 unlikely to occur.

Additionally, since the adhesive 1300 penetrates into the gap between the first butt surface 1317*a* of the core 1317 of the mounting substrate 1301 and the second butt surface 1321*a* of the core 1321 of the external waveguide substrate 1302, it possible to prevent formation of an air gap between the first and second butt surfaces 1317*a*, 1321*a* of the two cores 1317, 1321. This serves to improve optical coupling efficiency of the two cores 1317, 1321.

Figure 26:
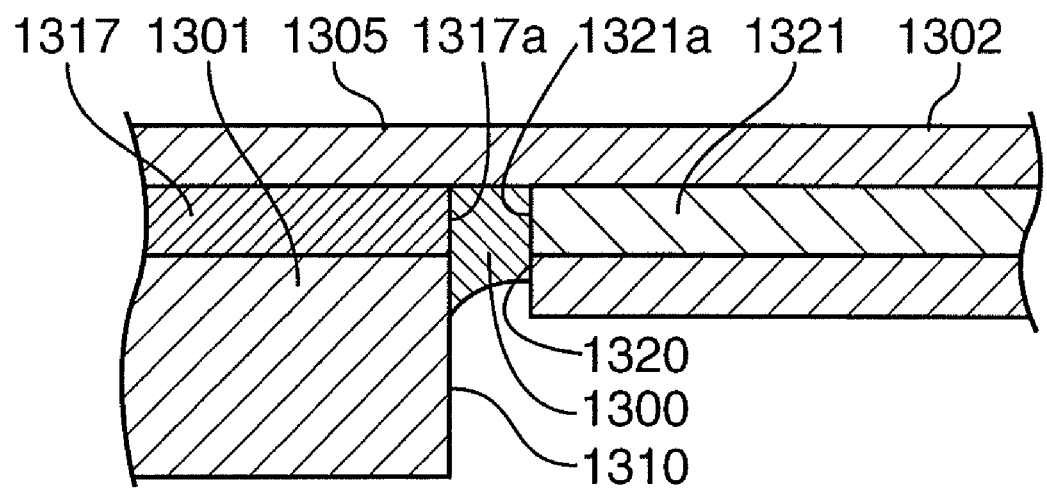
FIG. 26 is an enlarged fragmentary cross-sectional view of a portion where a first butt surface of a core formed in the mounting substrate and a second butt surface of a core formed in the external waveguide substrate of the thirteenth embodiment are abutted against each other.

It is to be noted that, for the sake of explanation and ease of understanding, the gap between the rear end 1310 of the mounting substrate 1301 and the front end 1320 of the external waveguide substrate 1302 and the gap between the first and second butt surfaces 1317*a*, 1321*a* are represented in relatively larger dimensions compared to the mounting substrate 1301 and associated elements in FIG. 26. In actuality, these gaps are much narrower than illustrated compared to the mounting substrate 1301 and the associated elements.

While the adhesive guiding grooves 1360 connect to the respective adhesive filling portions 1319*a* in the above-described configuration of the embodiment, this configuration may be varied such that the adhesive guiding grooves 1360 are formed separately from the adhesive filling portions 1319*a*, for example.

Figure 27:
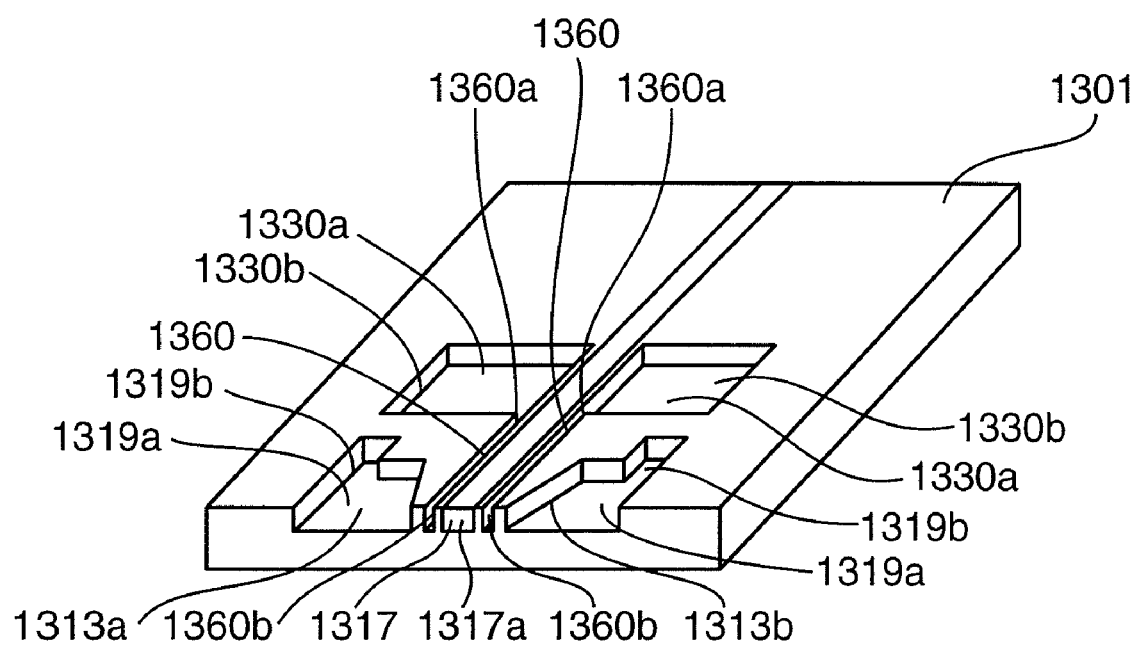
FIG. 27 is an enlarged fragmentary perspective view of an emitter-side mounting substrate according to one variation of the thirteenth embodiment.

Shown in FIG. 27 is an example of such a variation of the thirteenth embodiment. Specifically, there may be formed second adhesive filling portions 1330*a* at the rear of the adhesive filling portions 1319*a*, the second adhesive filling portions 1330*a* connecting to first ends 1360*a* of adhesive guiding grooves 1360 as shown in the example of FIG. 27. In addition, there may also be formed second adhesive inlets 1330*b* connecting to the respective second adhesive filling portions 1330*a*.

According to the above-described configuration of the variation of the embodiment, it is possible to apply the adhesive of the same type or different types separately into the adhesive filling portions 1319*a* and the second adhesive filling portions 1330*a*. For example, the adhesive filled into the gaps between the first and second butt surfaces 1317*a*, 1321*a* of the two cores 1317, 1321 by way of the second adhesive filling portions 1330*a* may be of a type having a lower refractive index than the cores 1317, 1321 themselves, preferably the refractive index equivalent to that of a cladding that covers the cores 1317, 1321 (refer to FIG. 23).

On the other hand, the adhesive filled into the gaps between the fitting recesses 1313*a*, 1313*b* and the fitting tabs 1322*a*, 1322*b* by way of the first adhesive filling portions 1319*a* may be of a type which provides a high bond strength. This makes it possible to select an appropriate type of adhesive from a wide variety of options without any consideration of light transmission properties.

Fourteenth Embodiment

An optical module according to a fourteenth embodiment of the invention is now described with reference to FIGS. 28-31. In this embodiment, the optical module comprising an emitter-side mounting substrate 1401 and an external waveguide substrate 1402 is configured such that, as shown in FIG. 30, adhesive filling portions 1419*a* of the mounting substrate 1401 adjoin front, rear and outwardly oriented side walls of fitting tabs 1422a, 1422b of the external waveguide substrate 1402 fitted into fitting recesses 1413a, 1413b of the mounting substrate 1401.

Figure 30:
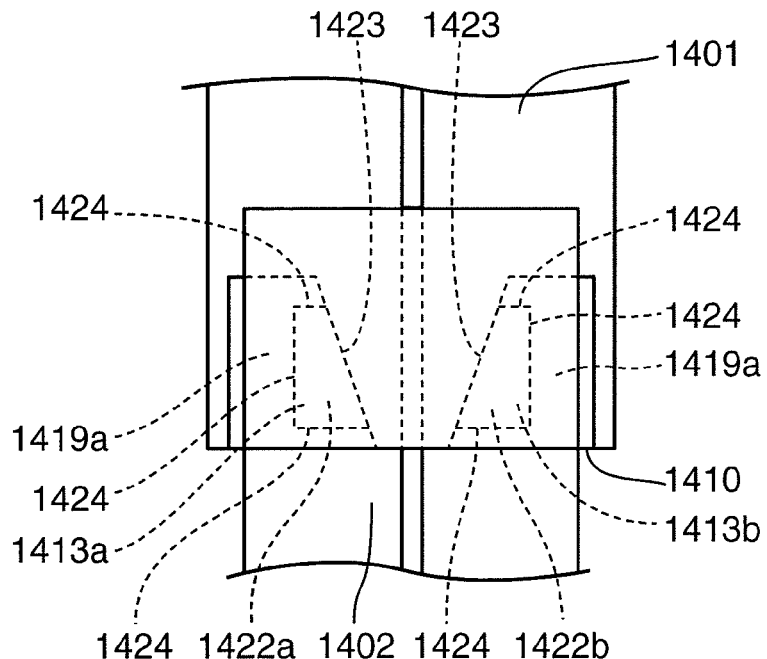
FIG. 30 is an enlarged fragmentary plan view showing a state in which the emitter-side mounting substrate and an external waveguide substrate of the fourteenth embodiment are joined to each other with fitting tabs formed on the latter fitted into fitting recesses formed in the former.

The fitting recesses 1413a, 1413b of the mounting substrate 1401 are formed in such a size that the fitting tabs 1422a, 1422b of the external waveguide substrate 1402 just fit in the respective fitting recesses 1413a, 1413b as depicted in FIG. 30. The fitting recesses 1413a, 1413b have obliquely oriented inside walls with which inwardly oriented side walls of the fitting tabs 1422a, 1422b of the external waveguide substrate 1402 are held in contact.

Figure 28:
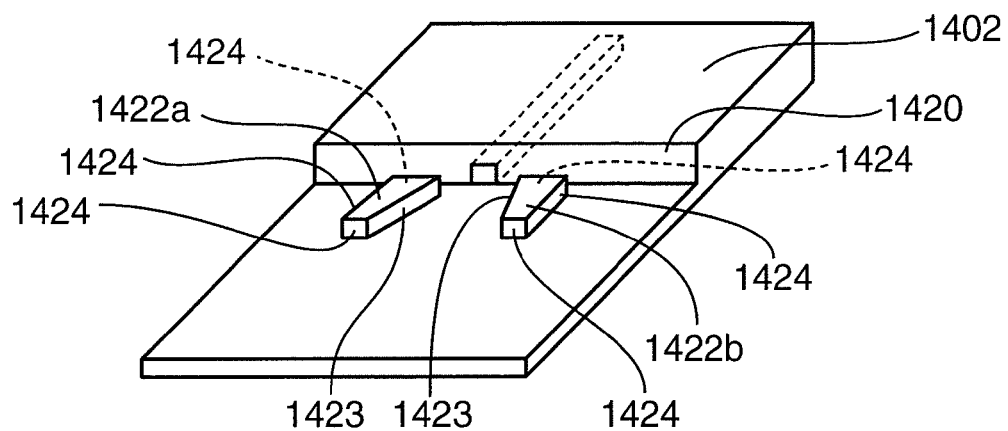
FIG. 28 is an enlarged fragmentary perspective view of an external waveguide substrate (as seen when placed upside down) according to a fourteenth embodiment of the invention.
Figure 29:
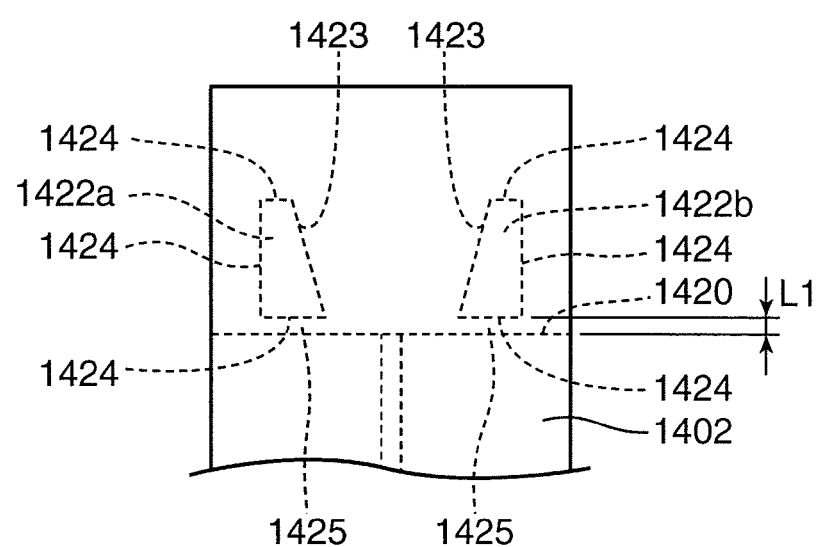
FIG. 29 is an enlarged fragmentary plan view of the external waveguide substrate of the fourteenth embodiment.

The adhesive filling portions 1419a of the mounting substrate 1401 are formed to adjoin the front, rear and outwardly oriented side walls of the respective fitting tabs 1422a, 1422b. As shown in FIGS. 28 and 29, the fitting tabs 1422a, 1422b of the external waveguide substrate 1402 are located in front of a front end 1420 of the external waveguide substrate 1402 at a specific distance L1 therefrom. With this arrangement, there are formed gaps 1425 between the fitting tabs 1422a, 1422b and the front end 1420 of the external waveguide substrate 1402. Thus, each of the fitting tabs 1422a, 1422b of the external waveguide substrate 1402 has outside walls which include the front and rear walls, an inwardly oriented side wall forming an oblique angle to the front and rear walls, and the outwardly oriented side wall forming generally a right angle to the front and rear walls.

The inwardly oriented oblique side walls of the fitting tabs 1422a, 1422b constitute contact walls 1423 which go into contact with the obliquely oriented inside walls of the respective fitting recesses 1413a, 1413b of the mounting substrate 1401. On the other hand, the front and rear walls and the outwardly oriented side walls of the fitting tabs 1422a, 1422b constitute noncontact walls 1424 which do not go into contact with the inside walls of the fitting recesses 1413a, 1413b of the mounting substrate 1401. The optical module of the fourteenth embodiment has otherwise the same configuration as the earlier-described twelfth embodiment.

In the above-described configuration of the fourteenth embodiment, the mounting substrate 1401 and the external waveguide substrate 1402 are joined in such a manner that the contact walls 1423 of the fitting tabs 1422a, 1422b of the external waveguide substrate 1402 are in contact with the obliquely oriented inside walls of the fitting recesses 1413a, 1413b of the mounting substrate 1401, respectively, as shown in FIG. 30. Under conditions where the mounting substrate 1401 and the external waveguide substrate 1402 are mated with each other in this fashion, the fitting tabs 1422a, 1422b of the latter just fit in the respective fitting recesses 1413a, 1413b of the former.

Also, when the mounting substrate 1401 and the external waveguide substrate 1402 are thus joined together, all of the noncontact walls 1424 of the fitting tabs 1422a, 1422b of the external waveguide substrate 1402, that is, the front, rear and outwardly oriented side walls of the fitting tabs 1422a, 1422b of the external waveguide substrate 1402 are adjoined by the adhesive filling portions 1419a.

In the optical module of the fourteenth embodiment thus configured, all of side walls of the fitting tabs 1422a, 1422b of the external waveguide substrate 1402 except the contact walls 1423 thereof are adjoined by the adhesive filling portions 1419a. Therefore, all of the noncontact walls 1424 of the fitting tabs 1422a, 1422b (excluding the contact walls 1423) fitted into the fitting recesses 1413a, 1413b of the mounting substrate 1401 are bonded thereto by the adhesive filled into the adhesive filling portions 1419a formed in the mounting substrate 1401. This configuration of the present embodiment makes it possible to securely bond the fitting tabs 1422a, 1422b of the external waveguide substrate 1402 to the fitting recesses 1413a, 1413b of the mounting substrate 1401, thereby making mutual position offset of the mounting substrate 1401 and the external waveguide substrate 1402 unlikely to occur regardless of ambient temperature changes or an external stress applied to the optical module.

While rear ends of the adhesive filling portions 1419a formed in the mounting substrate 1401 are positioned to generally align with a rear end 1410 of the mounting substrate 1401 in the fourteenth embodiment thus far described, the invention is not limited to this arrangement but may be modified as appropriate.

Figure 31:
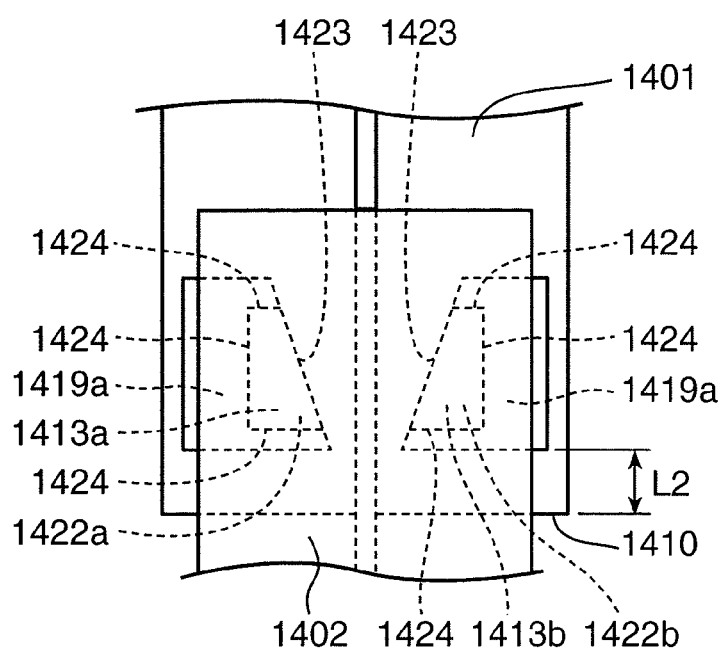
FIG. 31 is an enlarged fragmentary plan view showing a state in which an emitter-side mounting substrate and an external waveguide substrate according to one variation of the fourteenth embodiment are joined to each other with fitting tabs formed on the latter fitted into fitting recesses formed in the former.

For example, the adhesive filling portions 1419a may be formed at positions slightly offset frontward so that the rear ends of the adhesive filling portions 1419a are located in front of the rear end 1410 of the mounting substrate 1401 at a distance L2 therefrom as depicted in FIG. 31. This variation of the fourteenth embodiment is advantageous in that this alternative arrangement serves to prevent or reduce the risk of outflow of the adhesive out of the rear end 1410 of the mounting substrate 1401 once filled into the adhesive filling portions 1419a.

Fifteenth Embodiment

Figure 32:
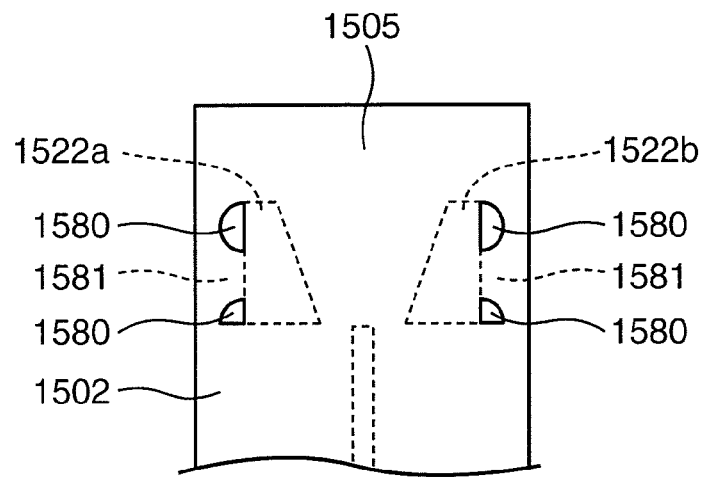
FIG. 32 is an enlarged fragmentary plan view of an external waveguide substrate according to a fifteenth embodiment of the invention.
Figure 33:
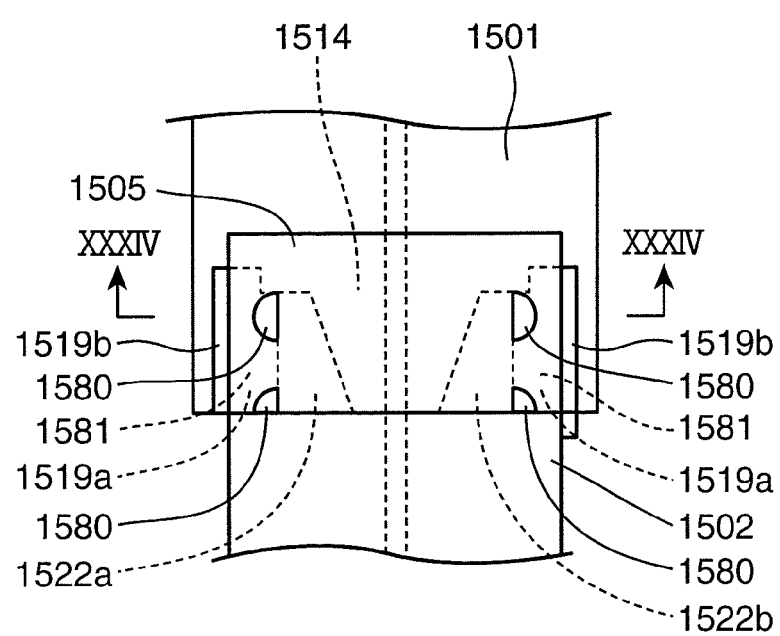
FIG. 33 is an enlarged fragmentary plan view showing a state in which an emitter-side mounting substrate and the external waveguide substrate of the fifteenth embodiment are joined to each other with fitting tabs formed on the latter fitted into fitting recesses formed in the former.
Figure 34:
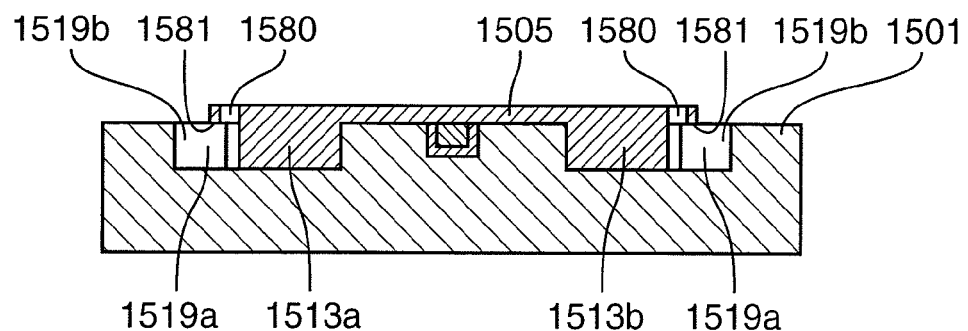
FIG. 34 is a cross-sectional view taken along lines XXXIV-XXXIV of FIG. 33.

An optical module according to a fifteenth embodiment of the invention is now described with reference to FIGS. 32-34. The optical module of this embodiment comprises an emitter-side mounting substrate 1501 and an external waveguide substrate 1502 of which lap joint portion 1505 has a plurality of deaeration holes 1580.

Specifically, the lap joint portion 1505 of the external waveguide substrate 1502 has facing surface areas 1581 which are positioned face to face with adhesive filling portions 1519a of the mounting substrate 1501 when the mounting substrate 1501 and the external waveguide substrate 1502 are mated in a manner that the lap joint portion 1505 of the latter overlies an overlap area 1514 of the former. The aforementioned deaeration holes 1580 are formed in the lap joint portion 1505 of the external waveguide substrate 1502. These deaeration holes 1580 serve to remove air bubbles which could form in adhesive filled into the adhesive filling portions 1519a of the mounting substrate 1501. In this embodiment, two pairs of deaeration holes 1580 opening to the exterior are made in the aforementioned facing surface areas 1581 of the lap joint portion 1505 along boundaries of fitting tabs 1522a, 1522b formed on the facing areas 1581 of the lap joint portion 1505, the deaeration holes 1580 passing all the way from a bottom side to a top side of the lap joint portion 1505. The optical module of the fifteenth embodiment has otherwise the same configuration as the earlier-described twelfth embodiment.

In the optical module of the fifteenth embodiment thus configured, it is possible to remove air bubbles from inside the adhesive filling portions 1519a of the mounting substrate 1501 through the deaeration holes 1580 even if the air bubbles form when the adhesive is filled into the adhesive filling portions 1519a of the mounting substrate 1501 through adhesive inlets 1519b formed therein. This arrangement of the present embodiment serves to prevent a reduction in bonding area between the facing areas 1581 of the lap joint portion 1505 of the external waveguide substrate 1502 and the adhesive filled into the adhesive filling portions 1519a of the mounting substrate 1501 as well as a reduction in bond strength.

The invention is not limited to the above-described configuration in which the deaeration holes 1580 are located along the boundaries between the fitting tabs 1522a, 1522b and the facing areas 1581 of the lap joint portion 1505 of the external waveguide substrate 1502 but may be modified as appropriate. It is to be noted, however, that the deaeration holes 1580 should preferably formed along the boundaries of the fitting tabs 1522a, 1522b because the air bubbles are likely to form in these boundary areas.

Sixteenth Embodiment

Figure 35:
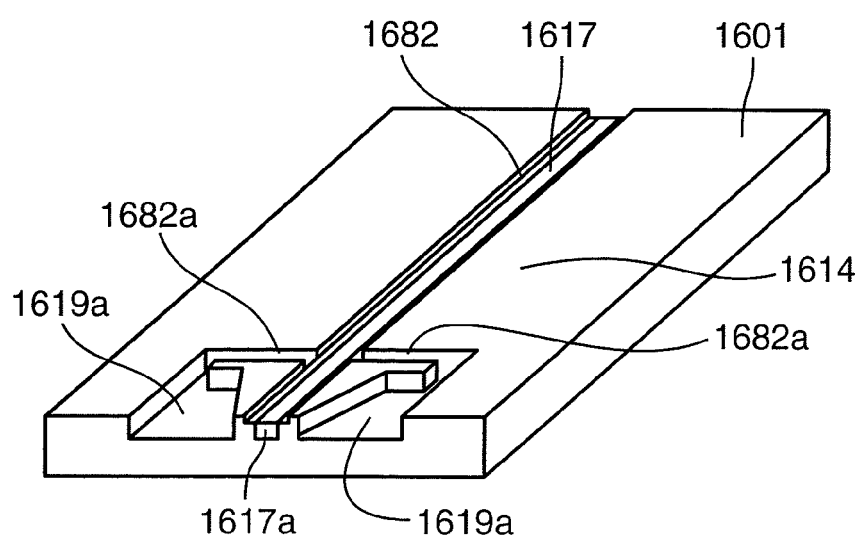
FIG. 35 is an enlarged fragmentary perspective view of an emitter-side mounting substrate according to a sixteenth embodiment of the invention.
Figure 36:
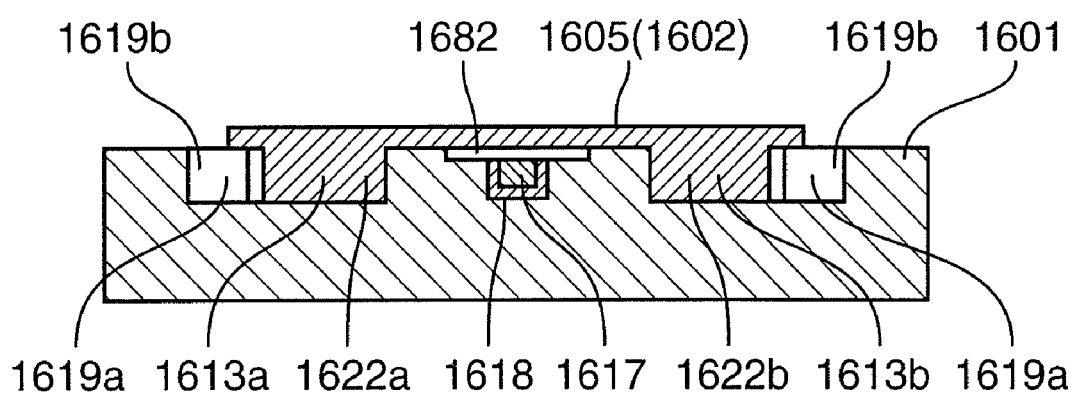
FIG. 36 is an enlarged fragmentary cross-sectional view showing a state in which the emitter-side mounting substrate and an external waveguide substrate of the sixteenth embodiment are joined to each other with fitting tabs formed on the latter fitted into fitting recesses formed in the former.
Figure 37:
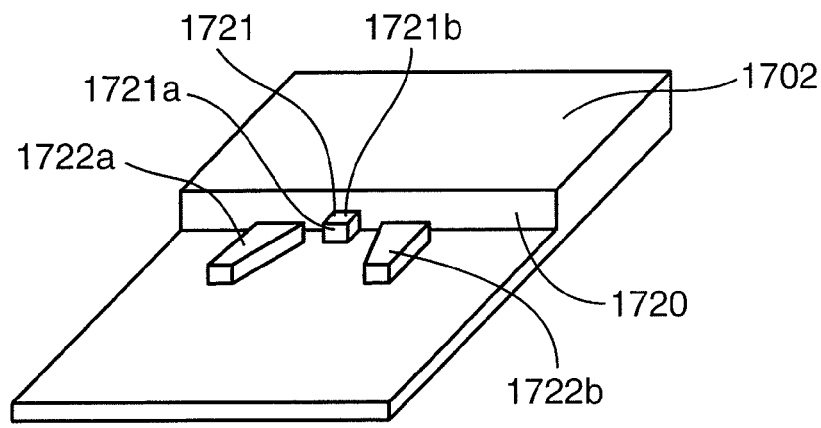
FIG. 37 is an enlarged fragmentary perspective view of an emitter-side mounting substrate (as seen when placed upside down) according to a seventeenth embodiment of the invention.
Figure 38:
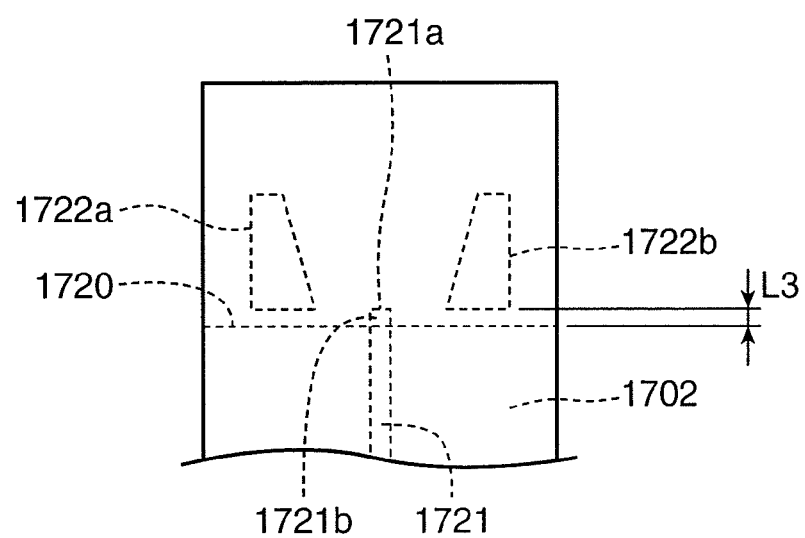
FIG. 38 is an enlarged fragmentary plan view of the emitter-side mounting substrate of the seventeenth embodiment.

An optical module according to a sixteenth embodiment of the invention is now described with reference to FIGS. 35 and 36. The optical module of this embodiment comprises an emitter-side mounting substrate 1601 having a core 1617 formed in a top surface thereof, wherein an adhesive guiding groove 1682 is formed in a top side of the core 1617.

Specifically, the core 1617 of the mounting substrate 1601 of the sixteenth embodiment is located at a specific depth below an overlap area 1614 of the top surface of the mounting substrate 1601. The aforementioned adhesive guiding groove 1682 is formed as if cut into the mounting substrate 1601 below the top surface thereof in the overlap area 1614 over a specified length along a longitudinal direction of the core 1617.

According to the present embodiment, the adhesive guiding groove 1682 connects to adhesive filling portions 1619a of the mounting substrate 1601 through respective narrow grooves 1682a formed therein. The adhesive guiding groove 1682 is formed over the aforementioned specified length from a first butt surface 1617a of the core 1617 along the longitudinal direction thereof, the adhesive guiding groove 1682 having a larger width than the core 1617.

Adhesive filled into the adhesive guiding groove 1682 of this embodiment has the same refractive index as a material used for forming a cladding 1618 (shown in FIG. 36) which covers the left and right sides and bottom of the core 1617 of the mounting substrate 1601. The optical module of the sixteenth embodiment has otherwise the same configuration as the above-described twelfth embodiment.

In the optical module of the sixteenth embodiment thus configured, the mounting substrate 1601 is joined to an external waveguide substrate 1602 with fitting tabs 1622a, 1622b of the latter fitted into fitting recesses 1613a, 1613b formed in the former, and under conditions where the mounting substrate 1601 and the external waveguide substrate 1602 are thus mated, the adhesive is filled into the adhesive filling portions 1619a through respective adhesive inlets 1619b. The adhesive filled into the adhesive filling portions 1619a flows therefrom into the adhesive guiding groove 1682 through the narrow grooves 1682a by capillary action. This makes it possible to produce an increased bond strength between the mounting substrate 1601 and the external waveguide substrate 1602.

Since the adhesive guiding groove 1682 connects to the adhesive filling portions 1619a through the narrow grooves 1682a in this embodiment, it is only necessary to dispense the adhesive into the adhesive inlets 1619b, thereby permitting a simplified manufacturing process.

Furthermore, it is possible to cover the top side of the core 1617 with the adhesive and, thus, the adhesive can function as part of a cladding layer. Since an air gap would hardly be created between the core 1617 and this part the cladding layer formed by the adhesive, the adhesive covering the top side of the core 1617 can perform substantially the same function as the cladding 1618 covering the left and right sides and bottom of the core 1617.

In addition, it is possible to dispense the adhesive into a gap created between the first butt surface 1617a of the core 1617 and a second butt surface of a core of the external waveguide substrate 1602. This gap can therefore be used as an adhesive guiding groove like the adhesive guiding groove 1360 of the earlier-described thirteenth embodiment.

While the adhesive guiding groove 1682 of the sixteenth embodiment is formed over the specified length from the first butt surface 1617a of the core 1617 along the longitudinal direction thereof, the invention is not limited thereto but this arrangement of the embodiment may be modified as appropriate. For example, the adhesive guiding groove 1682 may be formed over a specific length frontward from a position at a particular distance to the front of the first butt surface 1617a of the core 1617 along the longitudinal direction.

Also, the width of the adhesive guiding groove 1682 is not particularly limited, so that the adhesive guiding groove 1682 may be made narrower than the core 1617. In a case where the adhesive is used to constitute part the cladding layer, however, it is preferable that the width of the adhesive guiding groove 1682 be made equal to or larger than the width of the core 1617.

Also, in a case where the width of the adhesive guiding groove 1682 is made larger than the width of the core 1617, the adhesive guiding groove 1682 may be formed to encompass an entire area from the left-side adhesive filling portion 1619a to the right-side adhesive filling portion 1619a, for example.

It is to be noted, however, that if the adhesive guiding groove 1682 is so formed, a lap joint portion 1605 of the external waveguide substrate 1602 placed on the overlap area 1614 may partly settle into the adhesive guiding groove 1682 and warp. It is therefore preferable to form the adhesive guiding groove 1682 to overlap only part of the left- and right-side adhesive filling portions 1619a.

Seventeenth Embodiment

An optical module according to a seventeenth embodiment of the invention is now described with reference to FIGS. 37-42. As in the foregoing embodiments, the optical module of this embodiment is configured such that a front end 1720 of an external waveguide substrate 1702 is positioned face to face with a rear end 1710 of a mounting substrate 1701 when the mounting substrate 1701 and the external waveguide substrate 1702 are mated with each other with fitting tabs 1722a, 1722b of the latter fitted into fitting recesses 1713a, 1713b of the former, respectively. Accordingly, the rear end 1710 of the mounting substrate 1701 and the front end 1720 of the external waveguide substrate 1702 constitute end surfaces which are positioned face to face with each other.

A front end portion 1721b of a core 1721 of the external waveguide substrate 1702 sticks out frontward to the exterior of the external waveguide substrate 1702 by a specific length L3. A forward end surface of this end portion 1721b of the core 1721 constitutes a second butt surface 1721a which is positioned face to face with a first butt surface 1717a of a core 1717 of the mounting substrate 1701. The optical module of the seventeenth embodiment has otherwise the same configuration as the earlier-described twelfth embodiment.

Figure 39:
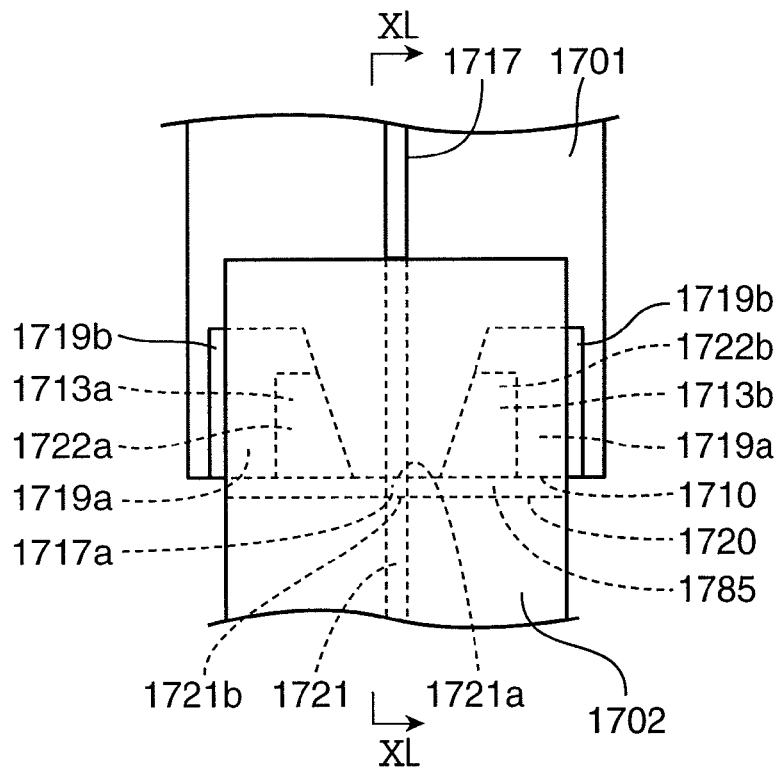
FIG. 39 is an enlarged fragmentary plan view showing a state in which an emitter-side mounting substrate and the external waveguide substrate of the seventeenth embodiment are joined to each other with fitting tabs formed on the latter fitted into fitting recesses formed in the former.
Figure 40:
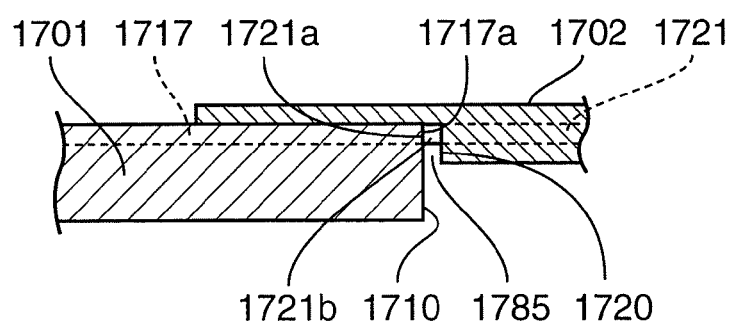
FIG. 40 is a cross-sectional view taken along lines XL-XL of FIG. 39.

In the optical module of the seventeenth embodiment thus configured, the fitting tabs 1722a, 1722b of the external waveguide substrate 1702 are fitted into the fitting recesses 1713a, 1713b of the mounting substrate 1701 as shown in FIG. 39. When the mounting substrate 1701 and the external waveguide substrate 1702 are so joined, the first butt surface 1717a and the second butt surface 1721a of the two cores 1717, 1721 are abutted against each other and the rear end 1710 of the mounting substrate 1701 and the front end 1720 of the external waveguide substrate 1702 are positioned face to face.

Consequently, there is formed a groovelike gap 1785 between the two facing ends 1710, 1720 of the mounting substrate 1701 and the external waveguide substrate 1702, the groovelike gap 1785 having a width equal to the projecting length L3 of the end portion 1721b of the core 1721 wherein the end portion 1721b is located in the groovelike gap 1785. The groovelike gap 1785 thus created is connected to adhesive filling portions 1719a formed in the mounting substrate 1701.

Figure 41:
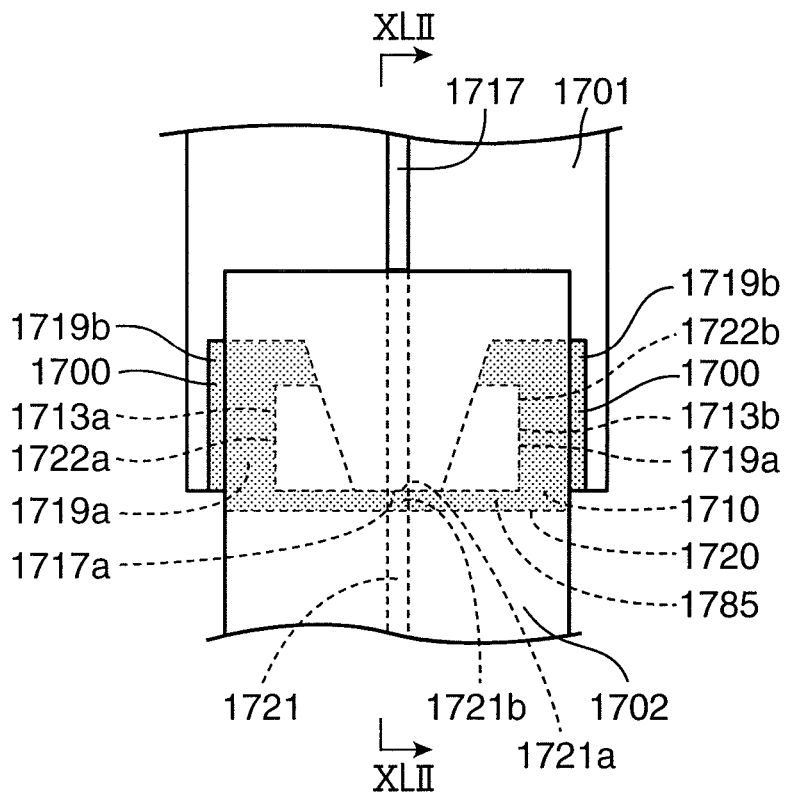
FIG. 41 is an enlarged fragmentary plan view showing a state in which adhesive are filled under conditions where the mounting substrate and the external waveguide substrate of the seventeenth embodiment have been joined to each other.
Figure 42:
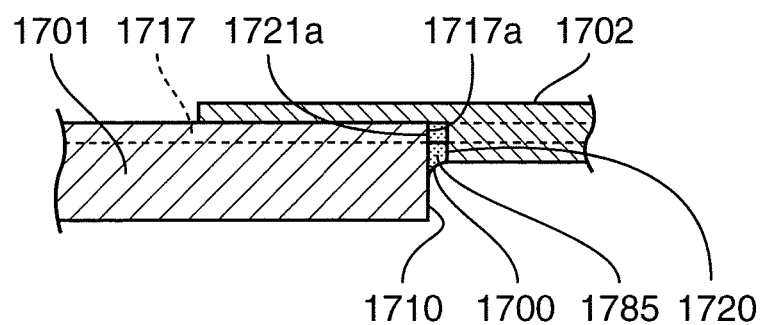
FIG. 42 is a cross-sectional view taken along lines XLII-XLII of FIG. 41.

Adhesive 1700 is filled into the adhesive filling portions 1719a through respective adhesive inlets 1719b in this condition. The adhesive 1700 filled into the adhesive filling portions 1719a penetrates into gaps between the fitting tabs 1722a, 1722b of the external waveguide substrate 1702 and the fitting recesses 1713a, 1713b of the mounting substrate 1701 as shown in FIG. 41.

The adhesive 1700 also penetrates into the groovelike gap 1785 from the adhesive filling portions 1719a by capillary action. As the adhesive 1700 flows into the groovelike gap 1785 in this fashion, the projecting end portion 1721b of the core 1721 is surrounded by the adhesive 1700 and fixed in position. It is therefore possible to securely affix the core 1721 of the external waveguide substrate 1702 to the core 1717 of the mounting substrate 1701 and thereby prevent mutual position offset of the two cores 1717, 1721 in a more reliable fashion.

Furthermore, since the end portion 1721b of the core 1721 projects beyond the front end 1720 of the external waveguide substrate 1702 and is thus exposed to the exterior, it is possible to take steps to enhance adhesion of the adhesive 1700 to the end portion 1721b of the core 1721 for further increasing bond strength of the end portion 1721b of the core 1721 before the end portion 1721b is surrounded by the adhesive 1700. For example, it is possible to enhance adhesion of the adhesive 1700 to the projecting end portion 1721b of the core 1721 by oxygen plasma processing, which will ensure strong adhesion of the adhesive to the end portion 1721b of the core 1721.

While the end portion 1721b of the core 1721 of the external waveguide substrate 1702 sticks out frontward beyond the front end 1720 in the above-described seventeenth embodiment, the invention is not limited thereto but this arrangement of the embodiment may be modified as appropriate. As an example, the embodiment may be modified such that the end portion 1721b of the core 1721 of the external waveguide substrate 1702 does not stick out frontward but, instead, an end portion of the core 1717 of the mounting substrate 1701 sticks out rearward from the rear end 1710 thereof. Alternatively, the embodiment may be modified such that the end portion 1721b of the core 1721 of the external waveguide substrate 1702 sticks out beyond the front end 1720, and the end portion of the core 1717 of the mounting substrate 1701 also sticks out beyond the rear end 1710.

It is to be noted that the optical modules of the second to twelfth embodiments have the same configuration as the first embodiment unless otherwise mentioned specifically in the foregoing discussion of the respective embodiments.

Also, while the first mating parts are formed as fitting recesses and the second mating parts are formed as fitting tabs in the foregoing first to seventeenth embodiments, these embodiments may be modified such that the first mating parts take the form of fitting tabs and the second mating parts take the form of fitting recesses. In other words, the embodiments may be modified such that the emitter-side mounting substrate is provided with one or more fitting tabs and the external waveguide substrate is provided with one or more fitting recesses.

Also, while the receiver-side mounting substrate may be provided with the same first mating part(s) as the emitter-side mounting substrate, the first mating part(s) of these two mounting substrates may be selected individually from those described in the foregoing first to seventeenth embodiments. Furthermore, if the first mating parts of the emitter-side mounting substrate are fitting recesses and the second mating parts of the external waveguide substrate are fitting tabs, it is possible to choose fitting tabs as the first mating parts of the receiver-side mounting substrate and fitting recesses as the second mating parts of the external waveguide substrate, or vice versa.

Moreover, while the external waveguide substrate is provided with the lap joint portion in the foregoing first to seventeenth embodiments, this arrangement may be modified as appropriate. The lap joint portion(s) may be provided on the emitter-side mounting substrate and/or the receiver-side mounting substrate, and not on the external waveguide substrate.

The preferred embodiments of the present invention can be summarized as described hereinbelow.

(1) According to preferred embodiments, an optical module comprises a mounting substrate including an optical element and a waveguide having a core optically coupled to the optical element, an external waveguide substrate joined to the mounting substrate, the external waveguide substrate including an external waveguide having a core which is optically coupleable to the waveguide of the mounting substrate, a first mating mechanism provided in one of the mounting substrate and the external waveguide substrate, and a joint including a second mating mechanism provided in the other one of the mounting substrate and the external waveguide substrate. As the first and second mating mechanisms of the joint are mated, the core of the waveguide and the core of the external waveguide are aligned with each other, thereby making the waveguide and the external waveguide optically coupled to each other, and the joint overlaps the aforementioned one of the mounting substrate and the external waveguide substrate in a particular area thereof, wherein the joint is bonded to the aforementioned one of the mounting substrate and the external waveguide substrate at least in part of the overlapping area thereof by adhesive.

The optical module thus configured makes it possible to align the cores of the waveguide of the mounting substrate and the external waveguide of the external waveguide substrate and optically couple the waveguide and the external waveguide with optical axes thereof matched to each other by mating the first and second mating mechanisms of the joint. This configuration of the invention serves to lower the risk of a reduction in optical coupling efficiency.

Additionally, because the joint (lap joint portion) is positioned to overlap the mounting substrate or the external waveguide substrate and bonded thereto by the adhesive in part or an entirety of an overlapped area, it is possible to obtain an increased bond strength.

(2) In one aspect of the invention, the optical module may be configured such that the first mating mechanism includes a pair of first mating parts disposed at two separate positions on both sides of the core of the aforementioned one of the mounting substrate and the external waveguide substrate, and the second mating mechanism includes a pair of second mating parts disposed at two separate positions on both sides of the core of the aforementioned other one of the mounting substrate and the external waveguide substrate, the positions of the second mating parts being so determined relative to the core of the aforementioned other one of the mounting substrate and the external waveguide substrate as to correspond to the positions of the first mating parts positioned relative to the core of the one of the mounting substrate and the external waveguide substrate.

The first mating parts and the second mating parts are positioned relative to the respective cores in this configuration. It is therefore possible to make a position offset between axes of the cores of the waveguide of the mounting substrate and the external waveguide of the external waveguide substrate unlikely to occur.

(3) In another aspect of the invention, the optical module may be configured such that the first mating mechanism includes a single first mating part having a pair of oblique walls which are disposed on both sides of an axis of the core of the aforementioned one of the mounting substrate and the external waveguide substrate, forming a specific angle with the axis of the core, and the second mating mechanism includes a single second mating part having a pair of contact walls which are disposed on both sides of an axis of the core of the aforementioned other one of the mounting substrate and the external waveguide substrate such that the contact walls are in contact with the oblique walls when the mounting substrate and the external waveguide substrate are joined together, the positions of the contact walls being so determined relative to the axis of the core of the aforementioned other one of the mounting substrate and the external waveguide substrate as to correspond to the positions of the oblique walls positioned relative to the core of the one of the mounting substrate and the external waveguide substrate.

In this configuration, the oblique walls of the first mating part and the contact walls of the second mating part are located respectively on both sides of the axis of the core of the waveguide of the mounting substrate and the axis of the core of the external waveguide of the external waveguide substrate, so that the first mating part and the second mating part are less likely to be offset from the axes of the respective cores even when the mounting substrate and the external waveguide substrate are subjected to a thermal effect. It is therefore possible to make a position offset between the axes of the cores of the waveguide of the mounting substrate and the external waveguide of the external waveguide substrate unlikely to occur.

(4) In another aspect of the invention, the optical module may be configured such that part of the joint located apart from the second mating mechanism is bonded to the aforementioned one of the mounting substrate and the external waveguide substrate by the adhesive.

According to this configuration, part of the joint located apart from the second mating mechanism is bonded to the mounting substrate or the external waveguide substrate. This makes it possible to prevent formation of an adhesive layer between the first and second mating parts mated together due to intrusion of the adhesive therein and a resultant position offset between the axes of the cores of the mounting substrate and the external waveguide substrate. It is therefore possible to bond the mounting substrate and the external waveguide substrate to each other under conditions where the first and second mating parts are mated and the axes of the cores of the mounting substrate and the external waveguide substrate are properly aligned.

(5) In another aspect of the invention, the optical module may be configured such that part of the joint in the vicinity of the second mating mechanism is bonded to the aforementioned one of the mounting substrate by the adhesive.

In this configuration, part of the joint in the vicinity of the second mating mechanism is bonded to the mounting substrate or the external waveguide substrate so that part of the second mating mechanism serves as a bonding area. This makes it possible to reduce the size of the joint (lap joint portion) which overlaps the mounting substrate or the external waveguide substrate, thus permitting efficient use of a space available thereon. In addition, this configuration makes it possible to bond the first and second mating parts under conditions where the first and second mating parts are mated and aligned to each other.

(6) In another aspect of the invention, the optical module may be configured such that the aforementioned one of the mounting substrate and the external waveguide substrate has an overlap area where the joint overlies and the joint has a contact surface which goes into contact with the overlap area, wherein at least one of the overlap area and the contact surface has a projection formed thereon at least in part thereof, and the overlap area and the contact surface are bonded to each other by the adhesive at least in part thereof including the projection.

In this configuration, a projection is formed on at least one of the overlap area and the contact surface, and the overlap area and the contact surface are bonded to each other by the adhesive in part or an entirety thereof including the projection. This arrangement makes it possible to provide an increased adhesive bonding area and greater bond strength.

(7) In another aspect of the invention, the optical module may be configured such that the aforementioned one of the mounting substrate and the external waveguide substrate has an overlap area which is overlapped by the joint, and the joint has a contact surface which goes into contact with the overlap area, wherein at least one of the overlap area and the contact surface is formed into a rough surface at least in part thereof, and the overlap area and the contact surface are bonded to each other by the adhesive at least in part thereof including the rough surface.

In this configuration, at least one of the overlap area and the contact surface is formed into a rough surface in part or an entirety thereof and the overlap area and the contact surface are bonded to each other by the adhesive in part or an entirety thereof including the rough surface. This arrangement makes it possible to provide an increased adhesive bonding area and greater bond strength due to the anchoring effect.

(8) In another aspect of the invention, the optical module may be such that the first mating mechanism is formed simultaneously with a core groove for forming the core of the waveguide of the mounting substrate including the first mating mechanism or with the core of the external waveguide of the external waveguide substrate including the first mating mechanism, and the second mating mechanism is formed simultaneously with the core of the external waveguide of the external waveguide substrate including the second mating mechanism or with the core groove of the waveguide of the mounting substrate including the second mating mechanism.

According to this configuration, the first mating mechanism is formed simultaneously with the core groove for forming the core of the waveguide of the mounting substrate including the first mating mechanism or with the core of the external waveguide of the external waveguide substrate including the first mating mechanism, and the second mating mechanism is formed simultaneously with the core of the external waveguide of the external waveguide substrate including the second mating mechanism or with the core groove of the waveguide of the mounting substrate including the second mating mechanism, so that it is possible to prevent a position offset of the first and second mating parts from the respective cores. This arrangement makes it possible to align the axes of the cores of the waveguide of the mounting substrate and the external waveguide of the external waveguide substrate with high reliability by mating the first and second mating parts to each other.

(9) In another aspect of the invention, the optical module may be configured such that an overlap area provided on the aforementioned one of the mounting substrate and the external waveguide substrate where the joint overlies is made generally flush with one thicknesswise side of the core of the waveguide or the external waveguide of the aforementioned one of the mounting substrate and the external waveguide substrate, and the joint has a contact surface which goes into contact with the overlap area, the contact surface being made generally flush with one thicknesswise side of the core of the waveguide or the external waveguide of the aforementioned other one of the mounting substrate and the external waveguide substrate.

In this configuration, the overlap area provided on the aforementioned one of the mounting substrate and the external waveguide substrate where the joint overlies is made generally flush with one thicknesswise side of the core of the waveguide or the external waveguide of the aforementioned one of the mounting substrate and the external waveguide substrate, and the joint has the contact surface which goes into contact with the overlap area, the contact surface being made generally flush with one thicknesswise side of the core of the waveguide or the external waveguide of the aforementioned other one of the mounting substrate and the external waveguide substrate. This configuration makes it possible to exactly position the cores of the waveguide of the mounting substrate and the external waveguide of the external waveguide substrate by placing the joint (lap joint portion) to overlie the mounting substrate or the external waveguide substrate.

(10) In another aspect of the invention, the optical module may be such that the mounting substrate has a first mating mechanism forming cavity which is a hollow formed in the mounting substrate in part of a surface thereof, wherein a first mating mechanism forming material which is different from a base material of the mounting substrate is filled into the first mating mechanism forming cavity to form a first mating mechanism forming portion in which the first mating mechanism is formed.

According to this configuration, the first mating mechanism forming portion is formed by filling the first mating mechanism forming material which is different from the base material of the mounting substrate into the first mating mechanism forming cavity which is a hollow formed in the mounting substrate in part of the surface thereof. Since the first mating part is formed in the first mating mechanism forming portion thus produced, it is possible to form the first mating part by filling the first mating mechanism forming material in part of the mounting substrate and using an embossing die, for example, even when the mounting substrate is made of such a material as silicone. In this configuration, the overall thickness of the finished mounting substrate is defined by the thickness of an unprocessed substrate thereof alone. This makes it easier to achieve a reduction in the overall size and thickness of the finished mounting substrate.

(11) In another aspect of the invention, the optical module may be configured such that the core of the waveguide of the mounting substrate has a first butt surface, and the core of the external waveguide of the external waveguide substrate has a second butt surface, wherein, as the first and second mating mechanisms are mated together, the joint overlaps the aforementioned one of the mounting substrate and the external waveguide substrate in a thickness direction thereof, and the first and second butt surfaces abut each other, thereby making the waveguide and the external waveguide optically coupled to each other, and wherein one of the first and second butt surfaces positioned face to face with each other forms a slant surface inclined along the thickness direction.

According to this configuration, even when a thicknesswise position offset occurs between the two cores of the mounting substrate and the external waveguide substrate due to formation of an adhesive layer therebetween when the mounting substrate and the external waveguide substrate are bonded to each other by the adhesive, light propagating through one core is refracted at the aforementioned slant surface and allowed to enter the other core efficiently. This arrangement serves to reduce optical coupling loss.

(12) In another aspect of the invention, the optical module may be configured such that one end of the aforementioned one of the mounting substrate and the external waveguide substrate has a portion shaped to form a socket into which part of one end of the aforementioned other one of the mounting substrate and the external waveguide substrate is fitted and bonded by the adhesive.

According to this configuration, there is formed a socket in one end of the aforementioned one of the mounting substrate and the external waveguide substrate so that part of one end of the aforementioned other one of the mounting substrate and the external waveguide substrate can be fitted and bonded by the adhesive. Therefore, even when the external waveguide substrate is warped, the external waveguide substrate would not easily break because a stress is less likely to occur in portions of the mounting substrate and the external waveguide substrate in the vicinity of joint ends thereof.

(13) In another aspect of the invention, a groove having a specific depth may be formed in an inside of the aforementioned socket.

The provision of the groove will make it easier for the adhesive to flow into the aforementioned socket, thereby providing an increased bond strength due to the anchoring effect.

(14) In another aspect of the invention, the optical module may be configured such that all sides except one thicknesswise side of the core of the waveguide or the external waveguide of the aforementioned one of the mounting substrate and the external waveguide substrate are covered by a cladding, and the aforementioned one thicknesswise side of the core is made generally flush with an overlap area of the aforementioned one of the mounting substrate and the external waveguide substrate where the joint overlies, wherein the joint is made of a cladding material used for forming the cladding, and a contact surface of the joint which goes into contact with the overlap area is made generally flush with one thicknesswise side of the core of the waveguide or the external waveguide of the aforementioned other one of the mounting substrate and the external waveguide substrate.

According to this configuration, it is possible to cover the core of the waveguide or the external waveguide of the aforementioned one of the mounting substrate and the external waveguide substrate by placing the joint made of the cladding material to overlap the mounting substrate or the external waveguide substrate, whichever appropriate. This arrangement makes it possible to use the joint as the cladding that covers the core of the aforementioned other one of the mounting substrate and the external waveguide substrate, so that a process for coating one side of the core with the cladding can be omitted. Also, it is possible to align the first and second mating parts in the thickness direction relative to the core.

(15) In another aspect of the invention, the optical module may be configured such that the core of the waveguide of the mounting substrate has a first butt surface which is located at a specific position relative to one of the first and second mating mechanisms, and the core of the external waveguide of the external waveguide substrate has a second butt surface which is located at a specific position relative to one of the first and second mating mechanisms, so that, as the first and second mating mechanisms are mated together, the first and second butt surfaces abut each other, thereby making the waveguide and the external waveguide optically coupled to each other.

According to this configuration, the first butt surface of the core of the waveguide of the mounting substrate is placed at the specific position relative to one of the first and second mating mechanisms and the second butt surface of the core of the external waveguide of the external waveguide substrate is placed at the specific position relative to the other of the first and second mating mechanisms. It is therefore possible to align the first and second butt surfaces face to face with each other at a fixed position under conditions where the first and second mating parts are mated to each other regardless of manufacture-related dimensional errors of the mounting substrate and the external waveguide substrate even when such dimensional errors occur during the manufacture of the mounting substrate or the external waveguide substrate.

(16) In another aspect of the invention, the optical module may be configured such that the first mating mechanism includes a fitting recess provided in the mounting substrate, and the second mating mechanism includes a fitting tab provided on the external waveguide substrate, wherein the fitting tab has an end part and an elongate columnlike part connected to the end part, the columnlike part constituting an integral part of the fitting tab and extending generally parallel to the core of the external waveguide substrate along a longitudinal direction of the core.

According to this configuration, the fitting tab is provided with the elongate columnlike part extending integrally from the end part of the fitting tab generally parallel to the core of the external waveguide substrate along the longitudinal direction of the core. Therefore, even when shrinkage on curing of resin or thermal expansion or shrinkage in the external waveguide of the external waveguide substrate, the core of the external waveguide and the columnlike part of the fitting tab expand or shrink isotropically, making it possible to prevent a position offset between the fitting tab and the core.

(17) In another aspect of the invention, the first and second mating mechanisms may be bonded to each other by the adhesive.

This would serve to provide an increased adhesive bonding area and greater bond strength between the mounting substrate and the external waveguide substrate. Also, since the first and second mating mechanisms are bonded to each other by the adhesive, it is possible to prevent a mutual position offset therebetween after execution of adhesive bonding operation, so that a position offset between the cores of the waveguide of the mounting substrate and the external waveguide of the external waveguide substrate can be reliably avoided.

(18) In another aspect of the invention, the optical module may be configured such that the aforementioned one of the mounting substrate and the external waveguide substrate has an overlap area where the joint overlies and a non-overlap area where the joint does not overlie, the overlap area including an adhesive filling portion formed therein, and the first mating mechanism includes a fitting recess which is so formed as to be recessed from the overlap area and connected to the adhesive filling portion, the non-overlap area including an adhesive inlet connected to the adhesive filling portion.

According to this configuration, there are formed the first mating mechanism and the adhesive filling portion in the overlap area, the first mating mechanism including a fitting recess which is so formed as to be recessed from the overlap area and connected to the adhesive filling portion. This arrangement serves to bond the mounting substrate and the external waveguide substrate together more securely.

Additionally, since the adhesive inlet for filling the adhesive into the adhesive filling portion is formed in the non-overlap area where the joint does not overlie, it is possible to fill the adhesive into the adhesive filling portion through the adhesive inlet even after the fitting tab is fitted into the fitting recess and the joint (lap joint portion) is placed to overlie the fitting recess.

It is therefore possible to mate the first and second mating mechanisms under conditions where the adhesive is not filled into the adhesive filling portion, so that the cores of the waveguide of the mounting substrate and the external waveguide of the external waveguide substrate can be precisely aligned and bonded to each other.

(19) In another aspect of the invention, the optical module may be configured such that the core of the waveguide of the mounting substrate has a first butt surface, and the core of the external waveguide of the external waveguide substrate has a second butt surface which is positioned face to face with the first butt surface when the first and second mating mechanisms are mated together, the overlap area including an adhesive guiding groove formed therein to allow the adhesive to flow into a gap created between the first and second butt surfaces.

In this configuration, the adhesive guiding groove which allows the adhesive to flow into the gap created between the first and second butt surfaces is formed in the overlap area, so that it is possible to bond the first and second butt surfaces of the cores of the waveguide of the mounting substrate and the external waveguide of the external waveguide substrate to each other by the adhesive and prevent a position offset therebetween in a reliable fashion.

Also, it is possible to allow the adhesive to flow into the gap created between the first and second butt surfaces and thereby prevent formation of a layer of air therein. This would serve to provide an improved optical coupling efficiency between the cores of the waveguide of the mounting substrate and the external waveguide of the external waveguide substrate.

(20) In another aspect of the invention, the optical module may be configured such that the second mating mechanism includes a fitting tab which fits into the fitting recess, the fitting tab having outside walls including a contact wall which goes into contact with an inside wall of the fitting recess and a noncontact wall which does not go into contact with any inside wall of the fitting recess, and the adhesive filling portion is so configured as to adjoin all of the noncontact wall of the fitting tab when the contact wall goes into contact with the inside wall of the fitting recess.

In this configuration, the fitting tab can be securely fixed to the fitting recess under conditions where the fitting tab are held in contact with the inside wall of the fitting recess, so that it is possible to prevent a mutual position offset between the fitting tab and the fitting recess in a reliable fashion after the bonding operation.

(21) In another aspect of the invention, the optical module may be configured such that the joint has a deaeration hole formed all the way therethrough thicknesswisely, wherein the deaeration hole opens to a facing surface area of the joint which faces the adhesive filling portion when the joint is placed to overlie the overlap area.

According to this configuration, it is possible to remove air bubbles from inside the adhesive filling portion to the exterior through the deaeration hole even if the air bubbles form in the adhesive when the adhesive is filled into a gap between the overlap area and the joint (lap joint portion) overlying the overlap area.

This arrangement serves to prevent a reduction in bonding area between the overlap area and the joint (lap joint portion) and a consequent reduction in bond strength due to formation of air bubbles in the adhesive. In addition, the presence of air bubbles in the adhesive may result in a reduction in adhesive bond strength or a position offset due to temperature changes occurring over time. The provision of the deaeration hole would prevent deterioration of properties of the optical module.

(22) In still another aspect of the invention, the optical module may be configured such that the core of the aforementioned one of the mounting substrate and the external waveguide substrate is located at a specific depth below the overlap area, an adhesive guiding groove is formed in the overlap area as if cut therein to the depth of the core of the aforementioned one of the mounting substrate and the external waveguide substrate over a specified length along a longitudinal direction of the core, and the adhesive filling portion and the adhesive guiding groove are connected to each other.

Since the adhesive guiding groove is formed in the overlap area in this configuration, it is possible to provide an increased bond strength between the mounting substrate and the external waveguide substrate.

The adhesive guiding groove is connected to the adhesive filling portion and the former is recessed from the overlap area down to the depth of the core. Therefore, if the adhesive is filled into the adhesive filling portion through the adhesive inlet, the adhesive is allowed to easily flow into the adhesive guiding groove, thereby permitting a simplified manufacturing process.

Furthermore, it is possible to cover part of the core with the adhesive and, thus, if the adhesive used is of a type having a prescribed refractive index, for instance, the adhesive may be used to form a cladding layer.

(23) In yet another aspect of the invention, the optical module may be configured such that the mounting substrate and the external waveguide substrate have respective end surfaces which are positioned face to face with each other, at least one of the first butt surface of the core of the mounting substrate and second butt surface of the core of the external waveguide substrate bulges out beyond the relevant end surface, so that the end surfaces of the mounting substrate and the external waveguide substrate face each other and there is formed a groovelike gap between the two facing end surfaces when the first and second butt surfaces are positioned to face each other, and the adhesive filling portion and the adhesive guiding groove are connected to each other.

In the optical module thus configured, at least one of the first butt surface of the core of the mounting substrate and second butt surface of the core of the external waveguide substrate bulges out beyond the relevant end surface. Thus, when the first and second butt surfaces are positioned to face each other, the end surfaces of the mounting substrate and the external waveguide substrate face each other and there is formed a groovelike gap between the two facing end surfaces. It is therefore possible to cause the adhesive filled in the adhesive filling portion to flow into this groovelike gap and thereby bond the facing end surfaces of the mounting substrate and the external waveguide substrate to each other with a greater bond strength.

Furthermore, as the adhesive is guided to flow into the aforementioned groovelike gap, part of the core projecting from the end surface of the substrate can be surrounded by the adhesive and fixed in position. It is therefore possible to securely affix the core of the external waveguide substrate in position relative to the core of the mounting substrate and thereby prevent mutual position offset of the two cores in a more reliable fashion.

The invention claimed is:

1. An optical module comprising:
   a mounting substrate including an optical element and a waveguide having a core optically coupled to the optical element;
   an external waveguide substrate joined to said mounting substrate, said external waveguide substrate including an external waveguide having a core optically coupled to the waveguide of said mounting substrate;
   a first mating mechanism provided in one of said mounting substrate and said external waveguide substrate; and
   a joint including a second mating mechanism provided in another one of said mounting substrate and said external waveguide substrate;
   wherein, when said first mating mechanism and said second mating mechanism are mated, the core of the waveguide and the core of the external waveguide are aligned with each other, to generally maintain a direction of light transmission at said joint, said joint includes a flat surface outside of said second mating mechanism facing and contacting a portion of a top surface of said one of said mounting substrate and said external waveguide substrate, the portion of said top surface being an area outside of said first mating mechanism,
   said flat surface faces and covers one of an end portion of said waveguide and an end portion of said external waveguide,
   said joint is bonded to said one of said mounting substrate and said external waveguide substrate at least in a part of the portion of said top surface by adhesive,
   wherein an overlap area provided on said one of said mounting substrate and said external waveguide substrate that overlaps said joint is generally flush with one lengthwise side of the core of the waveguide or the external waveguide of said one of said mounting substrate and said external waveguide substrate, and
   said joint has a contact surface that contacts the overlap area, the contact surface being generally flush with one lengthwise side of the core of the waveguide or the external waveguide of said other one of said mounting substrate and said external waveguide substrate.

2. The optical module according to claim 1, wherein said first mating mechanism includes a pair of first mating parts disposed respectively at two separate positions on two sides of the core of said one of said mounting substrate and said external waveguide substrate, and
   said second mating mechanism includes a pair of second mating parts disposed respectively at two separate positions on two sides of the core of said other one of said mounting substrate and said external waveguide substrate, the positions of said second mating parts relative to the core of said other one of said mounting substrate and said external waveguide substrate correspond to the positions of said first mating parts positioned relative to the core of said one of said mounting substrate and said external waveguide substrate.

3. The optical module according to claim 1, wherein said first mating mechanism includes a single first mating part having a pair of oblique walls which are disposed respectively on two sides of an axis of the core of said one of said mounting substrate and said external waveguide substrate, each of the pair of oblique walls having a specific angle with the axis of the core, and said second mating mechanism includes a single second mating part having a pair of contact walls which are disposed respectively on two sides of an axis of the core of said other one of said mounting substrate and said external waveguide substrate such that the contact walls are in contact with the oblique walls when said mounting substrate and said external waveguide substrate are joined together, the positions of the contact walls relative to the axis of the core of said one of said mounting substrate and said external waveguide substrate correspond to the positions of the oblique walls.

4. The optical module according to claim 1, wherein part of said joint spaced from said second mating mechanism is bonded to said one of said mounting substrate and said external waveguide substrate by the adhesive.

5. The optical module according to claim 1, wherein part of said joint in the vicinity of said second mating mechanism is bonded to said one of said mounting substrate and said external waveguide substrate by the adhesive.

6. The optical module according to claim 1, wherein said one of said mounting substrate and said external waveguide substrate has an overlap area that overlaps said joint and said joint has a contact surface that contacts the overlap area, and
wherein at least one of the overlap area and the contact surface has a part providing a projection, and the overlap area and the contact surface are bonded to each other by the adhesive at least in at the part including the projection.

7. The optical module according to claim 1, wherein said one of said mounting substrate and said external waveguide substrate has an overlap area that overlaps said joint, and said joint has a contact surface that contacts the overlap area, and
wherein at least one of the overlap area and the contact surface has a part providing a rough surface, and the overlap area and the contact surface are bonded to each other by the adhesive at least in at the part including the rough surface.

8. The optical module according to claim 1, wherein said first mating mechanism is formed simultaneously with a core groove for forming the core of the waveguide of said mounting substrate including said first mating mechanism or with the core of the external waveguide of said external waveguide substrate including said first mating mechanism, and
said second mating mechanism is formed simultaneously with the core of the external waveguide of said external waveguide substrate including said second mating mechanism or with the core groove of the waveguide of said mounting substrate including said second mating mechanism.

9. The optical module according to claim 1, wherein the core of the waveguide of said mounting substrate has a first butt surface, and the core of the external waveguide of said external waveguide substrate has a second butt surface,
wherein, when said first mating mechanism and said second mating mechanism are mated together, said joint overlaps said one of said mounting substrate and said external waveguide substrate in a thickness direction thereof, and the first and second butt surfaces abut each other, thereby making the waveguide and the external waveguide optically coupled to each other, and
wherein the first butt surface and the second butt surface positioned face to face with each other are inclined along the thickness direction.

10. The optical module according to claim 1, wherein one end of said one of said mounting substrate and said external waveguide substrate has a portion shaped to provide a socket into which part of one end of said other one of said mounting substrate and said external waveguide substrate is fitted and bonded by the adhesive.

11. The optical module according to claim 10, wherein a groove having a specific depth is provided in the socket.

12. The optical module according to claim 1, wherein the core of the waveguide of said mounting substrate has a first butt surface which is located at a specific position relative to one of said first mating mechanism and said second mating mechanism, and the core of the external waveguide of said external waveguide substrate has a second butt surface which is located at a specific position relative to the other of said first and second mating mechanisms, so that when said first mating mechanism and said second mating mechanism are mated together, the first butt surface and the second butt surface abut each other, to optically couple the waveguide and the external waveguide to each other.

13. The optical module according to claim 1, wherein said first mating mechanism includes a fitting recess provided in said one of said mounting substrate and said external waveguide substrate, and said second mating mechanism includes a fitting tab provided on said other one of said mounting substrate and said external waveguide substrate, and
wherein said fitting tab has an end part and an elongate columnlike part connected to the end part, the columnlike part constituting an integral part of said fitting tab and extending generally parallel to a longitudinal direction of the core of said mounting substrate and the core of said external waveguide substrate.

14. The optical module according to claim 1, wherein said first mating mechanism and said second mating mechanism are bonded to each other by the adhesive.

15. The optical module according to claim 1, wherein said one of said mounting substrate and said external waveguide substrate has an overlap area that overlaps said joint and a non-overlap area that does not overlap said joint, the overlap area including an adhesive filling portion, and
said first mating mechanism includes a fitting recess which is recessed from the overlap area and connected to the adhesive filling portion, the non-overlap area including an adhesive inlet connected to the adhesive filling portion.

16. The optical module according to claim 15, wherein the core of the waveguide of said mounting substrate has a first butt surface, and the core of the external waveguide of said external waveguide substrate has a second butt surface which is positioned face to face with the first butt surface when said first mating mechanism and said second mating mechanism are mated together, the overlap area including an adhesive guiding groove to allow the adhesive to flow into a gap created between the first butt surface and the second butt surface.

17. The optical module according to claim 15, wherein said second mating mechanism includes a fitting tab which fits into said fitting recess, said fitting tab having outside walls including a contact wall that contacts an inside wall of said fitting recess and a noncontact wall that does not contact any inside wall of said fitting recess, and
the adhesive filling portion adjoins the noncontact wall of said fitting tab when the contact wall contacts the inside wall of said fitting recess.

18. The optical module according to claim 15, wherein said joint has a deaeration hole penetrating said joint in a thickness direction, wherein the deaeration hole opens to a facing surface area of said joint which faces the adhesive filling portion when said joint overlaps the overlap area.

19. The optical module according to claim 15, wherein the core of said one of said mounting substrate and said external waveguide substrate is located at a specific depth below the overlap area,
   an adhesive guiding groove is provided in the overlap area with a depth equal to the depth of the core of said one of said mounting substrate and said external waveguide substrate over a specified length along a longitudinal direction of the core, and
   the adhesive filling portion and the adhesive guiding groove are connected to each other.

20. An optical module comprising:
   a mounting substrate including an optical element and a waveguide having a core optically coupled to the optical element;
   an external waveguide substrate joined to said mounting substrate said external waveguide substrate including an external waveguide having a core optically coupled to the waveguide of said mounting substrate;
   a first mating mechanism provided in one of said mounting substrate and said external waveguide substrate; and
   a joint including a second mating mechanism provided in another one of said mounting substrate and said external waveguide substrate;
   wherein, when said first mating mechanism and said second mating mechanism are mated, the core of the waveguide and the core of the external waveguide are aligned with each other, to generally maintain a direction of light transmission at said joint, said joint includes a flat surface outside of said second mating mechanism facing and contacting a portion of a top surface of said one of said mounting substrate and said external waveguide substrate, the portion of said top surface being an area outside of said first mating mechanism,
   said flat surface faces and covers one of an end portion of said waveguide and an end portion of said external waveguide,
   said joint is bonded to said one of said mounting substrate and said external waveguide substrate at least in a part of the portion of said top surface by adhesive,
wherein said one of said mounting substrate and said external waveguide substrate has a first mating mechanism forming cavity which is a hollow in part of a surface of said mounting substrate, and
   wherein a first mating mechanism forming material which is different from a base material of said one of said mounting substrate and said external waveguide substrate is filled into the first mating mechanism forming cavity to form said first mating mechanism.

21. An optical module comprising:
   a mounting substrate including an optical element and a waveguide having a core optically coupled to the optical element;
   an external waveguide substrate joined to said mounting substrate said external waveguide substrate including an external waveguide having a core optically coupled to the waveguide of said mounting substrate;
   a first mating mechanism provided in one of said mounting substrate and said external waveguide substrate; and
   a joint including a second mating mechanism provided in another one of said mounting substrate and said external waveguide substrate;
   wherein, when said first mating mechanism and said second mating mechanism are mated, the core of the waveguide and the core of the external waveguide are aligned with each other, to generally maintain a direction of light transmission at said joint, said joint includes a flat surface outside of said second mating mechanism facing and contacting a portion of a top surface of said one of said mounting substrate and said external waveguide substrate, the portion of said top surface being an area outside of said first mating mechanism,
   said flat surface faces and covers one of an end portion of said waveguide and an end portion of said external waveugh
   said joint is bonded to said one of said mounting substrate and said external waveguide substrate at least in a part of the portion of said top surface by adhesive,
   wherein all sides except one lengthwise side of the core of the waveguide or the external waveguide of said one of said mounting substrate and said external waveguide substrate are covered by a cladding, and said one lengthwise side of the core is generally flush with an overlap area of said one of said mounting substrate and said external waveguide substrate that overlaps said joint, and
      wherein said joint comprises a cladding material used for the cladding, and a contact surface of said joint that contacts the overlap area is generally flush with one lengthwise side of the core of the waveguide or the external waveguide of said other one of said mounting substrate and said external waveguide substrate.

22. An optical module comprising:
   a mounting substrate including an optical element and a waveguide having a core optically coupled to the optical element;
   an external waveguide substrate joined to said mounting substrate said external waveguide substrate including an external waveguide having a core optically coupled to the waveguide of said mounting substrate;
   a first mating mechanism provided in one of said mounting substrate and said external waveguide substrate; and
   a joint including a second mating mechanism provided in another one of said mounting substrate and said external waveguide substrate;
   wherein, when said first mating mechanism and said second mating mechanism are mated, the core of the waveguide and the core of the external waveguide are aligned with each other, to generally maintain a direction of light transmission at said joint, said joint includes a flat surface outside of said second mating mechanism facing and contacting a portion of a top surface of said one of said mounting substrate and said external waveguide substrate, the portion of said top surface being an area outside of said first mating mechanism,
   said flat surface faces and covers one of an end portion of said waveguide and an end portion of said external waveugh
   said joint is bonded to said one of said mounting substrate and said external waveguide substrate at least in a part of the portion of said top surface by adhesive,
   wherein said one of said mounting substrate and said external waveguide substrate has an overlap area that overlaps said joint and a non-overlap area that does not overlap said joint, the overlap area including an adhesive filling portion, and
said first mating mechanism includes a fitting recess which is recessed from the overlap area and connected to the adhesive filling portion, the non-overlap area including an adhesive inlet connected to the adhesive filling portion, wherein the core of the waveguide of said mounting substrate has a first butt surface, and the core of the external waveguide of said external waveguide substrate has a second butt surface which is positioned face to face with the first butt surface when said first mating mechanism and said second mating mechanism are mated together, the overlap area including an adhesive guiding groove to allow the adhesive to flow into a gap created between the first butt surface and the second butt surface, wherein said mounting substrate and said external waveguide substrate have respective end surfaces which are positioned face to face with each other, at least one of the first butt surface of the core of said mounting substrate and the second butt surface of the core of said external waveguide substrate bulges out beyond the respective end surface, so that the end surfaces of said mounting substrate and said external waveguide substrate face each other and a groovelike gap is provided between the end surfaces when the first butt surface and the second butt surface are positioned to face each other, and the adhesive filling portion and the adhesive guiding groove are connected to each other.

* * * * *